US012313722B2

(12) United States Patent
Steiner

(10) Patent No.: US 12,313,722 B2
(45) Date of Patent: *May 27, 2025

(54) OCCUPANT DETECTION DEVICE

(71) Applicant: Lutron Technology Company LLC, Coopersburg, PA (US)

(72) Inventor: James P. Steiner, Royersford, PA (US)

(73) Assignee: Lutron Technology Company LLC, Coopersburg, PA (US)

( * ) Notice: Subject to any disclaimer, the term of this patent is extended or adjusted under 35 U.S.C. 154(b) by 165 days.

This patent is subject to a terminal disclaimer.

(21) Appl. No.: 18/134,421

(22) Filed: Apr. 13, 2023

(65) Prior Publication Data
US 2023/0305131 A1    Sep. 28, 2023

Related U.S. Application Data

(63) Continuation of application No. 16/550,033, filed on Aug. 23, 2019, now Pat. No. 11,662,450.

(Continued)

(51) Int. Cl.
*G01S 13/04*    (2006.01)
*G01J 5/00*    (2022.01)
(Continued)

(52) U.S. Cl.
CPC .............. *G01S 13/04* (2013.01); *G01J 5/0025* (2013.01); *G05B 13/0265* (2013.01); *G06V 10/25* (2022.01); *G06V 40/10* (2022.01)

(58) Field of Classification Search
CPC ....... H04W 4/021; H04W 4/02; H04W 12/64; H04W 88/02; H04W 88/08; H04W 4/023;
(Continued)

(56) References Cited

U.S. PATENT DOCUMENTS 5,248,919 A    9/1993    Hanna et al.
7,391,297 B2    6/2008    Cash et al.
(Continued)

FOREIGN PATENT DOCUMENTS

CN    105303549 B    2/2016
EP    1835472 A2    9/2007

OTHER PUBLICATIONS

Ito, Wataru (WO 2014156733 A1)—People Counting Device, and People Counting Method (see title) (Year: 2014).*
(Continued)

*Primary Examiner* — Meless N Zewdu
(74) *Attorney, Agent, or Firm* — Flaster Greenberg P.C.

(57) ABSTRACT

An occupant detection device (e.g., sensor) may include an occupant detection circuit (e.g., a radar occupant detection circuit) and a control circuit. The occupant detection circuit may determine the location of an occupant in a space with reference to a global coordinate associated with the detection circuit and the control circuit may transform the location of the occupant into a local coordinate system associated with a region of interest in the space. The control circuit may use the location information to determine whether the occupant has entered or left the region of interest and adjust an occupant count for the region of interest based on the determination. The control circuit may acquire knowledge about the region of interest during a configuration or commissioning procedure.

39 Claims, 32 Drawing Sheets

Related U.S. Application Data

(60) Provisional application No. 62/799,497, filed on Jan. 31, 2019, provisional application No. 62/722,462, filed on Aug. 24, 2018.

(51) Int. Cl.
  *G05B 13/02* (2006.01)
  *G06V 10/25* (2022.01)
  *G06V 40/10* (2022.01)

(58) Field of Classification Search
  CPC ....... H04W 12/60; H04W 88/00; G01S 13/04; G01S 13/56; G01S 13/02; G01S 7/40; G01S 7/41; G01S 7/415; G01S 13/34; G01S 13/50; G01S 13/68; G01S 13/89; G01S 5/12; G01S 5/14; G01S 5/24; G01S 5/26; G01S 5/28; G01S 5/30; G01J 5/0025; G01J 5/00; G01J 3/028; G05B 13/0265; G06V 10/25; G06V 40/10
  See application file for complete search history.

(56) References Cited

U.S. PATENT DOCUMENTS

| | | | |
|---|---|---|---|
| 8,950,461 | B2 | 2/2015 | Ogden et al. |
| 9,408,041 | B1* | 8/2016 | Abehassera et al. . H04W 4/043 |
| 9,488,000 | B2 | 11/2016 | Kirby et al. |
| 9,538,603 | B2 | 1/2017 | Abraham et al. |
| 9,568,356 | B2 | 2/2017 | Sloan et al. |
| 9,686,696 | B2 | 6/2017 | Thyni et al. |
| 9,867,259 | B2 | 1/2018 | Weidman |
| 11,662,450 | B2* | 5/2023 | Steiner ............... G05B 13/0265 |
| 2008/0092075 | A1 | 4/2008 | Jacob et al. |
| 2009/0206983 | A1 | 8/2009 | Knode et al. |
| 2010/0321184 | A1* | 12/2010 | Dreuillet et al. ............ 340/540 |
| 2011/0109424 | A1 | 5/2011 | Huizenga et al. |
| 2013/0030589 | A1 | 1/2013 | Pessina et al. |
| 2014/0093133 | A1* | 4/2014 | Frank et al. ...... H04M 1/00742 |
| 2014/0265568 | A1 | 9/2014 | Crafts et al. |
| 2014/0348386 | A1* | 11/2014 | Das .................... G06K 9/00771 |
| 2015/0294144 | A1* | 10/2015 | Konishi ............ G06K 9/00369 |
| 2016/0056629 | A1* | 2/2016 | Baker et al. ............. H02J 3/14 |
| 2016/0070265 | A1* | 3/2016 | Liu et al. ............. G05D 1/0088 |
| 2016/0356882 | A1 | 12/2016 | Glas et al. |
| 2017/0017214 | A1 | 1/2017 | O'Keeffe |
| 2017/0163909 | A1 | 6/2017 | Nakash et al. |
| 2017/0171941 | A1 | 6/2017 | Steiner et al. |
| 2017/0206766 | A1 | 7/2017 | Child et al. |
| 2018/0017947 | A1 | 1/2018 | Kupa et al. |
| 2018/0077648 | A1 | 3/2018 | Nguyen |
| 2018/0143321 | A1 | 5/2018 | Skowronek et al. |
| 2018/0152313 | A1 | 5/2018 | Jennequin et al. |
| 2018/0168020 | A1 | 6/2018 | Casey et al. |
| 2018/0231653 | A1 | 8/2018 | Pradeep et al. |
| 2018/0250520 | A1 | 9/2018 | Hyde et al. |
| 2018/0324393 | A1* | 11/2018 | Ryan et al. ............ H04N 7/188 |
| 2020/0250411 | A1* | 8/2020 | Hayashi et al. ... G06K 9/00362 |

OTHER PUBLICATIONS

Paul Perkins (BR 102015024242 A)—Climate Control System With Infrared Selection (see title) (Year: 2017).*

Maguire et al. (CN 109689441 A)—Occupant Detection And Classification System (see title) (Year: 2019).*

Yamaguchi Taichi (WO 2018116627 A1)—Occupant Detection Apparatus, Occupant Detection System, and Occupant Detection Method (see title) (Year: 2018).*

Makoto et al. (JP 2016203910 A)—Occupant Detection Device And Occupant Detection Method (see title) (Year: 2016).*

Ran et al. (WO 2013013082 A1)—Systems, Devices, and Methods for Multi-Occupant Tracking (see title) (Year: 2013).*

Guyn et al. (KR 20180091792 A)—Method And Apparatus For Counting People (see title) (Year: 2018).*

* cited by examiner

OCCUPANT DETECTION DEVICE

CROSS-REFERENCE TO RELATED APPLICATIONS

This application is a continuation of Non-Provisional U.S. patent application Ser. No. 16/550,033, filed Aug. 23, 2019, which claims the benefit of Provisional U.S. Patent Application No. 62/722,462, filed Aug. 24, 2018, and Provisional U.S. Patent Application No. 62/799,497, filed Jan. 31, 2019, the disclosures of which are incorporated herein by reference in their entireties.

BACKGROUND

To manage a user environment, such as a residence or an office building, it may be desirable to have the ability to estimate the number of people occupying the user environment at a given time. Knowing the number of the people in an environment may improve occupant-driven control measures, such as energy control, air quality control, room assignment and/or scheduling, and/or the like. Further, the user environment may include one or more regions/areas that are of particular interest for monitoring. These regions/areas of interest may include, for example, entryways, desk areas, certain aisle or shelve space in a retail store, certain sections of a concert hall, etc. Having the ability to monitor the movements of people in and out of these regions/areas and determine a count of the number of the people in the regions/areas may assist with decisions such as workspace sharing, merchandising, security management, traffic control, etc. Prior art systems, methods, and instrumentalities lack the ability to perform these and other related tasks accurately and economically, and often cause privacy concerns.

SUMMARY

As described herein, an occupant detection device (e.g., an occupant detection sensor) configured to detect occupants in a space (e.g., a room) may comprise an occupant detection circuit (e.g., a radar detection circuit) and a control circuit. The occupant detection circuit may be configured to determine the location of an occupant in the space with reference to a first coordinate system associated the detection circuit. The control circuit may store a relationship between the first coordinate system and a second coordinate system associated with a region of interest in the space. Based on the relationship, the control circuit may convert the location of the occupant in the first coordinate system into a corresponding location in the second coordinate system and determine if the occupant is inside or outside the region of interest.

The relationship between the first and second coordinate systems may comprise an offset vector between the respective origins of the two coordinate systems. The relationship may also comprise a rotation angle between an axis of the first coordinate system and an axis of the second coordinate system. The control circuit may determine the relationship between the first and second coordinate systems during a configuration or commissioning process. The control circuit may also acquire knowledge about the region of interest during the configuration or commissioning process. Such knowledge may include, for example, the shape, dimensions and/or corner locations of the region of interest. The control circuit may obtain the relationship between the first and second coordinate systems and/or the knowledge about the region of interest from a programming device (e.g., based on one or more inputs received from a programming device). The control circuit may also determine the relationship between the first and second coordinate systems and/or acquire the knowledge about the region of interest based on one or more location markers placed in the space or in the region of interest. Multiple regions of interest may be configured for the space, which may have different shapes (e.g., polygon, circle, irregular or complex shapes, etc.). One or more masked areas may also be configured within each region and used to exclude certain occupants from an occupant count.

The control circuit may also be configured to determine whether an occupant in inside a region of interest without transforming the location of the occupant between the two coordinate systems. For example, the control circuit may make the determination based on whether respective vectors extending from each corner of the region of interest are all directed into the region of interest, and to determine that an occupant is within the region of interest when the respective vectors are all directed into the region of interest. The control circuit may be configured to determine that the occupant is not within the region of interest when at least one of the vectors is not directed into the region of interest.

The control circuit may maintain a count of the number of occupants (e.g., an occupant count) in the region of interest based on whether the locations of the occupants are within the region of interest or not. The control circuit may adjust the occupant count in response to determining that an occupant has entered or exited the region of interest. For example, the occupant detection circuit may be configured to assign respective tracking numbers to one or more occupants upon detecting the one or more occupants in the space and the control circuit may be configured to store the tracking numbers and the locations of the one or more occupants in memory. The control circuit may use the tracking number and/or the locations of the occupants to determine whether the occupants have entered the region of interest, exited the region of interest, or become stationary in the region of interest. The control circuit may then adjust the occupant count for the region of area accordingly. The occupant count may be reported by the control circuit to an external device such as a system controller. The report may be transmitted via a communication circuit of the occupant detection device, for example, via a wireless communication link.

DETAILED DESCRIPTION

Figure 1:
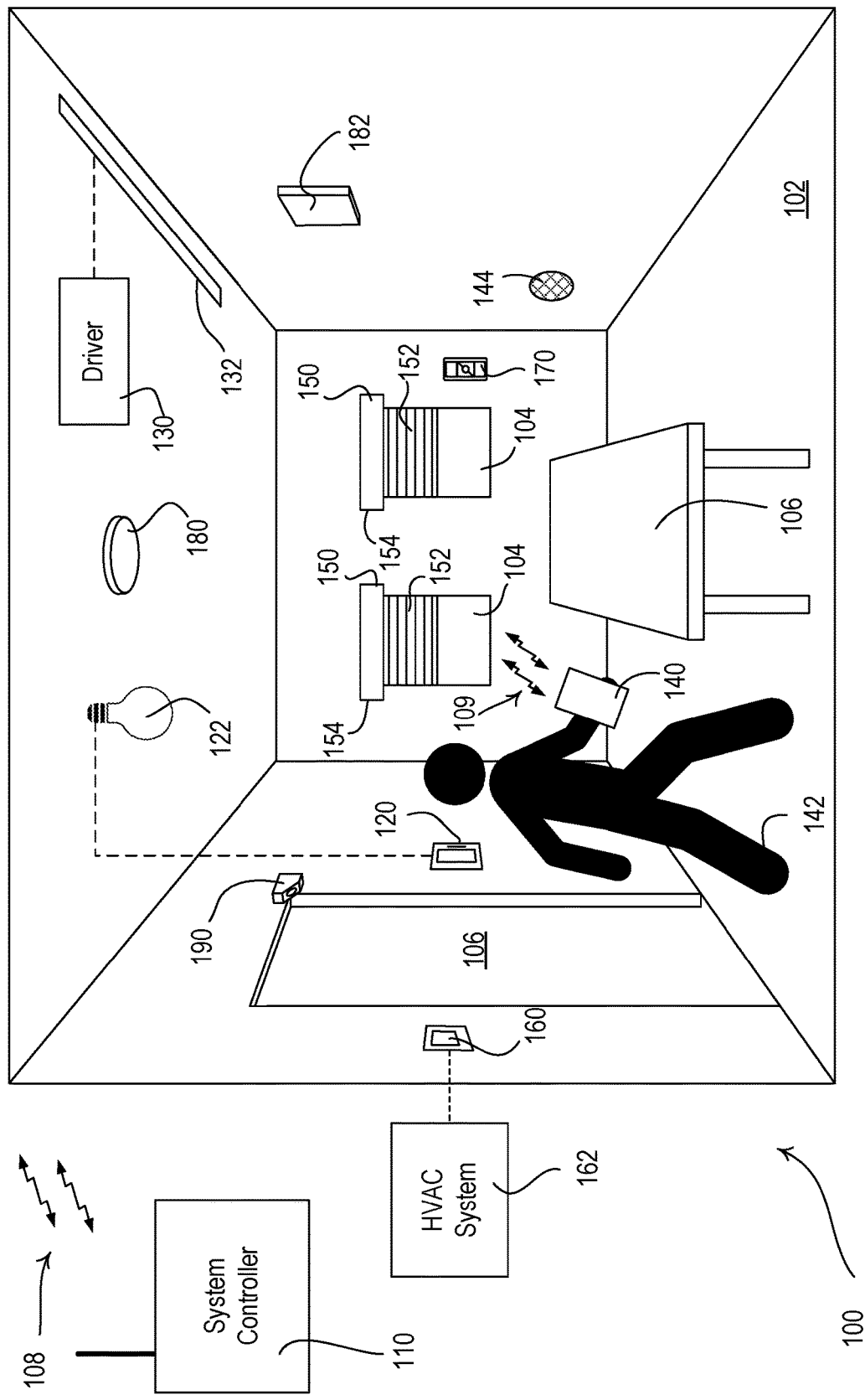
FIG. 1 is a simple diagram of an example load control system including one or more occupant detection devices.

FIG. 1 is a simple diagram of an example load control system 100 for controlling the amount of power delivered from an alternating-current (AC) power source (not shown) to one or more electrical loads. The load control system 100 may be installed in a room 102 of a building. The load control system 100 may comprise a plurality of control devices configured to communicate with each other via wireless signals, e.g., radio-frequency (RF) signals 108. Alternatively or additionally, the load control system 100 may comprise a wired digital communication link coupled to one or more of the control devices to provide for communication between the load control devices. The control devices of the load control system 100 may comprise a number of control-source devices (e.g., input devices operable to transmit messages in response to user inputs, occupancy/vacancy conditions, changes in measured light intensity, etc.) and a number of control-target devices (e.g., load control devices operable to receive messages and control respective electrical loads in response to the received messages). A single control device of the load control system 100 may operate as both a control-source and a control-target device.

The control-source devices may be configured to transmit messages (e.g., digital messages) directly to the control-target devices. In addition, the load control system 100 may comprise a system controller 110 (e.g., a central processor or load controller) operable to communicate digital messages to and from the control devices (e.g., the control-source devices and/or the control-target devices). For example, the system controller 110 may be configured to receive digital messages from the control-source devices and transmit digital messages to the control-target devices in response to the digital messages received from the control-source devices. The control-source and control-target devices and the system controller 110 may be configured to transmit and receive the RF signals 108 using a proprietary RF protocol, such as the ClearConnect® protocol. The RF signals 108 may be transmitted using a different RF protocol, such as, a standard protocol, for example, one of WIFI, BLUETOOTH, THREAD, ZIGBEE, Z-WAVE, KNX-RF, ENOCEAN RADIO protocols, or a different proprietary protocol.

The load control system 100 may comprise one or more load control devices, e.g., a dimmer switch 120 for controlling a lighting load 122. The dimmer switch 120 may be adapted to be wall-mounted in a standard electrical wallbox. The dimmer switch 120 may comprise a tabletop or plug-in load control device. The dimmer switch 120 may comprise a toggle actuator (e.g., a button) and an intensity adjustment actuator (e.g., a rocker switch). Actuations (e.g., successive actuations) of the toggle actuator may toggle (e.g., turn off and on) the lighting load 122. Actuations of an upper portion or a lower portion of the intensity adjustment actuator may respectively increase or decrease the amount of power delivered to the lighting load 122 and thus increase or decrease the intensity of the receptive lighting load from a minimum intensity (e.g., approximately 1%) to a maximum intensity (e.g., approximately 100%). The dimmer switch 120 may comprise a plurality of visual indicators, e.g., light-emitting diodes (LEDs), which may be arranged in a linear array and are illuminated to provide feedback of the intensity of the lighting load 122. Examples of wall-mounted dimmer switches are described in greater detail in U.S. Pat. No. 5,248,919, issued Sep. 28, 1993, entitled LIGHTING CONTROL DEVICE, and U.S. Pat. No. 9,676,696, issued Jun. 13, 2017, entitled WIRELESS LOAD CONTROL DEVICE, the entire disclosures of which are hereby incorporated by reference.

The dimmer switch 120 may be configured to wirelessly receive digital messages via the RF signals 108 (e.g., from the system controller 110) and to control the lighting load 122 in response to the received digital messages. Examples of dimmer switches operable to transmit and receive digital messages is described in greater detail in commonly-assigned U.S. Patent Application Publication No. 2009/0206983, published Aug. 20, 2009, entitled COMMUNICATION PROTOCOL FOR A RADIO-FREQUENCY LOAD CONTROL SYSTEM, the entire disclosure of which is hereby incorporated by reference.

The load control system 100 may comprise one or more remotely-located load control devices, such as a light-emitting diode (LED) driver 130 for driving an LED light source 132 (e.g., an LED light engine). The LED driver 130 may be located remotely, for example, in or adjacent to the lighting fixture of the LED light source 132. The LED driver 130 may be configured to receive digital messages via the RF signals 108 (e.g., from the system controller 110) and to control the LED light source 132 in response to the received digital messages. The LED driver 130 may be configured to adjust the color temperature of the LED light source 132 in response to the received digital messages. Examples of LED drivers configured to control the color temperature of LED light sources are described in greater detail in commonly-assigned U.S. Pat. No. 9,538,603, issued Jan. 3, 2017, entitled SYSTEMS AND METHODS FOR CONTROLLING COLOR TEMPERATURE, the entire disclosure of which is hereby incorporated by reference. The load control system 100 may further comprise other types of remotely-located load control devices, such as, for example, electronic dimming ballasts for driving fluorescent lamps.

The load control system 100 may comprise one or more daylight control devices, e.g., motorized window treatments 150, such as motorized cellular shades, for controlling the amount of daylight entering the room 102. Each motorized window treatments 150 may comprise a window treatment fabric 152 hanging from a headrail 154 in front of a respective window 104. Each motorized window treatment 150 may further comprise a motor drive unit (not shown) located inside of the headrail 154 for raising and lowering the window treatment fabric 152 for controlling the amount of daylight entering the room 102. The motor drive units of the motorized window treatments 150 may be configured to receive digital messages via the RF signals 108 (e.g., from the system controller 110) and adjust the position of the respective window treatment fabric 152 in response to the received digital messages. The load control system 100 may comprise other types of daylight control devices, such as, for example, a cellular shade, a drapery, a Roman shade, a Venetian blind, a Persian blind, a pleated blind, a tensioned roller shade system, an electrochromic or smart window, and/or other suitable daylight control device. Examples of battery-powered motorized window treatments are described in greater detail in U.S. Pat. No. 8,950,461, issued Feb. 10, 2015, entitled MOTORIZED WINDOW TREATMENT, and U.S. Pat. No. 9,488,000, issued Nov. 8, 2016, entitled INTEGRATED ACCESSIBLE BATTERY COMPARTMENT FOR MOTORIZED WINDOW TREATMENT, the entire disclosures of which are hereby incorporated by reference.

The load control system 100 may comprise one or more temperature control devices, e.g., a thermostat 160 for controlling a room temperature in the room 102. The thermostat 160 may be coupled to a heating, ventilation, and air conditioning (HVAC) system 162 via a control link (e.g., an analog control link or a wired digital communication link). The thermostat 160 may be configured to wirelessly communicate digital messages with a controller of the HVAC system 162. The thermostat 160 may comprise a temperature sensor for measuring the room temperature of the room 102 and may control the HVAC system 162 to adjust the temperature in the room to a setpoint temperature. The load control system 100 may comprise one or more wireless temperature sensors (not shown) located in the room 102 for measuring the room temperatures. The HVAC system 162 may be configured to turn a compressor on and off for cooling the room 102 and to turn a heating source on and off for heating the rooms in response to the control signals received from the thermostat 160. The HVAC system 162 may be configured to turn a fan of the HVAC system on and off in response to the control signals received from the thermostat 160. The thermostat 160 and/or the HVAC system 162 may be configured to control one or more controllable dampers to control the air flow in the room 102. The thermostat 160 may be configured to receive digital messages via the RF signals 108 (e.g., from the system controller 110) and adjust heating, ventilation, and cooling in response to the received digital messages.

The load control system 100 may comprise one or more other types of load control devices, such as, for example, a screw-in luminaire including a dimmer circuit and an incandescent or halogen lamp; a screw-in luminaire including a ballast and a compact fluorescent lamp; a screw-in luminaire including an LED driver and an LED light source; an electronic switch, controllable circuit breaker, or other switching device for turning an appliance on and off, a plug-in load control device, controllable electrical receptacle, or controllable power strip for controlling one or more plug-in loads; a motor control unit for controlling a motor load, such as a ceiling fan or an exhaust fan; a drive unit for controlling a motorized window treatment or a projection screen; motorized interior or exterior shutters; a thermostat for a heating and/or cooling system; a temperature control device for controlling a setpoint temperature of an HVAC system; an air conditioner; a compressor; an electric baseboard heater controller; a controllable damper; a variable air volume controller; a fresh air intake controller; a ventilation controller; a hydraulic valves for use radiators and radiant heating system; a humidity control unit; a humidifier; a dehumidifier; a water heater; a boiler controller; a pool pump; a refrigerator; a freezer; a television or computer monitor; a video camera; an audio system or amplifier; an elevator; a power supply; a generator; an electric charger, such as an electric vehicle charger; and an alternative energy controller.

The load control system 100 may comprise one or more input devices, e.g., a remote control device 170 and one or more occupant detection devices, such as a ceiling-mounted occupant detection sensor 180 and a wall-mounted occupant detection sensor 182. The input devices may be fixed or movable input devices. The system controller 110 may be configured to transmit one or more digital messages to the load control devices (e.g., the dimmer switch 120, the LED driver 130, the motorized window treatments 150, and/or the thermostat 160) in response to the digital messages received from the remote control device 170, the ceiling-mounted occupant detection sensor 180, and/or the wall-mounted occupant detection sensor 182. The remote control device 170, the ceiling-mounted occupant detection sensor 180, and/or the wall-mounted occupant detection sensor 182 may be configured to transmit digital messages directly to the dimmer switch 120, the LED driver 130, the motorized window treatments 150, and/or the thermostat 160. While FIG. 1 shows two occupant detection devices, the load control system 100 may only comprise a single occupant detection device (e.g., one or the other of the ceiling-mounted occupant detection sensor 180 and the wall-mounted occupant detection sensor 182).

The remote control device 170 may be configured to transmit digital messages via the RF signals 108 to the system controller 110 (e.g., directly to the system controller) in response to an actuation of one or more buttons of the remote control device. For example, the remote control device 170 may be battery-powered. The load control system 100 may comprise other types of input devices, such as, for example, temperature sensors, humidity sensors, radiometers, cloudy-day sensors, shadow sensors, pressure sensors, smoke detectors, carbon monoxide detectors, air-quality sensors, motion sensors, security sensors, proximity sensors, fixture sensors, partition sensors, keypads, multi-zone control units, slider control units, kinetic or solar-powered remote controls, key fobs, cell phones, smart phones, tablets, personal digital assistants, personal computers, laptops, timeclocks, audio-visual controls, safety devices, power monitoring devices (e.g., such as power meters, energy meters, utility submeters, utility rate meters, etc.), central control transmitters, residential, commercial, or industrial controllers, and/or any combination thereof.

The system controller 110 may be coupled to a network, such as a wireless or wired local area network (LAN), e.g., for access to the Internet. The system controller 110 may be wirelessly connected to the network, e.g., using Wi-Fi technology. The system controller 110 may be coupled to the network via a network communication bus (e.g., an Ethernet communication link). The system controller 110 may be configured to communicate via the network with one or more network devices, e.g., a mobile device 140, such as, a personal computing device and/or a wearable wireless device. The mobile device 140 may be located on an occupant 142, for example, may be attached to the occupant's body or clothing or may be held by the occupant. The mobile device 140 may be characterized by a unique identifier (e.g., a serial number or address stored in memory) that uniquely identifies the mobile device 140 and thus the occupant 142. Examples of personal computing devices may include a smart phone (for example, an iPhone® smart phone, an Android® smart phone, or a Blackberry® smart phone), a laptop, and/or a tablet device (for example, an iPad® hand-held computing device). Examples of wearable wireless devices may include an activity tracking device (such as a FitBit® device, a Misfit® device, and/or a Sony Smartband® device), a smart watch, smart clothing (e.g., OMsignal® smartwear, etc.), and/or smart glasses (such as Google Glass® eyewear). In addition, the system controller 110 may be configured to communicate via the network with one or more other control systems (e.g., a building management system, a security system, etc.).

The mobile device 140 may be configured to transmit digital messages to the system controller 110, for example, in one or more Internet Protocol packets. For example, the mobile device 140 may be configured to transmit digital messages to the system controller 110 over the LAN and/or via the internet. The mobile device 140 may be configured to transmit digital messages over the internet to an external service (e.g., If This Then That (IFTTT®) service), and then the digital messages may be received by the system controller 110. The mobile device 140 may transmit and receive RF signals 109 via a Wi-Fi communication link, a Wi-MAX communications link, a Bluetooth communications link, a near field communication (NFC) link, a cellular communications link, a television white space (TVWS) communication link, or any combination thereof. Alternatively or additionally, the mobile device 140 may be configured to transmit RF signals according to the proprietary protocol. The load control system 100 may comprise other types of network devices coupled to the network, such as a desktop personal computer, a Wi-Fi or wireless-communication-capable television, or any other suitable Internet-Protocol-enabled device. Examples of load control systems operable to communicate with mobile and/or network devices on a network are described in greater detail in commonly-assigned U.S. Patent Application Publication No. 2013/0030589, published Jan. 31, 2013, entitled LOAD CONTROL DEVICE HAVING INTERNET CONNECTIVITY, the entire disclosure of which is hereby incorporated by reference.

The system controller 110 may be configured to determine the location of the mobile device 140 and/or the occupant 142. The system controller 110 may be configured to control (e.g., automatically control) the load control devices (e.g., the dimmer switch 120, the LED driver 130, the motorized window treatments 150, and/or the temperature control device 160) in response to determining the location of the mobile device 140 and/or the occupant 142. One or more of the control devices of the load control system 100 may transmit beacon signals, for example, RF beacon signals transmitted using a short-range and/or low-power RF technology, such as Bluetooth technology. The load control system 100 may also comprise at least one beacon transmitting device 144 for transmitting the beacon signals. The mobile device 140 may be configured to receive a beacon signal when located near a control device that is presently transmitting the beacon signal. A beacon signal may comprise a unique identifier identifying the location of the load control device that transmitted the beacon signal. Since the beacon signal may be transmitted using a short-range and/or low-power technology, the unique identifier may indicate the approximate location of the mobile device 140. The mobile device 140 may be configured to transmit the unique identifier to the system controller 110, which may be configured to determine the location of the mobile device 140 using the unique identifier (e.g., using data stored in memory or retrieved via the Internet). An example of a load control system for controlling one or more electrical loads in response to the position of a mobile device and/or occupant inside of a building is described in greater detail in commonly-assigned U.S. Patent Application Publication No. 2016/0056629, published Feb. 25, 2016, entitled LOAD CONTROL SYSTEM RESPONSIVE TO LOCATION OF AN OCCUPANT AND MOBILE DEVICES, the entire disclosure of which is hereby incorporated by reference.

The operation of the load control system 100 may be programmed and configured using, for example, the mobile device 140 or other network device (e.g., when the mobile device is a personal computing device) during a commissioning procedure (e.g., a configuration procedure). The mobile device 140 may execute a graphical user interface (GUI) configuration software for allowing a user or installer to program how the load control system 100 will operate. For example, the configuration software may run as a PC application or a web interface. The configuration software and/or the system controller 110 (e.g., via instructions from the configuration software) may generate a load control database that defines the operation of the load control system 100. For example, the load control database may include information regarding the operational settings of different load control devices of the load control system (e.g., the dimmer switch 120, the LED driver 130, the motorized window treatments 150, and/or the thermostat 160). The load control database may comprise information regarding associations between the load control devices and the input devices (e.g., the remote control device 170, the ceiling-mounted occupant detection sensor 180, the wall-mounted occupant detection sensor 182, etc.). The load control database may comprise information regarding how the load control devices respond to inputs received from the input devices. Examples of configuration procedures for load control systems are described in greater detail in commonly-assigned U.S. Pat. No. 7,391,297, issued Jun. 24, 2008, entitled HANDHELD PROGRAMMER FOR A LIGHTING CONTROL SYSTEM; U.S. Patent Application Publication No. 2008/0092075, published Apr. 17, 2008, entitled METHOD OF BUILDING A DATABASE OF A LIGHTING CONTROL SYSTEM; and U.S. Patent Application Publication No. 2014/0265568, published Sep. 18, 2014, entitled COMMISSIONING LOAD CONTROL SYSTEMS, the entire disclosure of which is hereby incorporated by reference.

The occupant detection sensors 180, 182 may each be configured to detect locations and movements of occupants in and near (e.g., in a doorway of) room 102. The occupant detection sensors 180, 182 may each be configured to determine the number of occupants in the room 102 (e.g., an occupant count). For example, each of the occupant detection sensors 180, 182 may comprise an occupant detection circuit (e.g., an image sensing circuit, such as a radar detection circuit) for determining the number and location of the occupants in the room 102 (e.g., as will be described in greater detail below). The occupant detection circuit may be configured to determine the locations of an occupant as coordinates in a two-dimensional or three-dimensional coordinate system, e.g., a Cartesian or polar coordinate system. For example, the occupant detection circuit may be configured to determine the locations of the occupant as X-Y-Z coordinates where the Z-axis extends from the occupant detection sensor towards the occupant (e.g., the Z-coordinate may indicate the distance from the occupant detection sensor to the occupant).

Figure 2A:
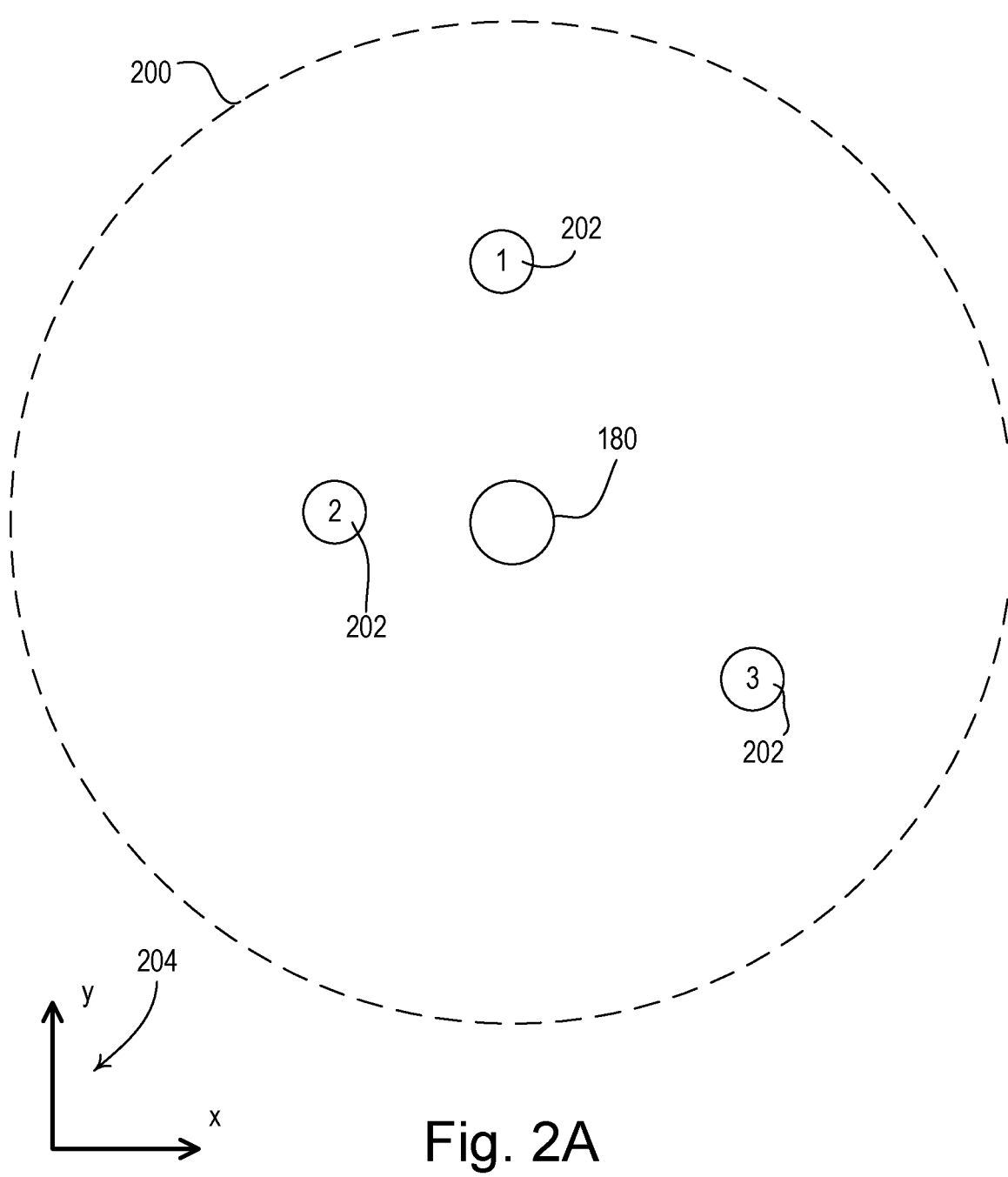
FIGS. 2A-2C illustrate example coverage areas of occupant detection devices.

The ceiling-mounted occupant detection sensor 180 may be mounted to the ceiling of the room 102 (e.g., in the center of the room) and may be configured to determine a top-down view of the locations of the occupants of the room 102 in response to the occupant detection circuit. FIG. 2A is an example view of the ceiling-mounted occupant sensor 180 illustrating a coverage area 200 (e.g., a range) and a plurality of occupants 202 within the coverage area. As shown in FIG. 2A, the coverage area 200 of the ceiling-mounted occupant detection sensor 180 may have a circular shape. The ceiling-mounted occupant detection sensor 180 may be configured to generate an occupant map, e.g., a two-dimensional (2D) radar image indicating the locations of the occupants 202 within the coverage area. The ceiling-mounted occupant detection sensor 180 may be configured to determine the locations of the occupants 202 as coordinates (e.g., X-Y coordinates) in a two-dimensional coordinate system 204 associated with (e.g., defined by) the occupant detection circuit of the ceiling-mounted occupant detection sensor 180. For example, the ceiling-mounted occupant detection sensor 180 may ignore (e.g., discard) the Z-coordinate information determined by the occupant detection circuit. In addition, the ceiling-mounted occupant detection sensor 180 may set the Z-coordinate to a value (e.g., a constant value) and determine the X-Y coordinates of the occupants 202 at that particular value of the Z-coordinate. For example, the ceiling-mounted occupant detection sensor 180 may set the Z-coordinate to a value that corresponds to a particular height (e.g., approximately 2.5-3 feet) so as to ignore movement of pets. Further, the ceiling-mounted occupant detection sensor 180 may determine the locations of the occupants 202 as X-Y-Z coordinates in a three-dimensional coordinate system.

Figure 2B:
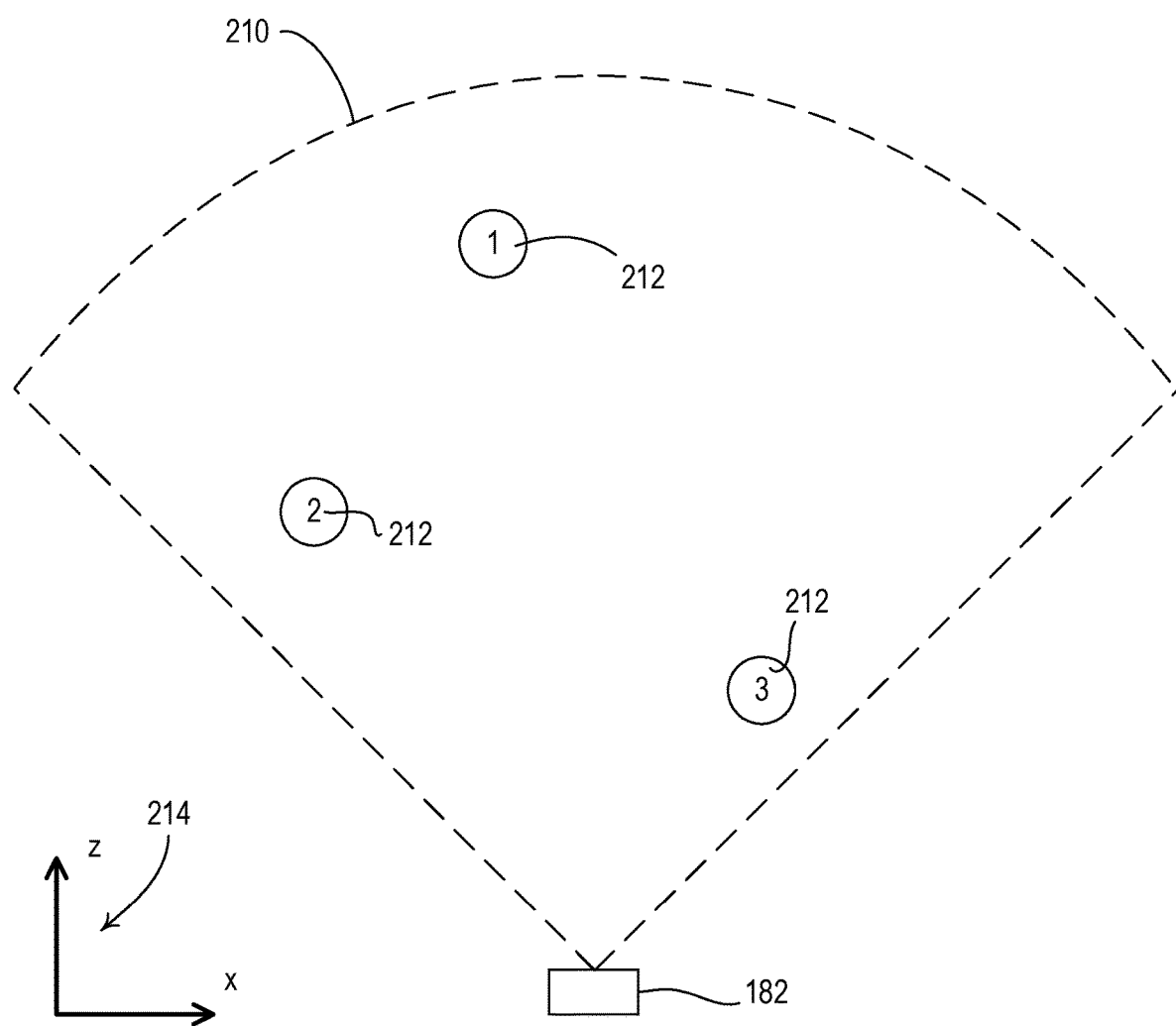

The wall-mounted occupant detection sensor 182 may be mounted to a wall of the room 102 and may be configured to use distance data from the occupant detection circuit to determine the locations of the occupants of the room 102. FIG. 2B is an example view of the wall-mounted occupant sensor 182 illustrating a coverage area 210 (e.g., a range) and a plurality of occupants 212 within the coverage area. As shown in FIG. 2B, the coverage area 210 of the wall-mounted occupant detection sensor 182 may have a wedge shape. Since the coverage area 210 may be wedge-shaped, the wall-mounted occupant detection sensor 182 may be mounted in a corner of the room 102. The wall-mounted occupant detection sensor 182 may be configured to generate an occupant map, e.g., a two-dimensional (2D) radar image indicating the locations of the occupants 212 within the coverage area. The wall-mounted occupant detection sensor 182 may be configured to determine the locations of occupants 212 as coordinates (e.g., X-Z coordinates) in a two-dimensional coordinate system 214 associated with (e.g., defined by) the occupant detection circuit of the ceiling-mounted occupant detection sensor 180. For example, the wall-mounted occupant detection sensor 182 may ignore (e.g., discard) the Y-coordinate information determined by the occupant detection circuit. In addition, the wall-mounted occupant detection sensor 182 may set the Y-coordinate to a value (e.g., a constant value) and determine the X-Z coordinates of the occupants 202 at that particular value of the Y-coordinate. For example, the wall-mounted occupant detection sensor 182 may set the Y-coordinate to a value that corresponds to a particular height (e.g., approximately 2.5-3 feet) so as to ignore movement of pets. Further, the wall-mounted occupant detection sensor 182 may determine the locations of the occupants 212 as X-Y-Z coordinates in a three-dimensional coordinate system.

The occupant detection sensors 180, 182 may each transmit one or more messages (e.g., digital messages) to the system controller 110 via the RF signals 108 (e.g., using the proprietary protocol described herein) in response to determining an occupant count (e.g., a sensor occupant count) of the room 102 and/or an occupant count of a region of interest (e.g., an area of interest) of the room 102 (e.g., including a change thereof). The system controller 110 may be configured to maintain the occupant count for the room 102 (e.g., a room occupant count) and/or the occupant count for a region of interest of the room 102. Based on the occupant count, the system controller 110 may be further configured to determine an occupancy condition and/or a vacancy condition of the room 102. For example, when the occupant count is greater than zero, the system controller 110 may determine that the room 102 or a region of interest of the room 102 is occupied, and when the occupant count reaches zero, the system controller 110 may determine that the room 102 or the region of interest of the room 102 is vacant. It should be noted that the terms "area of interest" and "region of interest" are used interchangeably in the description provided herein.

The operation of the occupant detection sensors 180, 182 may be configured, for example, during the commissioning procedure of the load control system 100. Each of the occupant detection sensors 180, 182 may comprise one or more configuration buttons for setting operational characteristics (e.g., sensitivity, coverage area, etc.) of the occupant detection sensor. In addition, each occupant detection sensor 180, 182 may adjust the operational characteristics in response to receiving one or more messages via the RF signals 108. For example, the mobile device 140 may execute design software installed on the mobile device to allow for adjusting the operational characteristics of the occupant detection sensors 180, 182, and may transmit (e.g., directly transmit) messages including the operational characteristics to the occupant detection sensors, for example, via a short-range RF technology (e.g., BLUETOOTH®, near field communication (NFC), WIFI®, Thread, etc.). The mobile device 140 may also transmit messages including the operational characteristics to the occupant detection sensors 180, 182 via the system controller 110. Further, each occupant detection sensor 180, 182 may be configured to learn and/or automatically adjust the operational characteristics of the occupant detection sensor (e.g., as will be described in greater detail below). Each occupant detection sensor 180, 182 may also be configured to acquire knowledge (e.g., bounds, dimensions, shape, etc.) of the room 102 and/or a region of interest of the room 102 (e.g., as will be described in greater detail below).

As previously mentioned, the occupant detection sensor 180, 182 may each transmit one or more messages including a determined occupant count (e.g., a sensor occupant count) to the system controller 110, which may maintain the occupant count for the room 102 (e.g., a room occupant count). The system controller 110 may be configured to receive messages transmitted by the ceiling-mounted occupant detection sensor 180 and/or the wall-mounted occupant detection sensor 182 (e.g., as well as other occupant detection sensors), and aggregate the occupant counts (or change thereof) indicated in those messages. The system controller 110 may be capable of resolving discrepancies between information reported by the ceiling-mounted occupant detection device 180 and the wall-mounted occupant detection sensor 182 (e.g., and information gathered from other devices in the load control system 100). The system controller 110 may be configured to gather and/or store room occupant count data over time and thus maintain a historical view of the occupancy status of a room.

Each of the occupant detection sensor 180, 182 may be configured to perform some or all of the functions of the system controller 110. For example, the ceiling-mounted occupant counting detection sensor 180 may be capable of receiving information (e.g., digital messages) from the wall-mounted detection sensor 182 (e.g., or other occupant detection sensors) regarding an occupant count (or a change thereof) or an occupancy status of room 102. The ceiling-mounted occupant counting detection sensor 180 may be configured to process the received occupant count in conjunction with the occupant count determined by the ceiling-mounted occupant counting detection sensor 180 itself, and determine and maintain the room occupant count for the room 102. Similar to the system controller 110, each occupant detection sensor 180, 182 may be capable of resolving mismatches among various pieces of information received or derived by the occupant detection sensor.

Figure 2C:
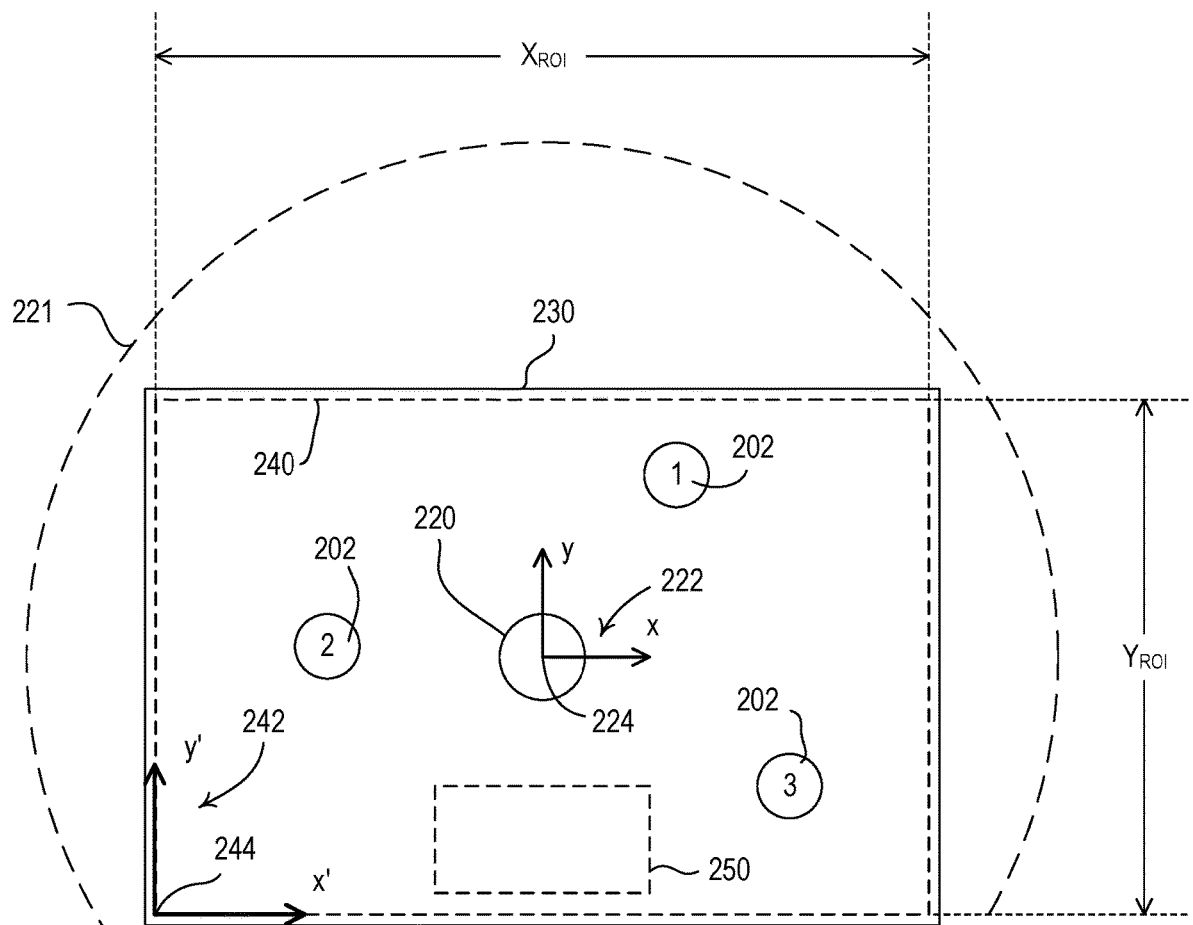
Figure 4:
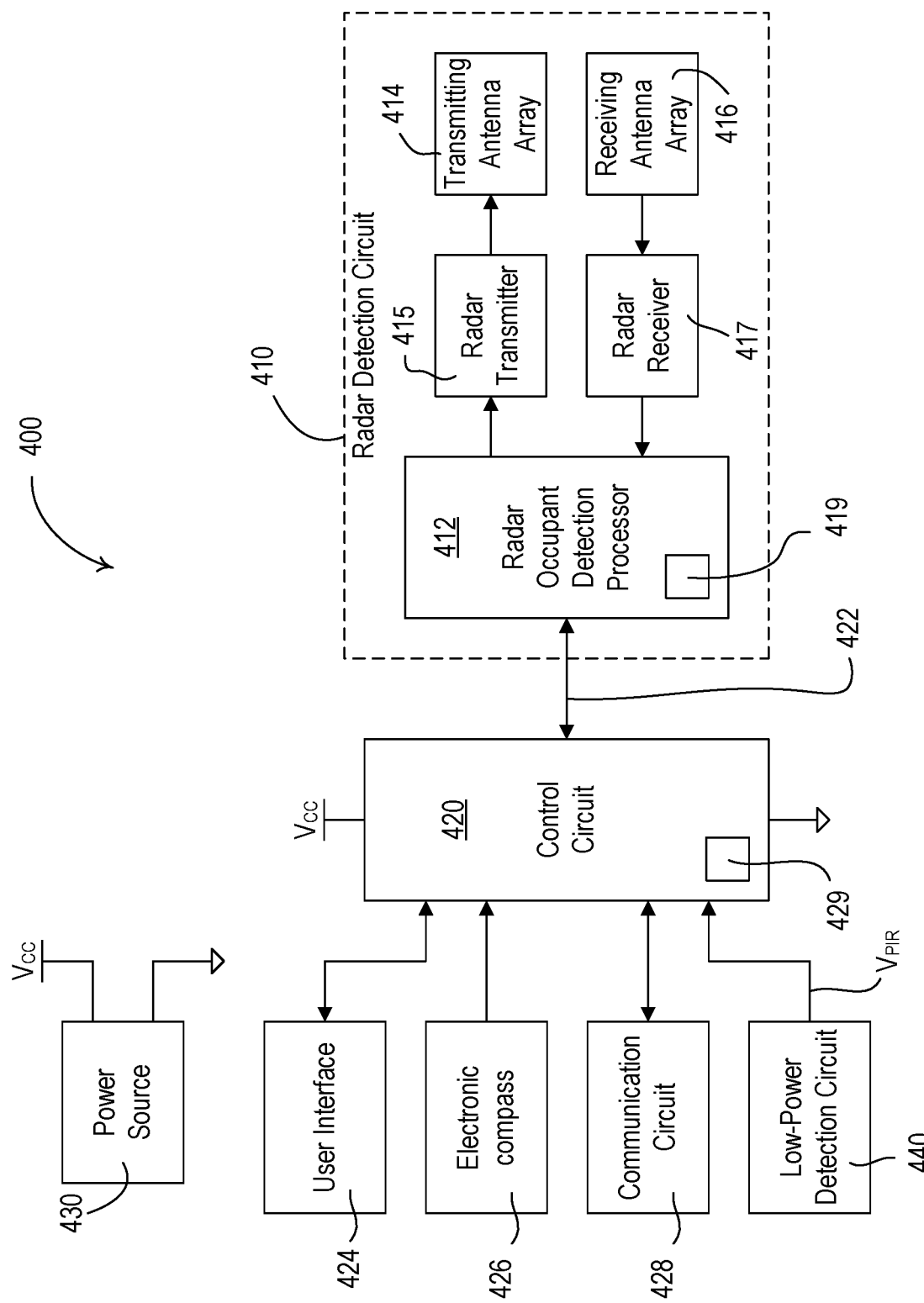
FIG. 4 is a block diagram of an example occupant detection sensor as described herein.

The occupant detection circuit of each of the occupant detection sensors 180, 182 may be configured to determine locations of occupants within the respective coverage area 200, 210. FIG. 2C illustrates an example coverage area 221 of a ceiling-mounted occupant detection sensor 220 (e.g., the ceiling-mounted occupant detection sensor 180). The ceiling-mounted occupant detection sensor 220 may be configured to determine the locations of occupants as X-Y coordinates in a coordinate system, e.g., a global coordinate system 222 associated with (e.g., defined by) the occupant detection circuit of the ceiling-mounted occupant detection sensor 220, as shown in FIG. 4. For example, the occupant detection circuit of the ceiling-mounted occupant detection sensor 220 may include a radar detection circuit characterized by a boresight (e.g., that may be set by the antennas of the radar detection circuit). The direction of the boresight of the radar detection circuit may establish the x-axis of the global coordinate system 222 of the ceiling-mounted occupant detection sensor 220. The global coordinate system 222 may have an origin 224 (e.g., the (0, 0) coordinate) that may be located at the center of the coverage area 221 of the occupant detection sensor 220 (e.g., at a center point of the occupant detection sensor). The occupant detection sensor 220 may be configured to determine the number of occupants in a room 230 (e.g., the room 102) and/or movements of the occupants in response to the X-Y coordinates of the occupants as determined by the occupant detection circuit.

Figure 3A:
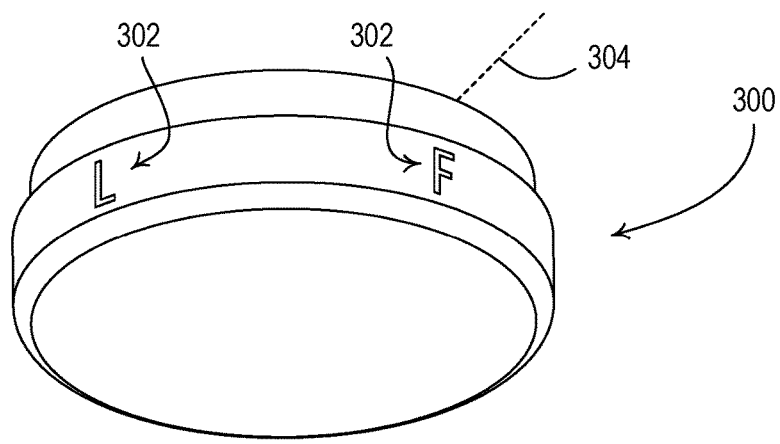
FIGS. 3A-3C are perspective views of example occupant detection devices.
Figure 3B:
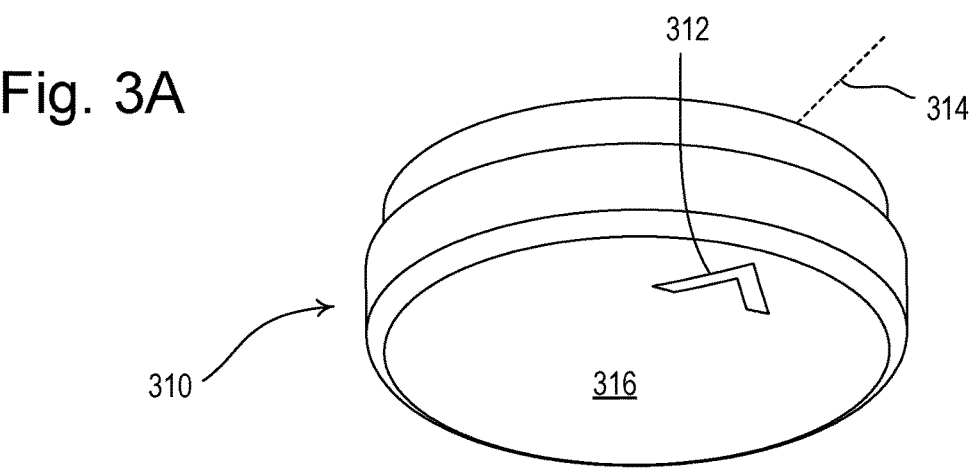
Figure 3C:
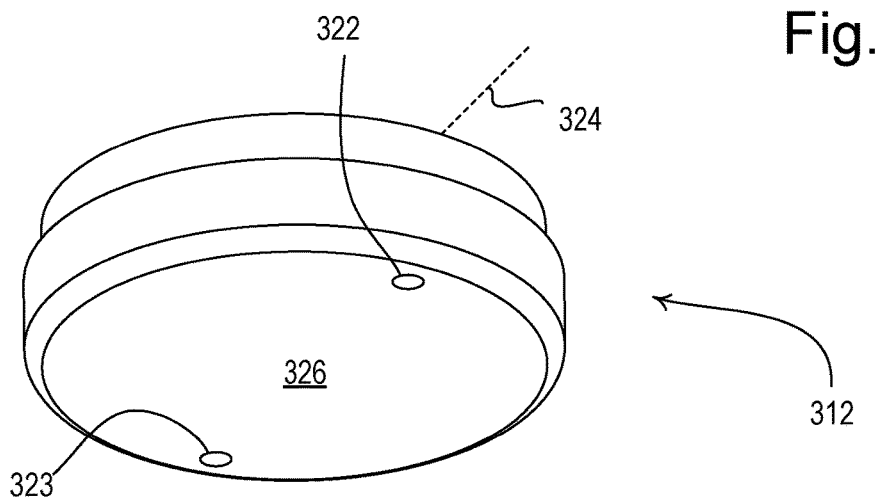

The ceiling-mounted occupant detection sensor 220 may comprise one or more coordinate system indicators (e.g., boresight indicators) to indicate the direction of the respective coordinate system (e.g., the directions of the x-axis and the y-axis of the global coordinate system 222). FIGS. 3A-3C are perspective views of example ceiling mounted-mounted occupant detection sensors 300, 310, 320 (e.g., that may be deployed as the ceiling-mounted occupant detection sensor 180 and/or the ceiling-mounted occupant detection sensor 220). For example, a perimeter of the occupant detection sensor 300 shown in FIG. 3A may be marked with coordinate system indicators in the form of directional indicia 302, which may include the letters "F", "B", "R", and "L" indicating the front side, back side, right side, and left side of the occupant detection sensor, respectively. The directional indicia 302 may be formed as part of the occupant detection sensor 300 and/or may be printed on the occupant detection sensor. The occupant detection sensor 300 may be characterized by a global coordinate system having an x-axis that may originate from the center of the occupant detection sensor and extend through the front of the occupant detection sensor (e.g., marked with the letter "F" as shown), for example, as shown by a line 304 in FIG. 3A. The direction indicia 302 may include the letters "N", "S", "E", and "W" indicating north, south, east, and west directions, respectively, of the occupant detection sensor (e.g., of the global coordinate system 222). The directional indicia 302 may also include the letters "X" and "Y" to indicate the direction of the x-axis and the y-axis of the global coordinate system 222.

Referring to FIG. 3B, the ceiling-mounted occupant detection sensor 310 may be marked with a coordinate system indicator in the form of a single indicium, such as an arrow 312. The occupant detection sensor 310 may be characterized by a global coordinate system having an x-axis that may extend from the side of the occupant detection sensor marked by the directional indicium (e.g., from the side of the occupant detection sensor on which the arrow 312 is located and/or in the direction indicated the arrow 312), for example, as shown by a line 314 in FIG. 3B. The arrow 312 may be located on a downward-facing surface 316 of the occupant detection sensor 310 (e.g., so as to be easily viewed from below). The arrow 312 may be formed as part of the occupant detection sensor 310 and/or may be printed on the occupant detection sensor. The coordinate system indicator may comprise an indium, such as a triangle or dot, and/or other component, such as an illuminated element (e.g., a light-emitting diode). If the coordinate system indicator is a single indicium that indicates a direction (e.g., such as the arrow 312 or a triangle), the coordinate system indicator may also be centrally located on the downward-facing surface 316 of the occupant detection sensor 310.

As shown in FIG. 3C, the ceiling-mounted occupant detection sensor 320 may comprise multiple (e.g., a pair of) coordinate system indicators, such as first and second light sources 322, 323, e.g., light-emitting diodes (LEDs). For example, the first light source 322 may comprise a green LED and the second light source 323 may comprise a red LED. The occupant detection sensor 320 may be characterized by a coordinate system having an x-axis that may extend from the side of the occupant detection sensor on which the first light source 322 (e.g., the green LED) is located, for example, as shown by a line 324 in FIG. 3C. The first light source 322 may indicate the positive direction of the x-axis of the global coordinate system 222 and the second light source 323 may indicate the negative direction of the x-axis of the global coordinate system 222. The first and second light sources 322, 323 may be located on a downward-facing surface 326 of the occupant detection sensor 320 (e.g., so as to be easily viewed from below the occupant detection sensor 320). The first and second light sources 322, 323 may be located on the sides of the occupant detection sensor 320.

The coordinate system indicators of the occupant detection sensor 220 (e.g., as shown on the occupant detection sensors 300-320 of FIGS. 3A-3C) may be used during installation/configuration of the occupant detection sensors (e.g., during the commissioning procedure of the load control system 100). For example, the coordinate system indicators may be used to position the x-axis of the global coordinate system 222 of the occupant detection sensor 220 to be aligned with (e.g., parallel or perpendicular to) the walls of the room 230.

The occupant detection sensor 220 may be configured to detect (e.g., only detect) occupants in a region of interest (ROI) 240 within the coverage area 221 (e.g., within the room 230). The region of interest 240 may be associated with (e.g., characterized by) a coordinate system, e.g., a local coordinate system 242, having an origin 244 (e.g., the (0,0) coordinate) that may be located at one of the corners of the region of interest. The boundaries of the region of interest 240 may be aligned with the walls of the room 230

(e.g., the x-axis and the y-axis of the local coordinate system 242 may be parallel and/or perpendicular to the walls of the room). In addition, the occupant detection sensor 220 may be configured to ignore data regarding occupants in a masked region 250 within the region of interest 240. Among other purposes, the use of the region of interest(s) 240 and/or masked region(s) 250 may allow the occupant detection sensor 220 to focus on the occupants of just the room 230 and ignore moving bodies in other areas, for example, in a hallway outside of a doorway (e.g., the doorway 106). The term "marked region" may be used interchangeably herein with the term "masked area."

The occupant detection sensor 220 may be configured to determine the locations (e.g., X-Y coordinates) of the occupants within the local coordinate system 242 associated with (e.g., defined by) the region of interest 240. The global coordinate system 222 of the occupant detection sensor 220 may or may not be aligned with the local coordinate system 242 of the region of interest 240, for example, in terms of orientations and/or origins of the coordination systems. The occupant detection sensor 220 may be configured to determine and/or store a relationship between the global coordinate system 222 and local coordinate system 242. For example, if the local coordinate system 242 is not aligned with the global coordinate system 222 in terms of orientations of the coordinate systems, the occupant detection sensor 220 may be configured to determine a rotation angle $\varphi_R$ between the x-axis (or y-axis) of the global coordinate system 222 of the occupant detection sensor 220 and the x-axis (or y-axis) of the local coordinate system 242 of the region of interest 240. If the origin of the local coordinate system 242 is not aligned with the origin of the global coordinate system 222, the occupant detection sensor 220 may be configured to determine an offset vector ($x_{OFF}$, $y_{OFF}$) between the origin 224 of the global coordinate system 222 and the origin 244 of the local coordinate system 242. The occupant detection sensor 220 may be configured to use the relationship between the global coordinate system 222 and the local coordinate system 242 (e.g., which may comprise the rotation angle ($\varphi_R$ and/or the offset vector ($x_{OFF}$, $y_{OFF}$)) to transform a location (x,y) from the global coordinate system 222 (e.g., as determined by the antennas of a radar detection circuit of the occupant detection sensor) into a location (x', y') in the local coordinate system 242. The ceiling-mounted occupant detection sensor 180 may be configured to use the location in the local coordinate system 242 and dimensions $X_{ROI}$, $Y_{ROI}$ of the region of interest 240 to determine if occupants are within the region of interest.

The region of interest 240 may be configured, for example, during a commissioning procedure of the load control system 100, and the occupant detection sensor 220 may acquire knowledge (e.g., learn) of the region of interest 240 during the commissioning procedure (e.g., by entering a learning mode). For example, a shape and/or dimensions of the region of interest may be selected using the configuration buttons on the occupant detection sensor 220 and/or design software executed on a programing device (e.g., the mobile device 140). For example, the shape of the region of interest may be selected from a list of standard shapes (e.g., circle, square, rectangle, etc.). The dimensions of the selected shape may be entered via the programming device (e.g., a radius for a circular region of interest, an edge length for a square region of interest, and/or a length and width for a rectangular region of interest). The shape and/or dimension information may then be transmitted (e.g., via wireless communication) to the occupant detection sensor 220. The occupant detection sensor 220 may be configured to determine the rotation angle $\varphi_R$ between the x-axis of the global coordinate system 222 of the occupant detection sensor and the x-axis of the region of interest 240, the offset vector ($x_{OFF}$, $y_{OFF}$), and/or the bounds/dimensions of the region of interest 242. For example, the coordinate system indicators may be used to establish and/or determine the rotation angle $\varphi_R$ between the x-axis of the global coordinate system of the occupant detection sensor 220 and the x-axis of the region of interest 240 (e.g., as will be described in greater detail below).

The occupant detection sensor 220 may be configured to learn the shape, boundaries, and/or dimensions of the region of interest. For example, the occupant detection sensors 220 may be placed into a learning mode (e.g., in response to an actuation of one of the configuration buttons and/or a message received from the mobile device 140) and an installer may walk around the perimeter of the room to identify the bounds of the region of interest while the occupant detection sensor is in the learning mode. The occupant detection sensor 220 may monitor the movements of the installer in the learning mode and use the locations of the installer to set the shape, boundaries, and/or dimensions of the region of interest.

The occupant detection sensor 220 may be configured to focus on a small region of interest within a large region of interest. For example, the occupant detection sensor 220 may be configured to detect movements of occupants within a room (e.g., within a large region of interest) using a first sensitivity level, and detect movements around a desk or keyboard (e.g., within a small region of interest within the room) using a second sensitivity level that may be greater than the first sensitivity level. The large and small regions of interest and/or the sensitivity levels used in each region may be configured, for example, during the commissioning procedure. Multiple small regions of interest may be configured within a single large region of interest.

The occupant detection sensor 220 may be configured to detect when an occupant enters or exits a region of interest (e.g., the room 230) and use this information to maintain and/or adjust the occupant count for the region of interest. The occupant detection sensor 220 may be configured to learn and/or store knowledge about an entry location (e.g., a doorway) within the region of interest 240. The occupant detection sensor 220 may be configured to track the movements of the occupants to and from the entry location in order to determine when an occupant enters or exits the room 230. The occupant counting sensor 220 may be configured to increase the occupant count when a person enters the room 230 and decrease the occupant count when a person leaves the room. The entry location may be set during the commissioning procedure of the occupant detection sensor 220. For example, the occupant counting sensor 220 may be placed in a learning mode (e.g., in response to an actuation of one of the configuration buttons and/or a message received from the programming device), and the installer may stand at the entry location in order to indicate the entry location to the occupant counting sensor. In addition, the occupant counting sensor 220 may each be configured to automatically learn the entry location, for example, in response to detecting occupants repetitively moving to and from a certain location along the perimeter of the coverage area and/or region of interest during normal operation. The occupant counting sensor 220 may be configured to set more than one entry location for a single room.

The occupant detection sensor 220 may be configured to detect one or more "noise" sources (e.g., a fan) in the coverage area and/or region of interest, and ignore these noise sources when determining the occupant count for the room 230 or a region of interest in the room 230. For example, the occupant detection sensor 220 may be configured to detect a noise source by identifying a harmonic target by its Doppler signature during normal operation. The occupant detection sensor 220 may set or be configured with a masked region over the identified noise source so that the noise source may be ignored when determining the occupant count for the room 230 during normal operation.

The occupant detection sensor 220 may each be configured to track specific occupants (e.g., record and update locations of the occupants) while those occupants are in the room 230. For example, the occupant detection sensor 220 may be configured to detect when a new occupant enters the room 230 (e.g., by detecting that the new occupant has a new tracking number and/or detecting that the new occupant is moving into the room from the entry location). When the new occupant is first detected, the occupant detection sensor 220 may assign the occupant a tracking number and/or an occupant identifier. The occupant detection sensor 220 may be configured to track the occupant as the occupant moves around the room 230 (e.g., using the tracking number and/or the occupant identifier), and track the occupant to a stationary location (e.g., if the occupant sits down at a desk or table). If the occupant "disappears" from the occupant data received from the occupant detection circuit while at the stationary location (e.g., due to minimal or no movement), the occupant detection sensor 220 may be configured to maintain the occupant count for the room 230 and location of the occupant. When the occupant disappears from the occupant data and then reappears (e.g., with a new tracking number), the occupant detection circuit may assign the occupant a new tracking number and/or occupant identifier. However, the occupant detection sensor 220 may be configured to maintain the occupant identifiers for occupants that had been or are presently stationary. The occupant detection sensor 220 may be configured to detect that the occupant has exited the room 230 and cease tracking the occupant (e.g., by deleting the occupant identifier and location information of the occupant from a memory of the occupant detection sensor 220).

The occupant detection sensor 220 may also be configured to determine if the occupant has entered a static area, for example, an area surrounding a desk chair, where the occupant may sit for long periods of time (e.g., may be a stationary occupant). The occupant detection sensor 220 may be configured to maintain the occupant identified and occupant location for occupants that have moved into a static area. A static area may be defined (e.g., during the commissioning procedure) by identifying a location within the region of interest and/or the corners or perimeter of the static area. Multiple static areas may be configured within the region of interest. The occupant detection sensor 220 may be configured to operate in a different mode of operation when the occupant has entered the static area. For example, the occupant detection sensor 220 may be configured to detect occupants in the room (e.g., a large region of interest) using a first sensitivity level when an occupant is not in the static area. When the occupant enters the static area, the occupant detection sensor 220 may then be configured to detect occupants in the room using the first sensitivity level and detect occupants in the static area (e.g., a small region of interest around a keyboard) using a second sensitivity level that is greater than the first sensitivity level.

FIG. 4 is an example block diagram of an example sensor, such as an occupant detection sensor 400 (e.g., the ceiling-mounted occupant detection sensor 180 and/or the wall-mounted occupant detection sensor 182 of FIG. 1). The occupant detection sensor 400 may comprise a sensing circuit such as an occupant detection circuit, e.g., an image sensing circuit, such as a radar detection circuit 410 having a radar detection processor 412. The radar detection processor 412 may comprise, for example, one or more of a microprocessor, a microcontroller, a digital signal processor (DSP), a programmable logic device (PLD), an application specific integrated circuit (ASIC), a field-programmable gate array (FPGA), or any suitable processing device. The occupant detection circuit may comprise a visible image sensing circuit (e.g., including a camera), a thermal imaging circuit (e.g., including a thermopile array), a time-of-flight image sensing circuit, and/or any other sensing or imaging circuit capable of generating a two-dimensional or three-dimensional image or map of the locations of occupants in a room (e.g., the room 102, 230). An example of a visible light sensing circuit is described in greater detail in commonly-assigned U.S. Patent Application Publication No. 2017/0171941, published Jun. 15, 2017, entitled LOAD CONTROL SYSTEM HAVING A VISIBLE LIGHT SENSOR, the entire disclosure of which is hereby incorporated by reference.

The radar detection circuit 410 may also comprise a transmitting antenna array 414 (e.g., a phased array) coupled to the radar occupant detection processor 412 via a radar transmitter circuit 415, and a receiving antenna array 416 (e.g., a phased array) coupled to the radar detection processor 412 via a radar receiver circuit 417. For example, the radar detection circuit 410 may operate using a frequency-modulated continuous wave (FMCW) radar technology. The radar detection circuit 410 may also operate using other types of radar technology, such as, for example, pulsed radar, continuous wave radar, side aperture radar, phased-array radar, mono-static radar, multi-static radar, or other radar technology. The radar detection processor 412 may be configured to build a radar image (e.g., an occupant map) of the coverage area from the signals received from the receiving antenna array 416 (e.g., the phased array) via the radar receiver circuit 417.

The radar detection processor 412 may be configured to transmit a radar signal (e.g., a chirp) via the transmitting antenna array 414, and receive a reflected signal via the receiving antenna array 416. The radar signal may be a frequency-modulated continuous waveform (FMCW) that increases in frequency over a chirp interval $T_{CHIRP}$. The radar detection processor 412 may be configured to process the reflected signal (e.g., as compared to the transmitted radar signal) to determine a Doppler shift of the reflected signal and data regarding a moving body in the room, such as the distance to the moving body, a direction of movement of the moving body, and/or an acceleration of the moving body. The radar detection processor 412 may be configured to transmit a number $N_{CHIRP}$ of chirps during a radar detection event to determine the Doppler shift of the reflected signals due to the moving body in the room. Each radar detection event may last for a radar detection interval (e.g., approximately 5 milliseconds). For example, each radar detection even may include approximately 128 chirps, which may be equally spaced apart (e.g., having a constant frequency). The radar detection events may be spaced apart from each other by, for example, tens of milliseconds.

If two occupant detection sensors 400 are located near each other, the radar detection events of each occupant detection sensor may overlap, which may cause interference with the chirps of each radar detection event. The radar detection processor 412 may be configured to randomize a start time of each radar detection event to avoid consistent overlap of the radar detection events of nearby occupant detection sensors. For example, the radar detection processor 412 may be configured randomize the start time of each radar detection event in increments of 5 milliseconds.

The radar detection processor 412 may be configured to control the transmitting antenna array 414 and/or the receiving antenna array 416 to adjust an angle from the occupant detection sensor 400 at which the moving bodies may be detected. The radar detection processor 412 may be configured to sweep through (e.g., periodically step through) various detection angles and determine data regarding the moving body at each detection angle. At each detection angle, the radar detection processor 412 may transmit a radar signal and receive a reflected signal to process. The radar detection processor 412 may be configured to build a map or image (e.g., a two-dimensional or three-dimensional map or image) of the moving objects in the room from the determined data regarding the moving bodies at each detection angle. The radar detection processor 412 may be configured to determine an occupant count for the room as well as the locations (e.g., X-Y coordinates) of the occupants in the room (e.g., in the global coordinate system 222). The radar detection processor 412 may assign a unique tracking number to each detected occupant in the space.

The occupant detection sensor 400 may also comprise a control circuit 420 that may be connected to the radar detection processor 412 of the radar detection circuit 410 via a communication bus 422. The control circuit 420 may comprise, for example, a microprocessor, a programmable logic device (PLD), a microcontroller, an application specific integrated circuit (ASIC), a field-programmable gate array (FPGA), or any suitable processing device. The control circuit 420 may be configured to receive the occupant count for the room as well as the tracking numbers and the locations (e.g., X-Y coordinates) of the occupants in the room from the radar detection processor 412 via the communication bus 422. Any of the functions and/or procedures executed by the control circuit 420 as described herein could also be implemented (e.g., fully implemented) by the radar detection processor 412.

The occupant detection sensor 400 may comprise one or more memory circuits for storing the occupant count, occupant identifiers, occupant locations, and/or occupancy status (e.g., whether an occupant is stationary). The memory circuit(s) may be implemented as an external integrated circuit (IC) coupled to the control circuit 420 or as an internal circuit of the control circuit 420 and/or the radar detection processor 412. For example, the control circuit 420 may comprise an internal memory 429 and/or the radar detection processor 412 may comprise an internal memory 419. The control circuit 420 may be configured to save different occupant counts that are associated with different time periods in the memory circuit(s) so that a historical view of the occupancy condition of the room (e.g., a usage history) may be derived.

The occupant detection sensor 400 may comprise a user interface 424 including one or more actuators that may be used to configure the occupant detection sensor (e.g., during the commissioning procedure of the load control system 100 of FIG. 1). For example, the user interface 424 may comprise one or more configuration buttons configured to be actuated to cycle through options that define the region of interest of the occupant detection sensor 400. In addition, the user interface 424 may comprise a potentiometer having a knob and/or a digital rotary switch configured to be rotated to adjust a value that defines the region of interest of the occupant detection sensor 400 (e.g., such as the rotation angle $\varphi_R$). Further, the user interface 424 may comprise other input devices, such as a digital DIP switch. The occupant detection sensor 400 may also comprise a compass (e.g., an electronic compass 426) for determining the direction of true north, which may be used to configure the occupant detection sensor, for example, during the commissioning procedure of the load control system 100. In addition, a potentiometer and/or digital rotary switch of the user interface 624 may be used to determine the direction of true north.

The occupant detection sensor 400 may comprise a communication circuit 428 configured to transmit and/or receive messages (e.g., digital messages) via a communication link using a communication protocol. For example, the communication link may comprise a wireless communication link and the communication circuit 428 may comprise an RF transceiver coupled to an antenna. The communication link may comprise a wired digital communication link and the communication circuit 428 may comprise a wired communication circuit. The communication protocol may comprise a proprietary protocol, such as, for example, the ClearConnect protocol. The control circuit 420 may be configured to transmit and/or receive digital messages via the communication link during normal operation of the occupant detection sensor 400. For example, the control circuit 420 may be configured to transmit an indication of a determined occupant count (or a change thereof) of the room to a system controller (e.g., the system controller 110 of FIG. 1). The control circuit 420 may also be able to receive an indication of an occupant count (or a change thereof) of the room determined by another occupant detection sensor. In the latter case, the occupant detection sensor 400 may perform some or all of the functions of a system controller, as described herein.

The occupant detection sensor 400 may comprise a power source 430 for producing a DC supply voltage $V_{CC}$ for powering the radar detection circuit 410, the control circuit 420, the communication circuit 428, and other low-voltage circuitry of the occupant detection sensor 400. The power source 430 may comprise a power supply configured to receive an external supply voltage from an external power source (e.g., an AC mains line voltage power source and/or an external DC power supply). In addition, the power source 430 may comprise a battery for powering the circuitry of the occupant detection sensor 400.

The occupant detection sensor 400 may further comprise a low-power detection circuit 440 (e.g., a low-power occupancy detection circuit), such as a passive infrared (PIR) detector circuit. The low-power detection circuit 440 may generate a PIR detect signal $V_{PIR}$ (e.g., a low-power occupancy signal) that may indicate an occupancy and/or vacancy condition in the space in response to detected passive infrared energy in the room. The low-power detection circuit 440 may consume less power than the radar detection circuit 410. However, the control circuit 420 may be configured to more accurately determine the occupant count in the room using the radar detection circuit 410 (e.g., rather than the low-power detection circuit 440). For example, when the power source 430 is a battery, the control circuit 420 may be configured to disable the radar detection circuit 410 when the low-power detection circuit 440 indicates that the room is vacant. The control circuit 420 may detect an occupancy condition in the space in response to the PIR detect signal $V_{PIR}$ and may subsequently enable the radar detection circuit 410 to determine the occupant count of the room. The control circuit 420 may enable the radar detection circuit 410 after detecting an occupancy condition in the space in response to the PIR detect signal $V_{PIR}$. The control circuit 420 may also keep the radar detection circuit 410 enabled after detecting an occupancy condition in the space (e.g., in response to the PIR detect signal $V_{PIR}$). The control circuit 420 may keep the radar detection circuit 410 enabled until the PIR detect signal $V_{PIR}$ indicates that the space is vacant.

The control circuit 420 may configure the operation of the radar detection circuit 410, for example, by transmitting signals to the radar detection processor 412 via the communication bus 422. The control circuit 420 may configure the operation of the radar detection circuit 410 in response to actuation of the configuration buttons of the user interface 424 and/or receiving messages via the communication circuit 428. For example, the control circuit 420 may be configured to adjust a sensitivity of the occupant detection sensor 400 by adjusting a radar signal-to-noise ratio (SNR) threshold of the radar detection processor 412. In addition, the radar detection processor 412 and/or the control circuit 420 may be configured to adjust the sensitivity of the occupant detection sensor 400 by adjusting a required size of an identified moving body (e.g., to filter out small moving bodies).

The control circuit 420 may be configured to detect occupants within a region of interest of a coverage area of the occupant detection sensor 400. For example, the control circuit may increase the occupant count in response to occupants having a location (e.g., X-Y coordinate) that falls with the region of interest. The region of interest may be defined by one or more X-Y coordinates, for example, of the corners of a square or rectangle, or by the center of a circle of a prescribed radius. The control circuit 420 may also be configured to detect occupancy in a small region of interest within a large region of interest. For example, the control circuit 420 may be configured to detect movement within a room (e.g., within a large region of interest) using a first detection threshold, and detect movement around a keyboard (e.g., within a small region of interest within the room) using a second detection threshold that may be lower than the first detection threshold or by adjusting the velocity threshold of the Doppler processing (e.g., filter out slow or fast moving objects).

Figure 5:
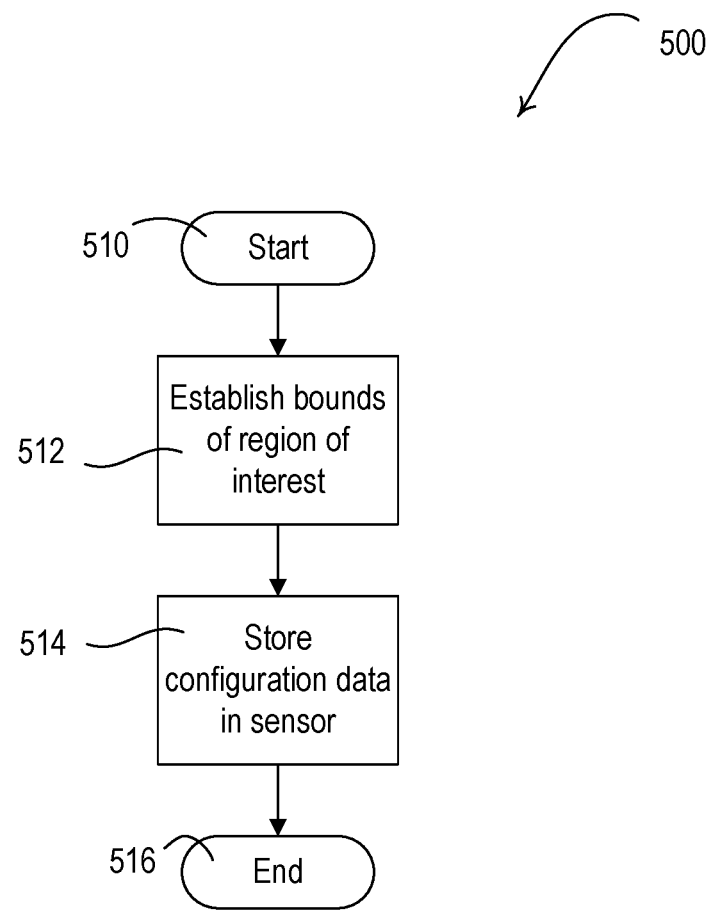
FIGS. 5-19 illustrate example configuration procedures that may be executed to configure an occupant detection sensor.
Figure 6:
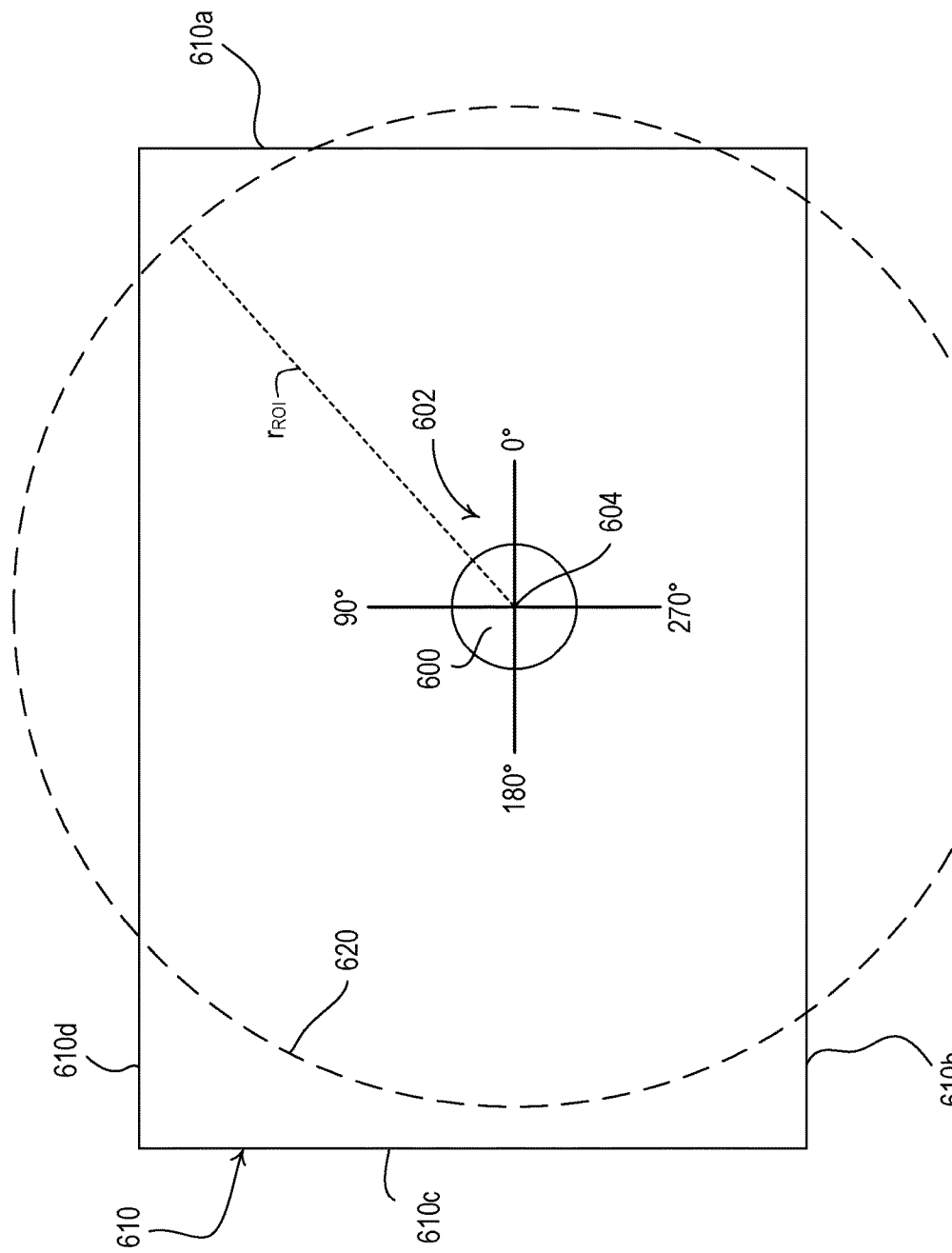

FIG. 5 is a simplified flowchart of an example configuration procedure 500 that may be executed to configure an occupant detection sensor 600 (e.g., the ceiling-mounted occupant detection sensor 180, the wall-mounted occupant detection sensor 182, and/or the occupant detection sensor 400). FIG. 6 is a top-down view of an example room 610 for illustrating the operation of the configuration procedure 500 for the occupant detection sensor 600. For the example in FIG. 6, the example room 610 is rectangular and has four walls 610a-610d. While not shown in FIG. 6, the coverage area of the occupant detection sensor 600 may extend beyond the extents of the room 610, such that the room is fully encompassed by the coverage area. The coverage area of the occupant detection sensor 600 may be characterized by a global coordinate system 602 (e.g., a polar coordinate system) having an origin 604 located at a center point of the occupant detection sensor. The occupant detection sensor 600 may also be characterized by a region of interest 620 that may be circular in shape and may be centered at the origin 604 of the occupant detection sensor 600. The region of interest 620 may be smaller than the coverage area of the occupant detection sensor 600.

The configuration procedure 500 may begin at 510. At 512, bounds (e.g., dimensions or boundaries) of the region of interest may be established. For example, the bounds may be defined by a radius $r_{ROI}$ of the region of interest 620. The radius $r_{ROI}$ of the region of interest 620 may be adjusted by actuating an actuator of a user interface (e.g., the user interface 424). In addition, the radius $r_{ROI}$ of the region of interest 620 may be adjusted using the programming device. For example, the radius $r_{ROI}$ of the region of interest 620 may be received from the programming device in a message (e.g., a digital message received via the communication circuit 428). At 514, the configuration data (e.g., the radius $r_{ROI}$ of the region of interest 620) determined at 512 may be stored in the occupant detection sensor 600. At 516, the configuration procedure 500 may exit. During normal operation of the occupant detection sensor, the control circuit may use the dimensions of the region of interest to determine if the location of the occupant is with the bounds of the region of interest. For example, the control circuit may determine if the distance from the occupant detection circuit to the occupant (e.g., the Z-coordinate defining the location of the occupant as determined by the occupant detection circuit) is less than the radius $r_{ROI}$ of the region of interest 620 to determine if the location of the occupant is with the bounds of the region of interest.

Figure 7:
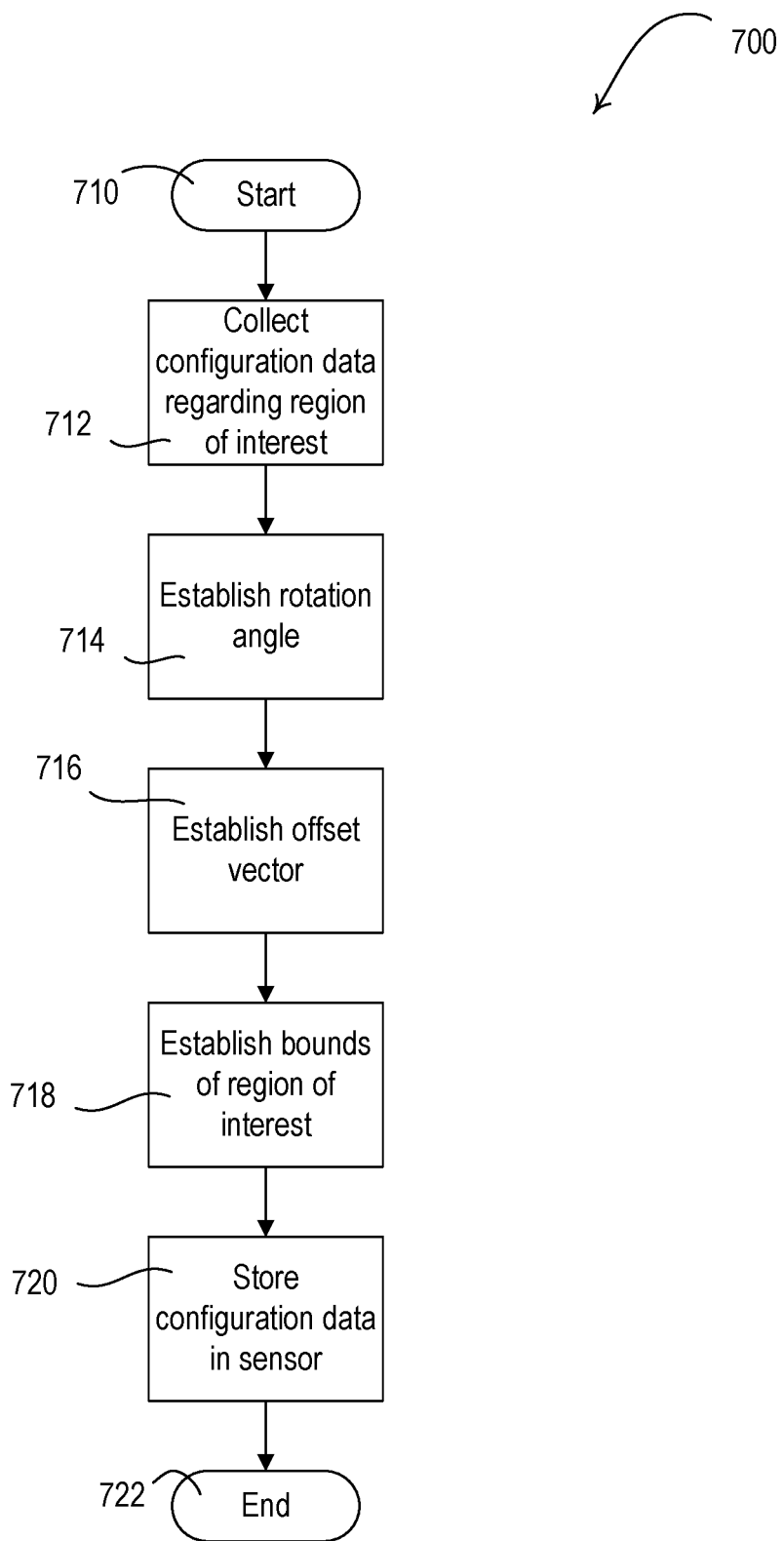

FIG. 7 is a simplified flowchart of an example configuration procedure 700 that may be executed to configure an occupant detection sensor (e.g., the ceiling-mounted occupant detection sensor 180, the wall-mounted occupant detection sensor 182, and/or the occupant detection sensor 400). The configuration procedure 700 may be used to define at least one region of interest (e.g., at least one rectangular region of interest) in a space (e.g., a room) in which the occupant detection sensor is installed. For example, the region of interest may be set to be the entire extents of the room (e.g., within the periphery of the room) or a section of the room. The region of interest may be characterized by a local coordinate system that may or may not be aligned with a global coordinate system of the occupant detection sensor (e.g., the x-axis of the local coordinate system may not be parallel to the x-axis of the global coordinate system). If the room includes multiple regions of interest, the configuration procedure 700 may be repeated multiple times to configure each region of interest.

The configuration procedure 700 may begin at 710. At 712, configuration data regarding the region of interest may be collected, e.g., by a programming device or by the occupant detection sensor itself. For example, a shape of the region of interest (e.g., circle, square, rectangle, or other polygon), dimensions of the region of interest (e.g., radius or diameter if the shape is a circle, length of sides if the shape is as square, or length and width if the shape is a rectangle), and/or information regarding one or more defining features (e.g., corners) of the region of interest may be collected at 712. The configuration data may be collected before or after the occupant detection sensor is installed (e.g., as will be described in greater detail below).

At 714, a rotation angle $\varphi_R$ between the x-axis of the global coordinate system of the occupant detection sensor and the x-axis of the local coordinate system of the region of interest may be established. For example, to establish the rotation angle $\varphi_R$, the occupant detection sensor may be installed with the x-axis of the global coordinate system aligned with (e.g., parallel and/or perpendicular to) one or more walls of the room (e.g., parallel to the x-axis of the region of interest), such that the rotation angle $\varphi_R$ is approximately 0°. The x-axis of the global coordinate system of the occupant detection sensor may be determined from one or more coordinate system indicators on the occupant detection sensor (e.g., as shown in FIGS. 3A-3C). The rotation angle $\varphi_R$ may be established at 714 when the shape of the region of interest is a polygon such as a rectangle (e.g., the operation at 714 may be skipped if the shape of the region of interest is a circle).

The occupant detection sensor may also be installed with the coordinate system indicator not aligned with the one of the walls of the room (e.g., the global coordinate system of the occupant detection sensor may not be aligned with the local coordinate system of the region of interest). In such a case, a programming device, such as the mobile device 140 (e.g., a smart phone) or other suitable programming tool, may be used to establish the rotation angle $\varphi_R$ between the x-axis of the global coordinate system and the x-axis of the local coordinate system at 714 of the configuration procedure 700. For example, the programming device may comprise an internal compass (e.g., an electronic compass). The programming device may be configured to use the electronic compass to determine an angle of the x-axis of the global coordinate system of the occupant detection sensor (e.g., from a recorded image of the coordinate system indicators on the occupant detection sensor) with relation to true north. The programming device may then use the electronic compass to determine the angle of the x-axis of the local coordinate system of the region of interest with relation to true north (e.g., while being held square against one of the walls of the room). The programming device may then calculate the rotation angle $\varphi_R$ between the x-axis of the global coordinate system of the occupant detection sensor and the x-axis of the local coordinate system of the region of interest based on a difference in the respective deviations of the two x-axes from true north.

Further, at 714, the occupant detection sensor may itself be configured to determine the rotation angle $\varphi_R$ (e.g., as part of a self-configuration procedure). For example, commissioning devices or location markers, e.g., radar commissioning devices, such as Doppler phantoms (e.g., a person or object), may be placed in two or more corners of the room or a region of interest. The Doppler phantoms may continuously move (e.g., rotate) in fixed locations during the self-configuration procedure, such that the occupant detection sensor is able to automatically determine the locations of the two or more corners of the room. For example, the Doppler phantoms may be located in one location for a circular region of interest, two corners for a square room, three corners for a rectangular room, and additional corners for a complex-shaped room. Multiple Doppler phantoms may all be located in corners of the room at the same time or a single Doppler phantom may move or may be moved between the corners of the room one at a time. The occupant detection sensor may be configured to calculate the rotation angle $\varphi_R$ using the locations (e.g., X-Y coordinates) of the corners of the room as determined from the Doppler phantoms. In addition, the occupant detection sensor may be configured to determine the locations of the corners of the room in response to an installer tracing (e.g., walking) the perimeter of the room and/or standing while moving slightly in the corners of the room during the self-configuration procedure.

At 716, an offset vector between an origin of the global coordinate system of the occupant detection sensor and an origin of the local coordinate system of the region of interest may be established. For example, the region of interest may include the extents of the room and may be defined by the locations of vertices (e.g., the corners) of the room. The origin of the local coordinate system of the region of interest may be set at a vertex (e.g., a corner) of the room. An installer may measure the distances from the center of the ceiling-mounted occupant detection sensor to each of the walls (e.g., four walls) of the room in which the occupant detection sensor is installed by counting ceiling tiles, using a tape measure, using a laser range finder or using an ultrasonic range finder. The installer may enter the measurements into a configuration application running on the programming device. For example, if the global coordinate system of the occupant detection sensor is aligned with the local coordinate system of the room and/or region of interest, the installer may enter the measurement into the configuration application running on the programming device in a particular order so that the programming device can properly determine the dimensions of the room and/or region of interest as well as the offset vector between the origin of the global coordinate system and the origin of the local coordinate system of the region of interest.

In addition, the programming device may be configured to measure the distances between the occupant detection sensor and the walls of the room at 716, for example, using a distance measuring application or technology of the programming device, such as an optical displacement sensing technique. Further, other measurement tools may be used to measure the distances between the occupant detection sensor and the walls, such as a laser rangefinder and/or a tripod rangefinder. Using the measurements of the room and/or region of interest, the programming device may be configured to calculate the dimensions of the room and/or region of interest as well as the offset vector between the origin of the global coordinate system and the origin of the local coordinate system of the region of interest at 716. In addition, the occupant detection sensor itself may be configured to determine the offset vector in response to the locations (e.g., X-Y coordinates) of the corners of the room (e.g., as determined from one or more Doppler phantoms and/or an installer tracing the perimeter of the room during the self-configuration procedure).

At 718, bounds (e.g., dimensions or boundaries) of the region of interest may be established. For example, the bounds may be set equal to and/or determined from the configuration data collected at 712 (e.g., by the programming device). If the region of interest is a rectangle or square, the bounds may be calculated from the distances between the occupant detection sensor and the walls determined at 716 (e.g., the dimensions of the room). In addition, the occupant detection sensor itself may be configured to calculate the bounds using the locations (e.g., X-Y coordinates) of the corners of the room (e.g., as determined from one or more Doppler phantoms and/or an installer tracing the perimeter of the room during the self-configuration procedure).

At 718, the configuration data (e.g., the rotation angle $\varphi_R$, the offset vector, and/or the dimensions of the region of interest) determined at 712-716 may be stored in the occupant detection sensor. If the configuration data is determined using the programming device, the programming device may be configured to transmit the configuration data to the occupant detection sensor prior to the occupant detection sensor storing the configuration data at 718. Note that if the x-axis of the global coordinate system is aligned with (e.g., parallel and/or perpendicular to) one or more walls of the room (e.g., parallel to the x-axis of the region of interest), the rotation angle $\varphi_R$ may be included in the configuration data and set to 0°, or the rotation angle may not be included in the configuration data. In the latter case, the occupant detection sensor may determine that the rotation angle is 0°. At 720, the configuration procedure 700 may exit.

During normal operation of the occupant detection sensor, the control circuit may use the rotation angle $\varphi_R$ and/or the offset vector to convert (e.g., transform) a location in the global coordinate system of the occupant detection sensor (e.g., as determined by the occupant detection circuit) to a location in the local coordinate system of the region of interest (as will be described in greater detail below). The control circuit may use the dimensions of the region of interest to determine if the location in the local coordinate system is with the bounds of the region of interest. During the configuration procedure 700, the control circuit may also transform locations of the vertices (e.g., corners) of the region of interest in the global coordinate system into locations of the vertices of the region of interest in the local coordinate system. For example, the control circuit may use the locations of the vertices of the region of interest in the local coordinate system for further configuration of the occupant detection sensor (e.g., during normal operation).

Figure 8:
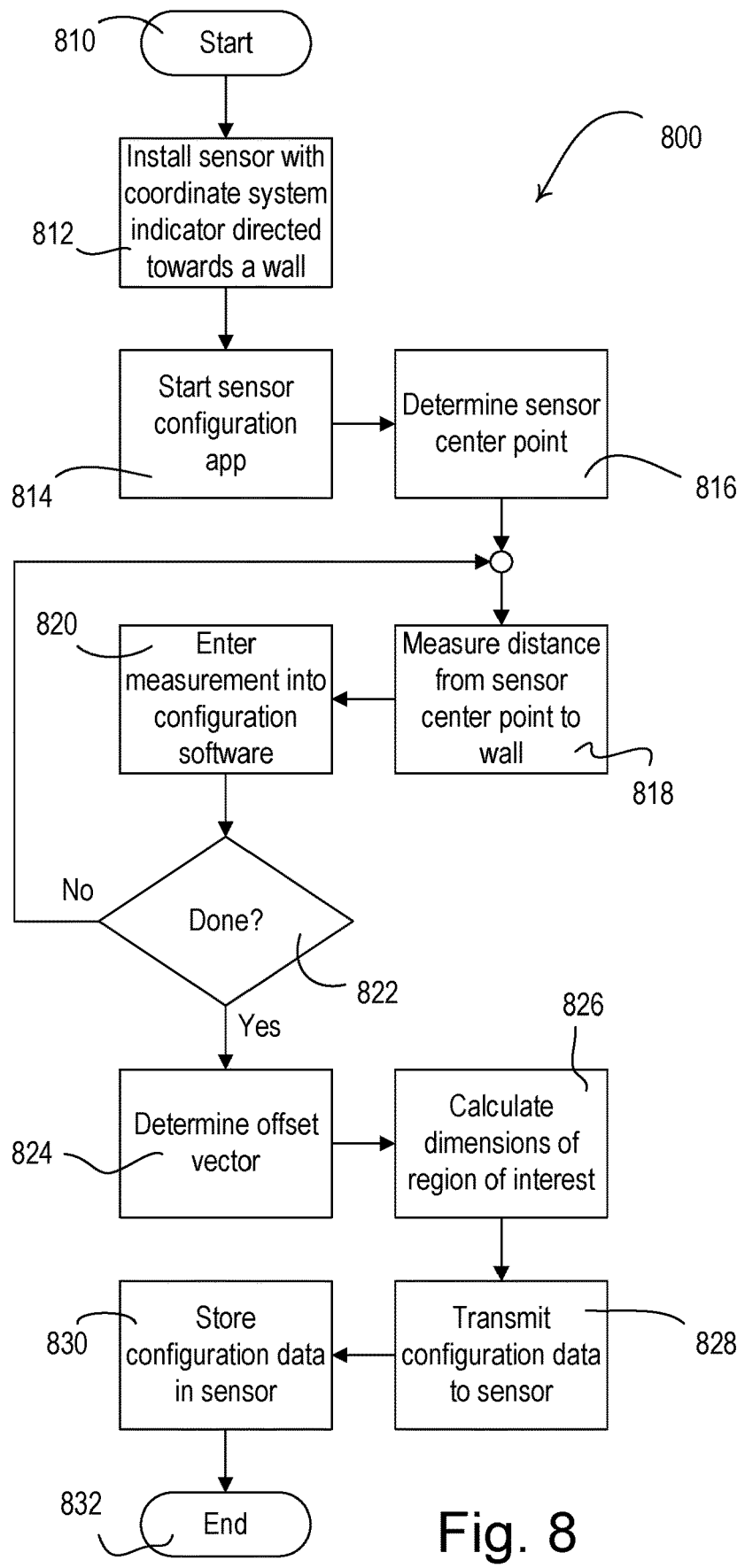
Figure 9:
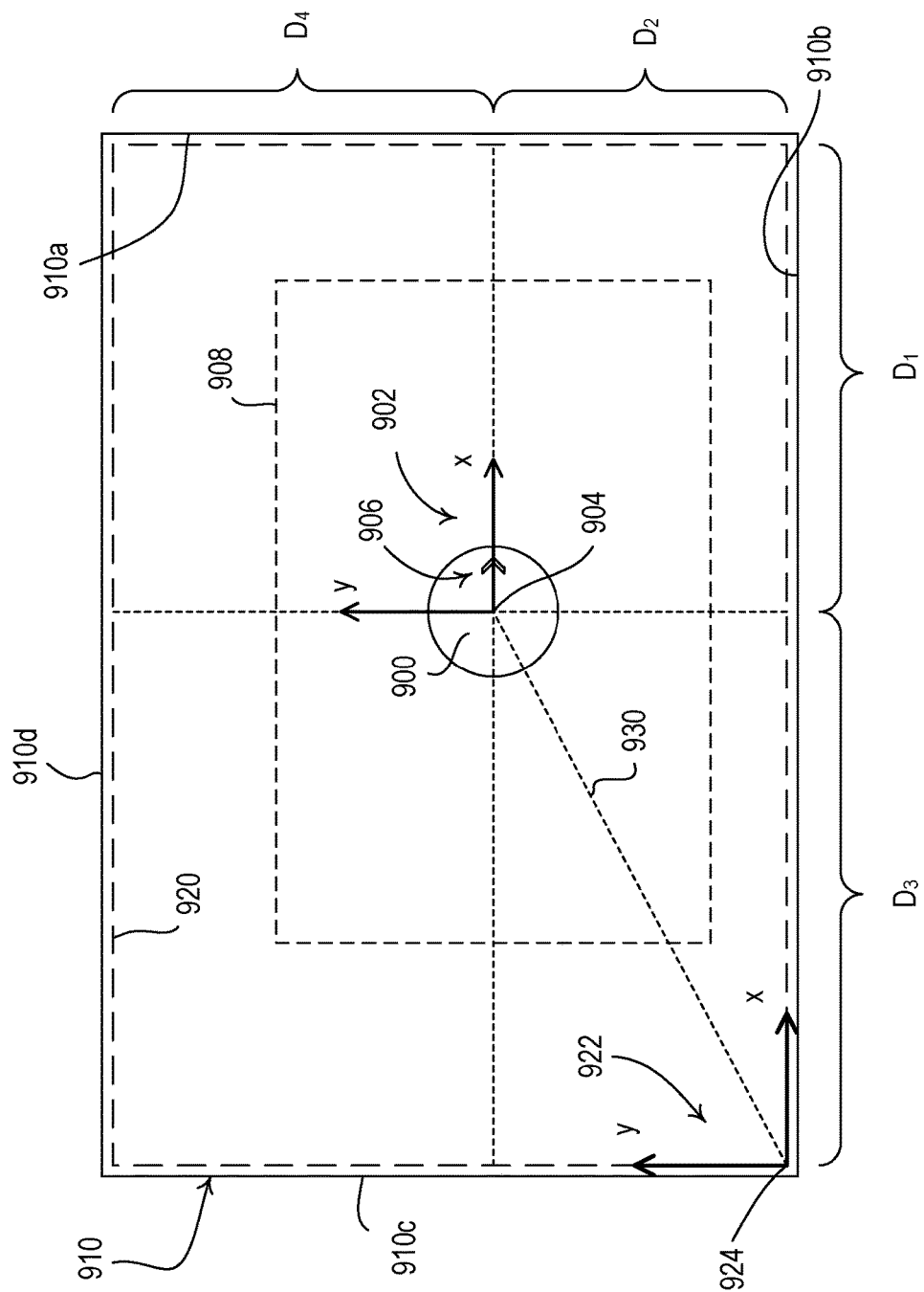

FIG. 8 is a simplified flowchart of an example configuration procedure 800 that may be executed to configure an occupant detection sensor 900 (e.g., the ceiling-mounted occupant detection sensor 180, the wall-mounted occupant detection sensor 182, and/or the occupant detection sensor 400). FIG. 9 is a top-down view of an example room 910 for illustrating the operation of the configuration procedure 800 for the occupant detection sensor 900. For the example in FIG. 9, the example room 910 is rectangular and has four walls 910a-910d. While not shown in FIG. 9, the coverage area of the occupant detection sensor 900 may extend beyond the extents of the room 910, such that the room is fully encompassed by the coverage area. The coverage area of the occupant detection sensor 900 may be characterized by a global coordinate system 902 having an origin 904 located at a center point of the occupant detection sensor. The occupant detection sensor 900 may comprise a coordinate system indicator 906 (e.g., an arrow) for indicating the direction of the x-axis and/or y-axis of the global coordinate system 902. The occupant detection sensor 900 may also be characterized by an initial region of interest 908 (e.g., an out-of-box region of interest with which the occupant detection sensor 900 may be configured when first installed and powered on). The initial region of interest 908 may be rectangular in shape with the longer sides parallel to the x-axis of the global coordinate system 902.

The configuration procedure 800 may be executed to configure a desired region of interest 920, which may be, for example, the extents of the room 910. The desired region of interest 920 may be characterized by a local coordinate system 922 having an origin 924 located at one of the corners of the desired region of interest. The desired region of interest 920 may be aligned with the walls of the room 910. As shown in FIG. 9, the x-axis of the local coordinate system 922 of the desired region of interest 920 may be aligned with (e.g., parallel to) the x-axis of the global coordinate system 902 of the occupant detection sensor 900. The local coordinate system 922 may be offset from the global coordinate system 902 by an offset vector 930.

The configuration procedure 800 may begin at 810. At 812, an installer may install the occupant detection sensor 900 with the coordinate system indicator 906 directed towards one of the walls 910a-910b of the room 910. For example, the coordinate system indicator 914 may be directed to one of the shorter walls 910a of the room 910, such that the x-axis of the global coordinate system 902 is perpendicular to the shorter walls 910a, 910c and parallel with the longer walls 910b, 910d. Since the x-axis of the global coordinate system 902 is parallel to the x-axis of the local coordinate system 922, the rotation angle $\varphi_R$ between the x-axis of the global coordinate system 902 and the x-axis of the local coordinate system 922 may be established as approximately 0° at 812 due to the installation of the occupant detection sensor with the coordinate system indicator 906 directed towards one of the walls 910a-910b of the room 910. In addition, the global coordinate system 902 and the local coordinate system 922 may be aligned (e.g., having x-axes and y-axes extending in the same directions), and may be offset from one another by the offset vector 930. For example, the occupant detection sensor 900 may be rotatably mounted to a base portion, such that the respective the occupant detection sensor 900 may be easily rotated to direct the coordinate system indicator 906 in the appropriate direction (e.g., towards one of the walls 901a-910d). An example of a sensor that is rotatable is described in greater detail in commonly-assigned U.S. Pat. No. 9,568,356, issued Feb. 14, 2017, entitled SENSOR HAVING A ROTATABLE ENCLOSURE, the entire disclosure of which is hereby incorporated by reference.

At 814, the installer may start a sensor configuration software (e.g., a sensor configuration app) on a programming device, such as the mobile device 140 (e.g., a smart phone). At 816, the installer may determine the center point of the occupant detection sensor 900 (e.g., the origin 904 of the global coordinate system 902). For example, the installer may determine the location on the floor immediately below the location at which the occupant detection sensor 900 is located on the ceiling. In addition, the installer may hang a plumb bob from the occupant detection sensor 900 (e.g., aligned with the boresight) to identify the center point of the occupant detection sensor. For example, the occupant detection sensor 900 may comprise an attachment mechanism, such as a hook (not shown), at the center of the downward-facing surface of the occupant detection sensor for connecting to a cord of the plumb bob. Further, the occupant detection sensor 900 may comprise a laser emitter circuit (not shown) that may be located at the center of the occupant detection sensor and aligned with the boresight. The laser emitter circuit may shine a laser beam onto the floor below the center of the occupant detection sensor. The programming device may transmit a digital message to the occupant detection sensor 900 to cause the occupant detection sensor to enable the laser emitting circuit in response the sensor configuration software starting at 814. In addition, the occupant detection sensor 900 may enable the laser emitting circuit in response to the installer actuating a button on the occupant detection sensor.

At 818, the installer may measure a distance between the center point of the occupant detection sensor 900 and one of the walls 910a-910d. For example, the installer may first measure a distance $D_1$ (e.g., as shown in FIG. 9) between the center point of the occupant detection sensor 900 and the wall 910a to which the coordinate system indicator 906 is pointing. At 820, the installer may then enter the measurement of the distance (e.g., the distance $D_1$ between the center point of the occupant detection sensor 900 and the wall 910a) into the sensor configuration software running on the programming device. If there are more walls to which to measure the distance from the center of the occupant detection sensor 900 at 822 (e.g., the installer is not done measuring distances), the installer may once again measure a distance between the center point of the occupant detection sensor 900 and one of the other walls 910a-910d at 818, and enter the measurement into the sensor configuration software running on the programming device at 820. For example, the second time that 818 is completed, the installer may measure a distance $D_2$ between the center point of the occupant detection sensor 900 and the wall 910b. The installer may continue to measure the distances $D_3$, $D_4$ between the center point of the occupant detection sensor 900 and the walls 910c, 910d at 818 and enter the measurement into the sensor configuration software running on the programming device at 820, until there are no more walls to which to measure the distance from the center of the occupant detection sensor 900 at 822. For example, the installer may move between the walls 910a-910d in a clockwise manner in order to measure and store the distance $D_1$-$D_4$ into the sensor configuration software in that order.

When the installer is done measuring distances at 822, the programming device (e.g., the sensor configuration software running on the programming device) may determine an offset vector ($x_{OFF}$, $y_{OFF}$) (e.g., the offset vector 930 shown in FIG. 9) at 824. For example, the programming device may calculate the offset vector ($x_{OFF}$, $y_{OFF}$) from two of the distances $D_1$-$D_4$ measured at 818, e.g., $x_{OFF}$=-$D_3$ and $y_{OFF}$=-$D_2$. At 826, the programming device may determine dimensions $X_{ROI}$, $Y_{ROI}$ of the region of the interest (e.g., the desired region of interest 920). For example, the programming device may calculate the dimensions $X_{ROI}$, $Y_{ROI}$ of the region of interest 920 from the distances $D_1$-$D_4$ measured at 818, e.g., $X_{ROI}$=$D_1$+$D_3$ and $Y_{ROI}$=$D_2$+$D_4$.

At 828, the programming device may transmit (e.g., directly transmit) the sensor configuration data to the occupant detection sensor 900. For example, the sensor configuration data may include the rotation angle $\varphi_R$ (e.g., approximately 0°), the offset vector ($x_{OFF}$, $y_{OFF}$), and/or the dimensions $X_{ROI}$, $Y_{ROI}$ of the region of the interest. In addition, the programming device may transmit the sensor configuration data to another control device (e.g., the system controller 110 of the load control system 100), which may then transmit the sensor configuration data to the occupant detection sensor 900. At 830, the occupant detection sensor 900 may store the sensor configuration data in memory, before the configuration procedure 800 exits.

Figure 10:
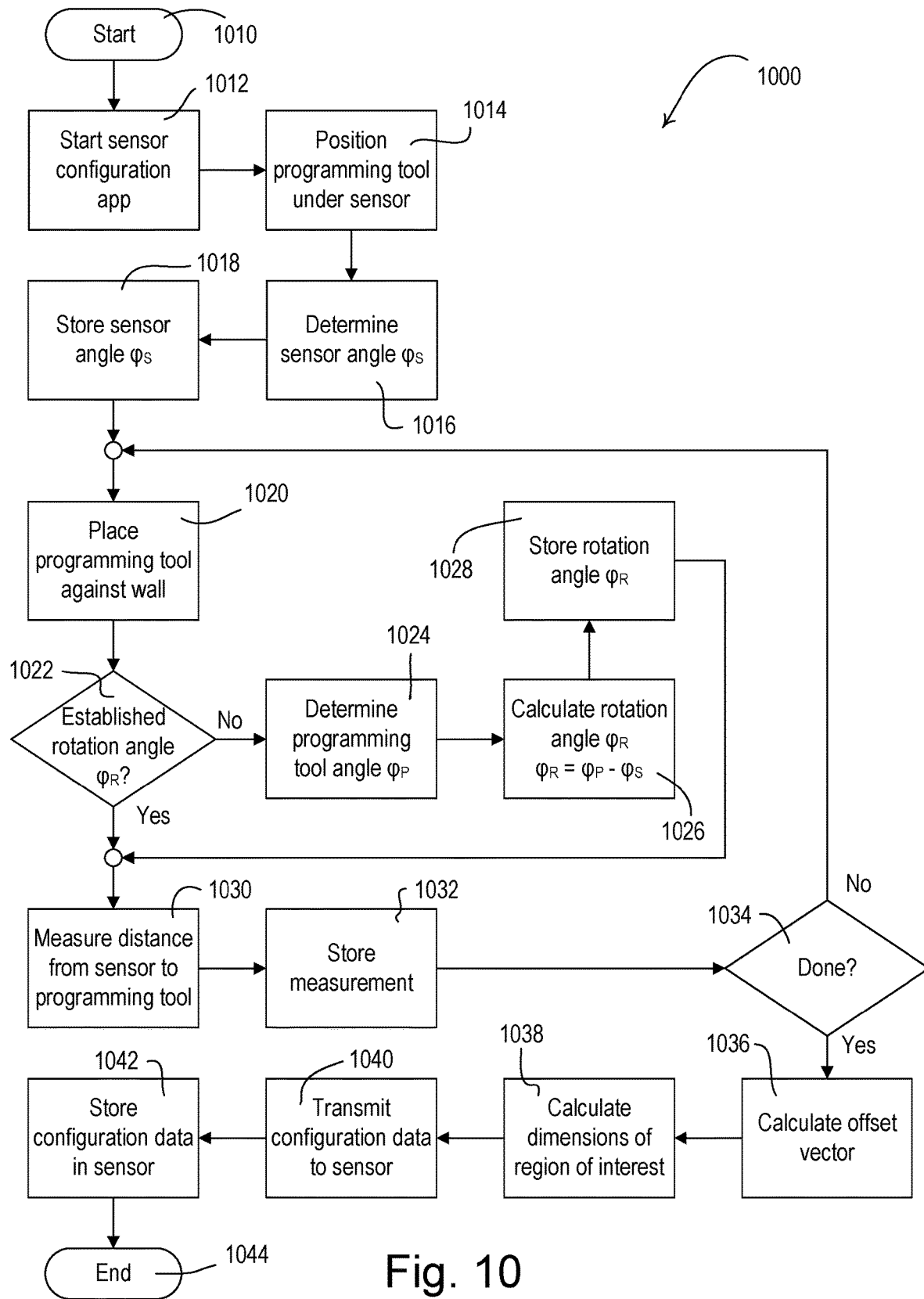
Figure 11:
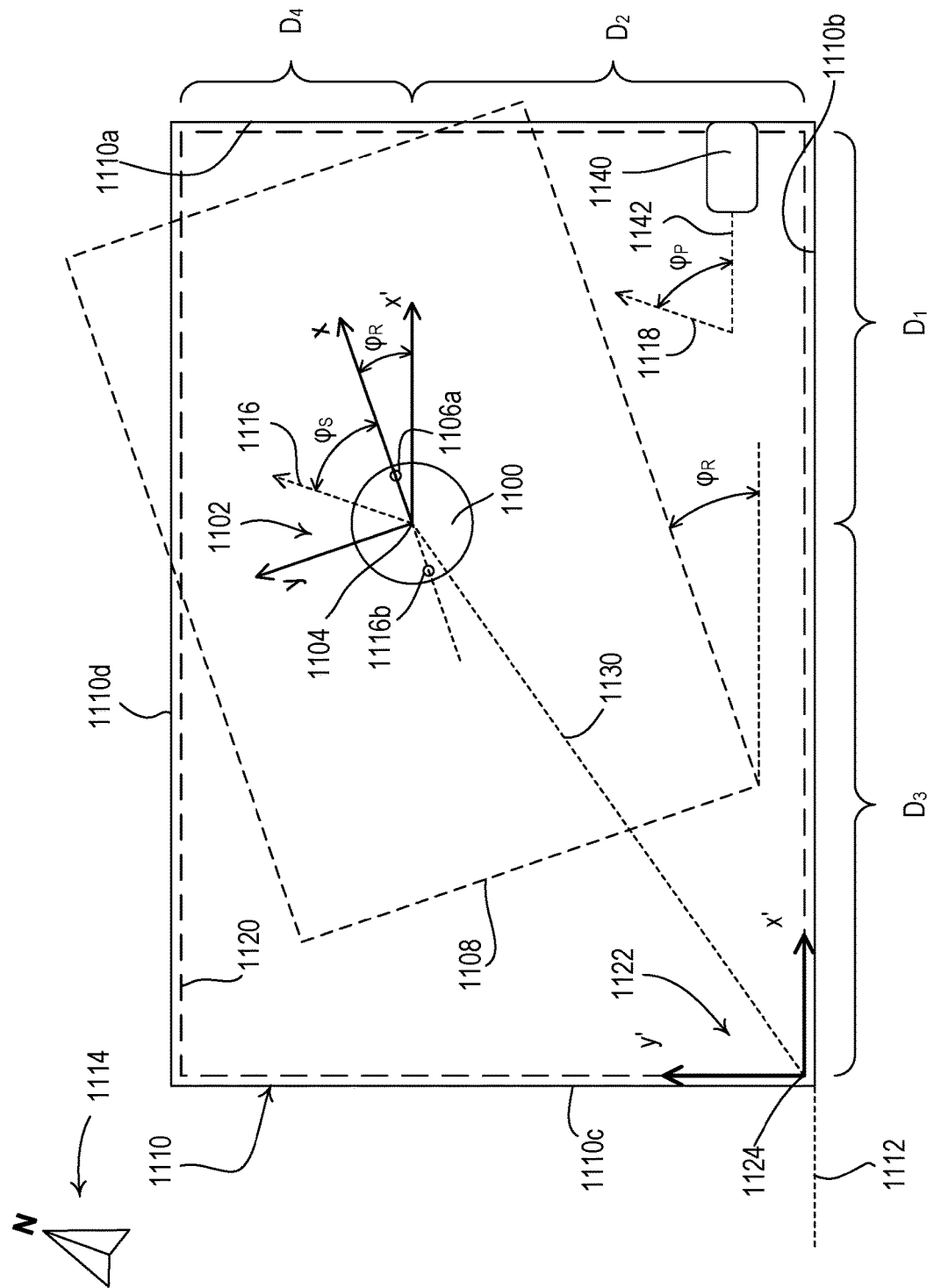

FIG. 10 is a simplified flowchart of an example configuration procedure 1000 that may be executed to configure an occupant detection sensor 1100 (e.g., the ceiling-mounted occupant detection sensor 180, the wall-mounted occupant detection sensor 182, and/or the occupant detection sensor 400). FIG. 11 is a top-down view of an example room 1110 for illustrating the operation of the configuration procedure 1000 for the occupant detection sensor 1100. For the example of FIG. 11, the example room 1110 may be rectangular with four walls 1110a-1110d, and the coverage area of the occupant detection sensor 1100 may extend beyond the extents of the room 1110, such that the room is fully encompassed by the coverage area. The coverage area of the occupant detection sensor 1100 may be characterized by a global coordinate system 1102 having an origin 1104 located at a center point of the occupant detection sensor. The occupant detection sensor 1100 may comprise coordinate system indicators 1106a, 1106b (e.g., light sources) for indicating the direction of the x-axis of the global coordinate system 1102. For example, the first coordinate system indicator 1106a may comprise a green LED and the second coordinate system indicator 1106b may comprise a red LED. The occupant detection sensor 1100 may also be characterized by an initial region of interest 1108 (e.g., an out-of-box region of interest with which the occupant detection sensor 1100 may be configured when first installed and powered on).

The configuration procedure 1000 may be executed to configure a desired region of interest 1120, which may be, for example, the extents of the room 1110. The desired region of interest 1120 may be characterized by a local coordinate system 1122 having an origin 1124 located at one of the corners of the desired region of interest. The desired region of interest 1120 may be aligned with the wall of the room 1110. As shown in FIG. 11, the x-axis of the global coordinate system 1102 of the occupant detection sensor 1100 may not be aligned with the x-axis of the local coordinate system 1122 of the desired region of interest 1120. For example, a rotation angle $\varphi_R$ may exist between the x-axis of the global coordinate system 1102 and the x-axis of the local coordinate system 1122. The local coordinate system 1122 may also be offset from the global coordinate system 1102 by an offset vector 1130.

The configuration procedure 1000 may be executed using a programming device 1140, such as the mobile device 140 (e.g., a smart phone). The programming device 1140 may comprise a visible light sensing circuit (e.g., a camera) for recording images (e.g., of the room 1110 and/or the occupant detection sensor 1100). In addition, the programming device 1140 may comprise an internal compass (e.g., an electronic compass) for determining the direction of true north (e.g., as indicated by a north indicator 1114 on FIG. 11). The programming device 1140 may be characterized by a programming device axis 1142 that may extend from one of the sides of the programming device (e.g., a top side). The programming device 1140 may be configured to use the internal electronic compass to the determine a programming device angle $\varphi_P$ between the programming device axis 1142 and a true north axis 1118 (e.g., that extends towards true north as indicated by the north indicator 1114 on FIG. 11).

The configuration procedure 1000 may begin at 1010. At 1012, an installer may start a sensor configuration software (e.g., a sensor configuration app) on the programming device 1140. At 1014, the installer may position the programming device 1140 below (e.g., approximately below) the occupant detection sensor 1100. At 1016, the programming device 1140 (e.g., the sensor configuration software running on the programming device) may determine a sensor angle $\varphi_S$ between the x-axis of the global coordinate system 1102 of the occupant detection sensor 1100 and a true north axis 1116 (e.g., that extends towards true north as indicated by the north indicator 1114 on FIG. 11). For example, the programming device 1140 may be configured to record an image of the occupant detection sensor 1100 using the camera (e.g., while the programming device is located under the occupant detection sensor). The programming device 1140 may be configured to determine the x-axis of the global coordinate system 1102 of the occupant detection sensor 1100 by determining the location of the coordinate system indicators 1106a, 1106b in the image. For example, the programming device may 1140 be configured to process the image to determine location of the x-axis of the global coordinate system 1102 along a line extending between the coordinate system indicators 1106a, 1106b with the first coordinate system indicator 1106a located on the side of the occupant detection sensor in which the x-axis of the global coordinate system 1102 extends (e.g., the position direction of the x-axis of the global coordinate system 1102). The occupant detection sensor 1110 may be configured to turn on the coordinate system indicators 1106a, 1106b in response receiving a digital message from the programming device 1140 (e.g., when the sensor configuration app is started at 1012) and/or in response to an actuation of a button on the occupant detection sensor. The programming device 1140 may be configured to use the internal electronic compass to determine the sensor angle $\varphi_S$ between the x-axis of the global coordinate system 1102 of the occupant detection sensor 1100 and the true north axis 1116. At 1018, the programming device 1140 may store the sensor angle $\varphi_S$ in memory.

At 1020, the installer may place the edge of the programming device 1140 square against one of the walls 1110a-1110d of the room. For example, the installer may first place the programming device 1140 against the wall 1110a to which the first coordinate system indicator 1106a is closest. The installer may place the programming device 1140 against the wall 1110a with one of the sides and/or surfaces of the programming device (e.g., the top side) flat and square against the wall, such that the programming device axis 1142 is parallel with the x-axis of the local coordinate system 1122 of the region of interest 1120. In addition, the installer may place the programming device 1140 against the wall 1110a with the camera facing upwards to enable the programming device to record an image of the occupant detection sensor 1100 while the programming device is against the wall.

If the programming device 1140 has not already established the rotation angle $\varphi_R$ between the x-axis of the global coordinate system 1102 and the x-axis of the local coordinate system 1122 at 1022, the programming device may use the internal electronic compass to determine the programming device angle (p between the programming device axis 1142 and the true north axis 1118 at 1024. Since the programming device 1140 is being held against the wall such that the programming device axis 1142 is parallel to the x-axis of the local coordinate system 1122, the programming device angle $\varphi_P$ may be representative of a room angle between the x-axis of the local coordinate system 1122 and the true north axis 1118. At 1026, the programming device 1140 may calculate the rotation angle $\varphi_R$ between the x-axis of the global coordinate system 1102 and the x-axis of the local coordinate system 1122 by subtracting the sensor angle $\varphi_S$ from the programming device angle $\varphi_P$, e.g., $\varphi_R=\varphi_P-\varphi_S$. At 1028, the programming device 1140 may store the programming device angle $\varphi_P$ in memory.

At 1030, the programming device 1140 may determine the distance (e.g., the distance $D_1$) between the wall 1110a and the center point of the occupant detection sensor 1100. For example, the programming device 1140 may record an image of the occupant detection sensor 1100 and use an optical displacement sensing technique to measure the distance between the wall 1110a and the center point of the occupant detection sensor 1100 (e.g., using the locations of the first and second coordinate system indicators 1106a, 1106b in the recorded image). At 1032, the programming device 1140 may store the measurement of the distance (e.g., distance $D_1$) in memory. If there are more walls to which to measure the distance from the center of the occupant detection sensor 1100 at 1034 (e.g., the programming device 1140 is not done measuring distances), the installer may place the programming device 1140 against one of the other walls 1110a-1110d of the room at 1020. For example, the second time that 1020 is completed, the installer may place the programming device 1040 against the second wall 1110b. Since the programming device 1040 has already established the rotation angle $\varphi_R$ at 1022, the programming device may next measure a distance $D_2$ between the wall 1110b and the center point of the occupant detection sensor 1100 at 1030 and store the measurement in memory at 1032. The programming device 1140 may be placed against the other walls 1110c, 110d in order to measure and store the distances $D_3$, $D_4$ between the walls and the center point of the occupant detection sensor 1100, until there are no more walls to which to measure the distance from the center of the occupant detection sensor 1100 at 1034. For example, the installer may place the programming device 1140 against the walls 1110a-1110d in a clockwise manner to measure and store the distances D1-D4 in that order.

When the programming device 1140 is done measuring distances at 1034, the programming device 1140 may determine an offset vector ($x_{OFF}$, $y_{OFF}$) (e.g., the offset vector 1130 shown in FIG. 11) at 1036. For example, the programming device 1140 may determine the offset vector ($x_{OFF}$, $y_{OFF}$) from two of the distances $D_1$-$D_4$ measured at 1030, e.g., $x_{OFF}=-D_3$ and $y_{OFF}=-D_2$. At 1038, the programming device may determine dimensions $X_{ROI}$, $Y_{ROI}$ of the region of the interest (e.g., the desired region of interest 1120). For example, the programming device may calculate the dimensions $X_{ROI}$, $Y_{ROI}$ from the distances $D_1$-$D_4$ measured at 1030, e.g., $X_{ROI}=D_1+D_3$ and $Y_{ROI}=D_2+D_4$.

At 1040, the programming device 1140 may transmit (e.g., directly transmit) the sensor configuration data to the occupant detection sensor 1100. For example, the sensor configuration data may include the rotation angle $\varphi_R$, the offset vector ($x_{OFF}$, $y_{OFF}$), and/or the dimensions $X_{ROI}$, $Y_{ROI}$ of the desired region of the interest 1120. In addition, the programming device 1140 may transmit the sensor configuration data to another control device (e.g., the system controller 110 of the load control system 100), which may then transmit the sensor configuration data to the occupant detection sensor 1100. At 1042, the occupant detection sensor 1100 may store the sensor configuration data in memory, before the configuration procedure 1000 exits at 1044.

Figure 12:
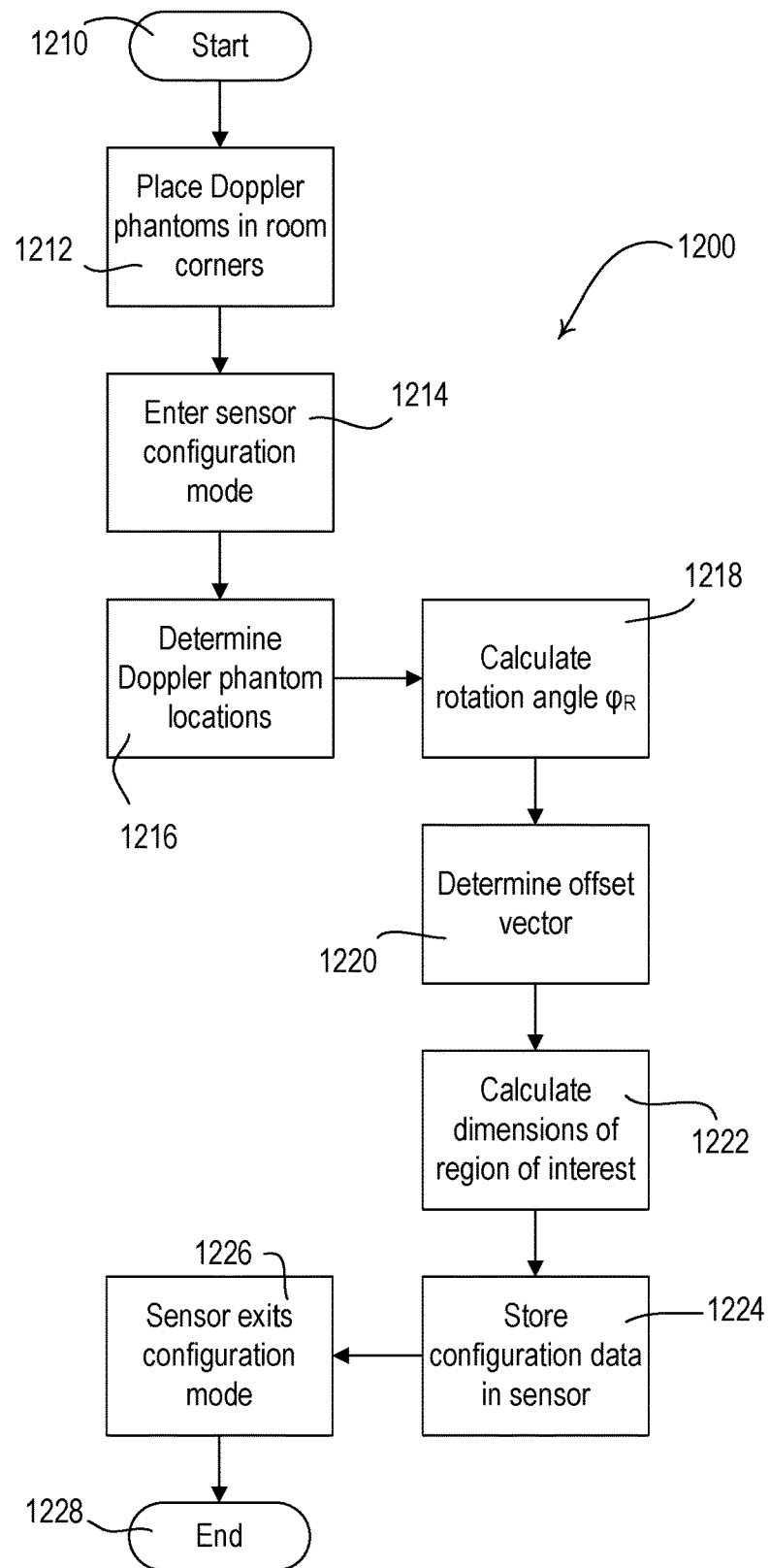
Figure 13:
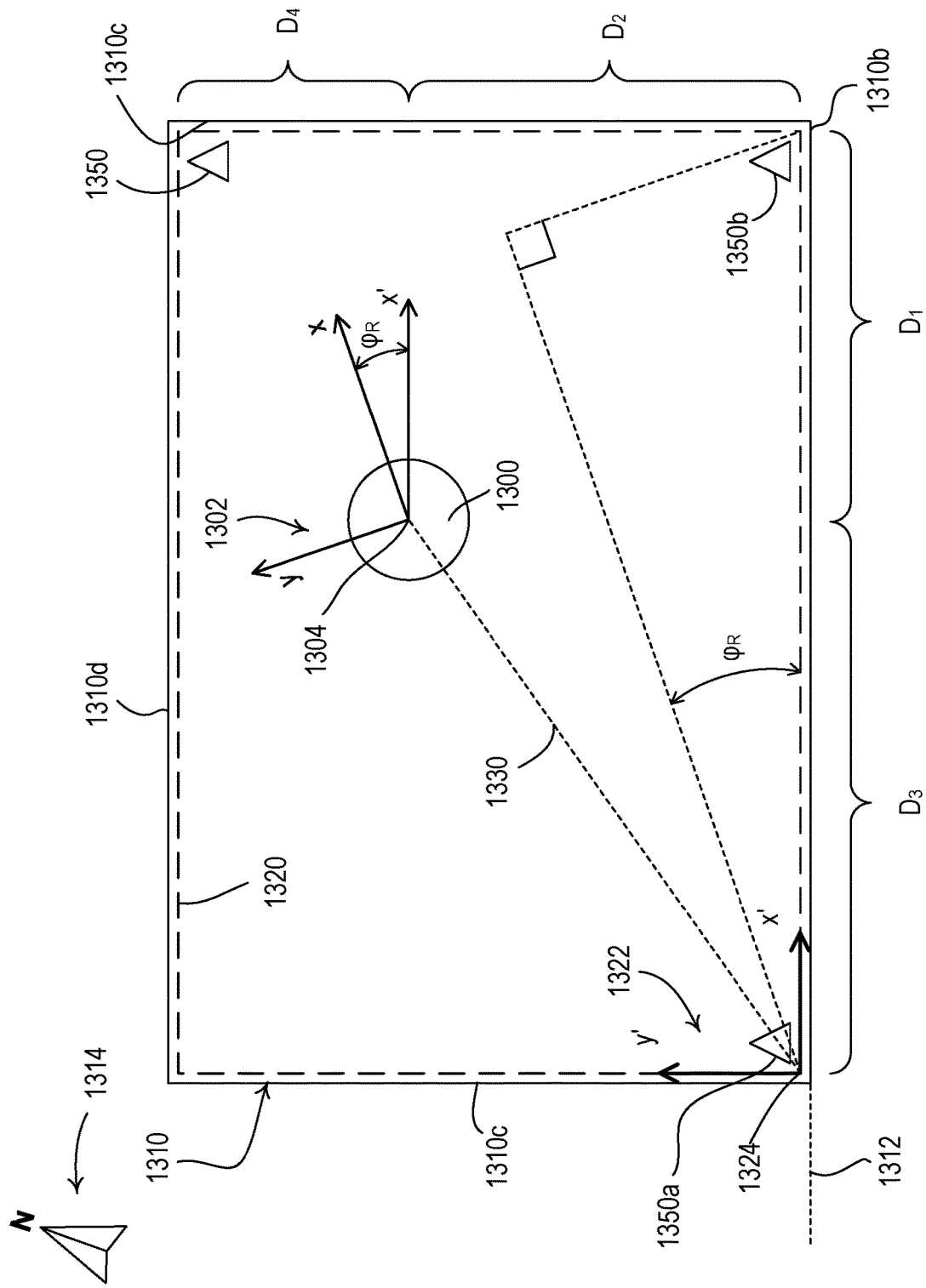

FIG. 12 is a simplified flowchart of an example configuration procedure 1200 that may be executed to configure an occupant detection sensor 1300 (e.g., the ceiling-mounted occupant detection sensor 180, the wall-mounted occupant detection sensor 182, and/or the occupant detection sensor 400). FIG. 13 is a top-down view of an example room 1310 for illustrating the operation of the configuration procedure 1200 for the occupant detection sensor 1300. For the example of FIG. 13, the example room 1310 may be rectangular with four walls 1310a-1310d, and the coverage area of the occupant detection sensor 1300 may extend beyond the extents of the room 1310, such that the room is fully encompassed by the coverage area. The coverage area of the occupant detection sensor 1300 may be characterized by a global coordinate system 1302 having an origin 1304 located at a center point of the occupant detection sensor. The occupant detection sensor 1300 may also be characterized by an initial region of interest (not shown) similar to the initial region of interest 1108 shown in FIG. 11.

The configuration procedure 1200 may be executed to configure a desired region of interest 1320, which may be, for example, the extents of the room 1310. The desired region of interest 1320 may be characterized by a local coordinate system 1322 having an origin 1324 located at one of the corners of the desired region of interest. The desired region of interest 1320 may be aligned with the walls of the room 1310. As shown in FIG. 13, the x-axis of the global coordinate system 1302 of the occupant detection sensor 1300 may not be aligned with the x-axis of the local coordinate system 1322 of the desired region of interest 1320. For example, a rotation angle $\varphi_R$ may exist between the x-axis of the global coordinate system 1302 and the x-axis of the local coordinate system 1322. The local coordinate system 1322 may also be offset from the global coordinate system 1302 by an offset vector 1330.

The configuration procedure 1200 may be primarily executed by a control circuit of the occupant detection sensor 1300 (e.g., the radar detection processor 412 and/or the control circuit 420 of the occupant detection sensor 400), for example, as part of a self-configuration procedure. The configuration procedure 1200 may be executed with one or more commissioning devices or location markers, such as Doppler phantoms 1350a, 1350b, 1350c, located in two or more corners of the room 1310. Since the room 1310 is rectangularly shaped, the room 1310 may have Doppler phantoms 1350a, 1350b, 1350c in three corners.

The configuration procedure 1200 may begin at 1210. At 1212, an installer may place the Doppler phantoms 1350 in two or more corners of the room 1310 (e.g., three corners as shown in FIG. 13). At 1214, an installer may cause the occupant detection sensor to enter a sensor configuration mode (e.g., a self-configuration mode). The installer may cause the occupant detection sensor to enter the sensor configuration mode while the installer is not located in the room 1310 (e.g., such that the occupant detection sensor 1300 may not mistake the installer for one of the Doppler phantoms 1350a-1350c). For example, the installer may use a sensor configuration software (e.g., a sensor configuration app) running on a programming device, such as the mobile device 140 (e.g., a smart phone) to transmit (e.g., directly transmit) a message to the occupant detection sensor to cause the occupant detection sensor to enter the sensor configuration mode. In addition, the installer may shine a laser pointer on a laser receiving circuit (not shown) in the occupant detection sensor 1300 to cause the occupant detection sensor to enter the sensor configuration mode.

At 1216, the occupant detection sensor (e.g., the control circuit of the occupant detection sensor) may determine locations $(x_a, y_a)$, $(x_b, y_b)$, $(x_c, y_c)$ of the respective Doppler phantoms 1350a, 1350b, 1350c in the global coordinate system 1302. At 1218, the occupant detection sensor 1300 may be configured to calculate the rotation angle $\varphi_R$ using the locations of two of the Doppler phantoms 1350a-1350c. For example, the occupant detection sensor 1300 may be configured use the locations $(x_a, y_a)$, $(x_b, y_b)$ of the Doppler phantoms 1350a, 1350b to calculate the rotation angle $\varphi_R$, e.g., $$\varphi_R = \tan^{-1}\left(\frac{y_a - y_b}{x_a - x_b}\right).$$

For example, the control circuit of the occupant detection sensor 1300 may be configured to calculate the arctangent function (e.g., $\tan^{-1}$) and/or may have the solutions to the arctangent function stored in memory. At 1220, the occupant detection sensor 1300 may determine an offset vector $(x_{OFF}, y_{OFF})$ (e.g., the offset vector 1330 shown in FIG. 13). For example, the occupant detection sensor 1300 may be configured to determine the offset vector $(x_{OFF}, y_{OFF})$ from the locations $(x_a, y_a)$ of one of the Doppler phantoms 1350a, e.g., $x_{OFF}=-x_a$ and $y_{OFF}=-y_a$.

At 1222, the occupant detection sensor 1300 may determine dimensions $X_{ROI}, Y_{ROI}$ of the region of the interest (e.g., the desired region of interest 1320). For example, the occupant detection sensor 1300 may be configured to calculate the dimensions $X_{ROI}, Y_{ROI}$ using the locations $(x_a, y_a)$, $(x_b, y_b)$, $(x_a, y_c)$ of all three Doppler phantoms 1350a, 1350b, 1350c, e.g., $X_{ROI}=\text{sqrt}[(y_a-y_b)^2+(x_a-x_b)^2]$; and $Y_{ROI}=\text{sqrt}[(y_b-y_c)^2+(x_b-x_c)^2]$ At 1224, the occupant detection sensor 1200 may store the sensor configuration data in memory. For example, the sensor configuration data may include the rotation angle $\varphi_R$, the offset vector $(x_{OFF}, y_{OFF})$, and/or the dimensions $X_{ROI}, Y_{ROI}$ of the desired region of the interest 1320. At 1226, the occupant detection sensor 1300 may exit the sensor configuration mode, before the configuration procedure 1200 exits at 1228.

Figure 14:
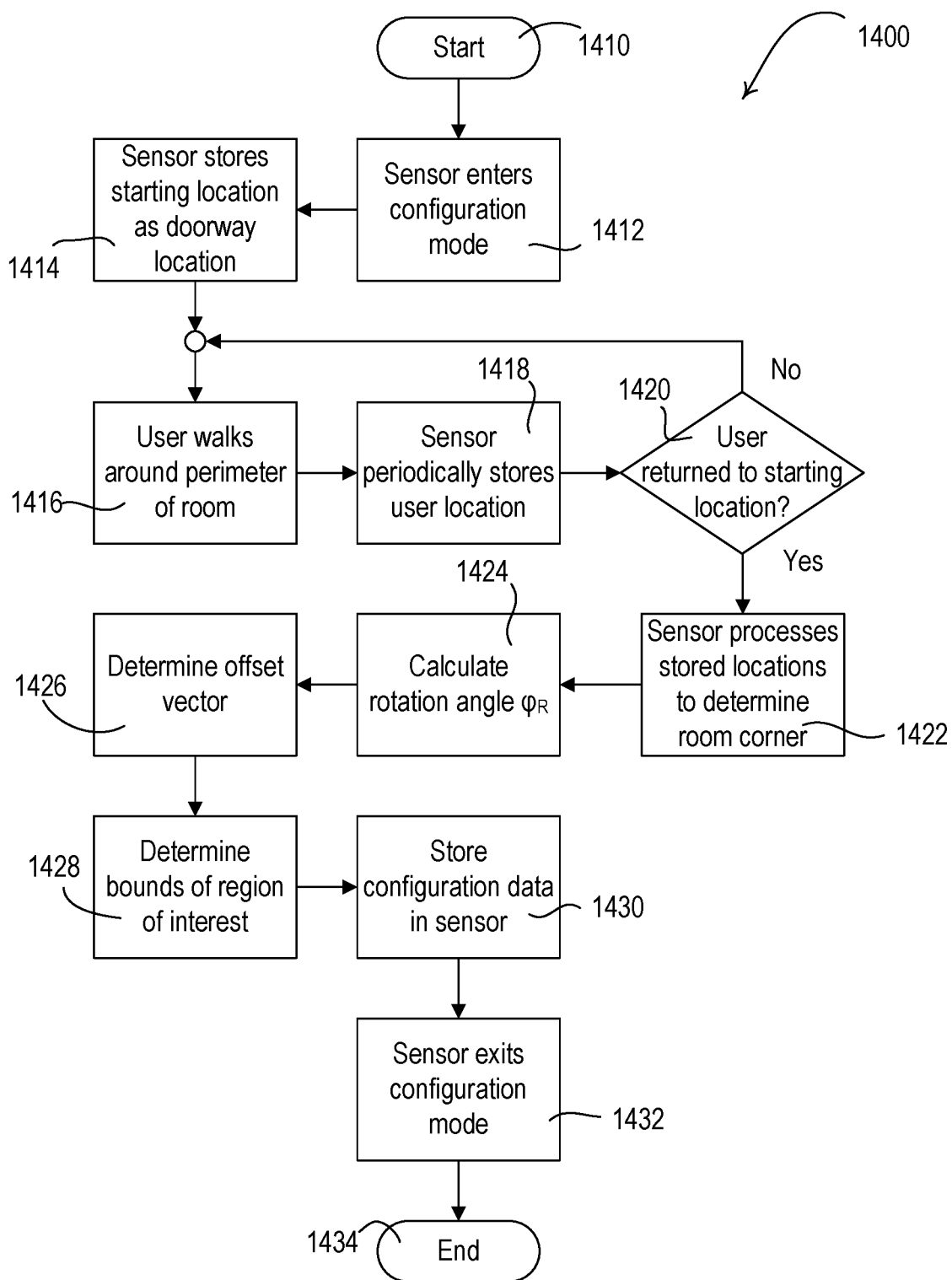

FIG. 14 is a simplified flowchart of an example configuration procedure 1400 that may be executed to configure an occupant detection sensor (e.g., the ceiling-mounted occupant detection sensor 180, the wall-mounted occupant detection sensor 182, and/or the occupant detection sensor 400). For example, the configuration procedure 1400 may be executed to configure a region of interest that has a rectangular shape (e.g., such as the desired region of interest 1320 shown in FIG. 13). In addition, the configuration procedure 1400 may be executed to configure regions of interest that have complex shapes, such as an L-shape, a C-shape, or other polygon having four or more sides.

At 1410, an installer may start the configuration procedure 1400, for example, by opening a sensor configuration application on a programming device, such as the mobile device 140 (e.g., a smart phone) and/or selecting a "start configuration" option and/or button on the configuration application. The programming device may subsequently transmit a message (e.g., a digital message) to the occupant detection sensor to start the configuration procedure 1400. In addition, the installer may start the configuration procedure 1400 at 1410 by shining a laser pointer onto a laser receiving circuit (not shown) on the occupant detection sensor or otherwise signaling to the occupant detection sensor to start the configuration procedure 1400 (e.g., by actuating a button on the occupant detection sensor).

At 1412, the occupant detection sensor may enter a configuration mode. At 1414, the occupant detection sensor may determine a starting location (e.g., X-Y coordinates) of the installer and store the starting location of the installer in memory as a doorway location. While the occupant detection sensor is in the configuration mode, the installer may walk around the perimeter of the room at 1416 and the occupant detection sensor may periodically store (e.g., automatically or after being prompted by the installer) the location of the installer in memory (e.g., in separate memory locations) at 1418. For example, the occupant detection sensor may store the locations in memory as X-Y coordinates. The occupant detection sensor may continue to store locations of the installer at 1418 until the installer returns to the starting location at 1420.

After the installer returns to the starting location at 1420, the occupant detection sensor may process the locations of the installer that were stored in memory during the configuration mode to determine the locations of the corners and/or the perimeter of the room at 1422. For example, if the room is rectangular, the occupant detection sensor may determine the locations $(x_a, y_a)$, $(x_b, y_b)$, $(x_a, y_c)$, $(x_a, y_d)$ of the four corners of the room at 1422. The occupant detection sensor may be configured to perform a least squares rectangular fit on the locations of the installer that were stored in the memory during the configuration mode to estimate the best fit for the walls and/or corners of the room based on the stored data. For example, the occupant detection sensor may ensure that lines defining the walls of the rooms are perpendicular to each other and form a square or rectangle. At 1424, the occupant detection sensor may be configured to determine the rotation angle $\varphi_R$ using the locations of two of the corners of the room. For example, if the room is rectangular, the occupant detection sensor may be configured to calculate the rotation angle $\varphi_R$ in a similar manner as at 1218 of the configuration procedure 1200 shown in FIG. 12. At 1426, the occupant detection sensor may determine an offset vector ($x_{OFF}$, $y_{OFF}$) using location of one of the corners of the room (e.g., which may be set as the origin of the local coordinate system associated with the region of interest). For example, if the room is rectangular, the occupant detection sensor may be configured to determine the offset vector ($x_{OFF}$, $y_{OFF}$) in a similar manner as at 1220 of the configuration procedure 1200 shown in FIG. 12.

At 1428, the occupant detection sensor may be configured to determine bounds of the region of interest for the occupant detection sensor. The bounds of the region of interest may be defined by the perimeter and/or dimensions of the room and/or region of interest. If the room is rectangular, the occupant detection sensor may be configured to determine the bounds by determining dimensions $X_{ROI}$, $Y_{ROI}$ of the region of interest, for example, in a similar manner as at 1222 of the configuration procedure 1200 shown in FIG. 12. At 1430, the occupant detection sensor may store the sensor configuration data in memory. For example, the sensor configuration data may include the rotation angle $\varphi_R$, the offset vector ($x_{OFF}$, $y_{OFF}$), and/or the bounds (e.g., the dimensions $X_{ROI}$, $Y_{ROI}$) of the region of the interest. At 1432, the occupant detection sensor may exit the sensor configuration mode, before the configuration procedure 1400 exits at 1434.

Figure 15:
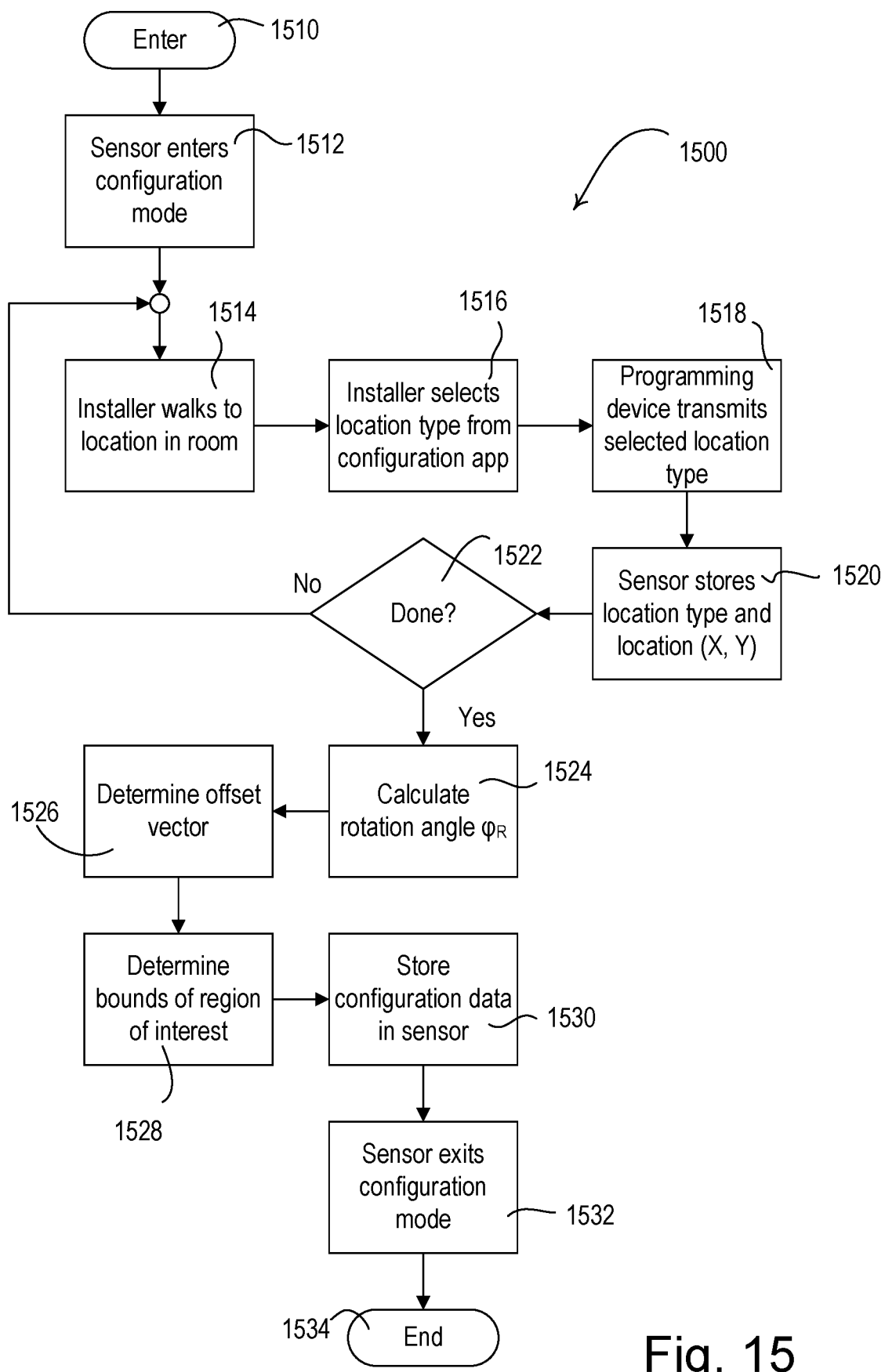

FIG. 15 is a simplified flowchart of another example configuration procedure 1500 that may be executed to configure an occupant detection sensor (e.g., the ceiling-mounted occupant detection sensor 180, the wall-mounted occupant detection sensor 182, and/or the occupant detection sensor 400). For example, the configuration procedure 1500 may be executed to configure a region of interest that has a rectangular shape (e.g., such as the desired region of interest 1320 shown in FIG. 13). In addition, the configuration procedure 1500 may be executed to configure regions of interest that have complex shapes, such as an L-shape, a C-shape, or other polygon having four or more sides. Throughout the configuration procedure 1500, an installer may utilize a configuration application running on a programming device, such as the mobile device 140 (e.g., a smart phone), which may be in communication with (e.g., direct communication with) the occupant detection sensor for configuring the occupant detection sensor. At 1510, the installer may start the configuration procedure 1500, for example, by opening a configuration application running on the network device and/or selecting a "start configuration" option and/or button on the configuration application.

At 1512, the occupant detection sensor may enter a configuration mode. At 1514, the installer may walk to a location in the room. At 1516, the installer may select a location type using the programming device. For example, the location may indicate a part of the room and/or an object in the room (e.g., a corner, a doorway, a desk chair, etc.). The programming device may then transmit an indication of the selected location type to the occupant detection sensor at 1518, and the occupant detection sensor may store the location type and the location (e.g., X-Y coordinates) in memory at 1520. If the installer is not done identifying locations in the room at 1522, the installer may walk to a different location at 1514 and select the appropriate location type at 1516. If the installer is done identifying locations in the room (e.g., in the installer selected a "done" option and/or button on the programming device) at 1522, the occupant detection sensor may be configured to determine the rotation angle $\varphi_R$ using the locations of two of the corners of the room at 1524 (e.g., using the locations of the corners of the room determined at 1518-1522). For example, if the room is rectangular, the occupant detection sensor may be configured to calculate the rotation angle $\varphi_R$ in a similar manner as at 1218 of the configuration procedure 1200 shown in FIG. 12. At 1526, the occupant detection sensor may determine an offset vector ($x_{OFF}$, $y_{OFF}$) using location of one of the corners of the room (e.g., which may be set as the origin of the location coordinate system associated with the region of interest). For example, if the room is rectangular, the occupant detection sensor may be configured to determine the offset vector ($x_{OFF}$, $y_{OFF}$) in a similar manner as at 1220 of the configuration procedure 1200 shown in FIG. 12.

At 1530, the occupant detection sensor may be configured to determine bounds of the region of interest for the occupant detection sensor (e.g., as defined by the perimeter and/or dimensions of the room and/or region of interest). If the room is rectangular, the occupant detection sensor may be configured to determine the bounds by determining dimensions $X_{ROI}$, $Y_{ROI}$ of the region of interest, for example, in a similar manner as at 1222 of the configuration procedure 1200 shown in FIG. 12. At 1532, the occupant detection sensor may store the sensor configuration data in memory. For example, the sensor configuration data may include the rotation angle $\varphi_R$, the offset vector ($x_{OFF}$, $y_{OFF}$), the bounds (e.g., the dimensions $X_{ROI}$, $Y_{ROI}$) of the region of the interest, and/or locations determined at 1518-1522 that may define masked areas or static areas. At 1534, the occupant detection sensor may exit the sensor configuration mode, before the configuration procedure 1500 exits at 1536.

While the configuration procedure 1500 as shown in FIG. 15 allows the installer to identify the locations of corners, doorways, and desk chairs in the room, the configuration procedure could also allow the installer to identify other locations in the room, such as, for example, corners of a desk, corners of a table, a keyboard of a computer, and/or a noise source (e.g., such as a fan or other moving object that is not an occupant of the room). Rather than (or in addition to) identifying the corners of the room to identify the perimeter of the room, the configuration application 1500 may allow the installer to identify the perimeter or the room by walking around the perimeter of the room (e.g., as in the configuration procedure 1400 shown in FIG. 14). In addition, the configuration procedure 1500 of FIG. 15 may be used to identify the location of multiple corners, doorways, desks, desk chairs, etc. of the room. Further, the configuration procedure 1500 may allow an installer to define a region of interest having a complex shape, such as a polygon having more than four sides.

Figure 16:
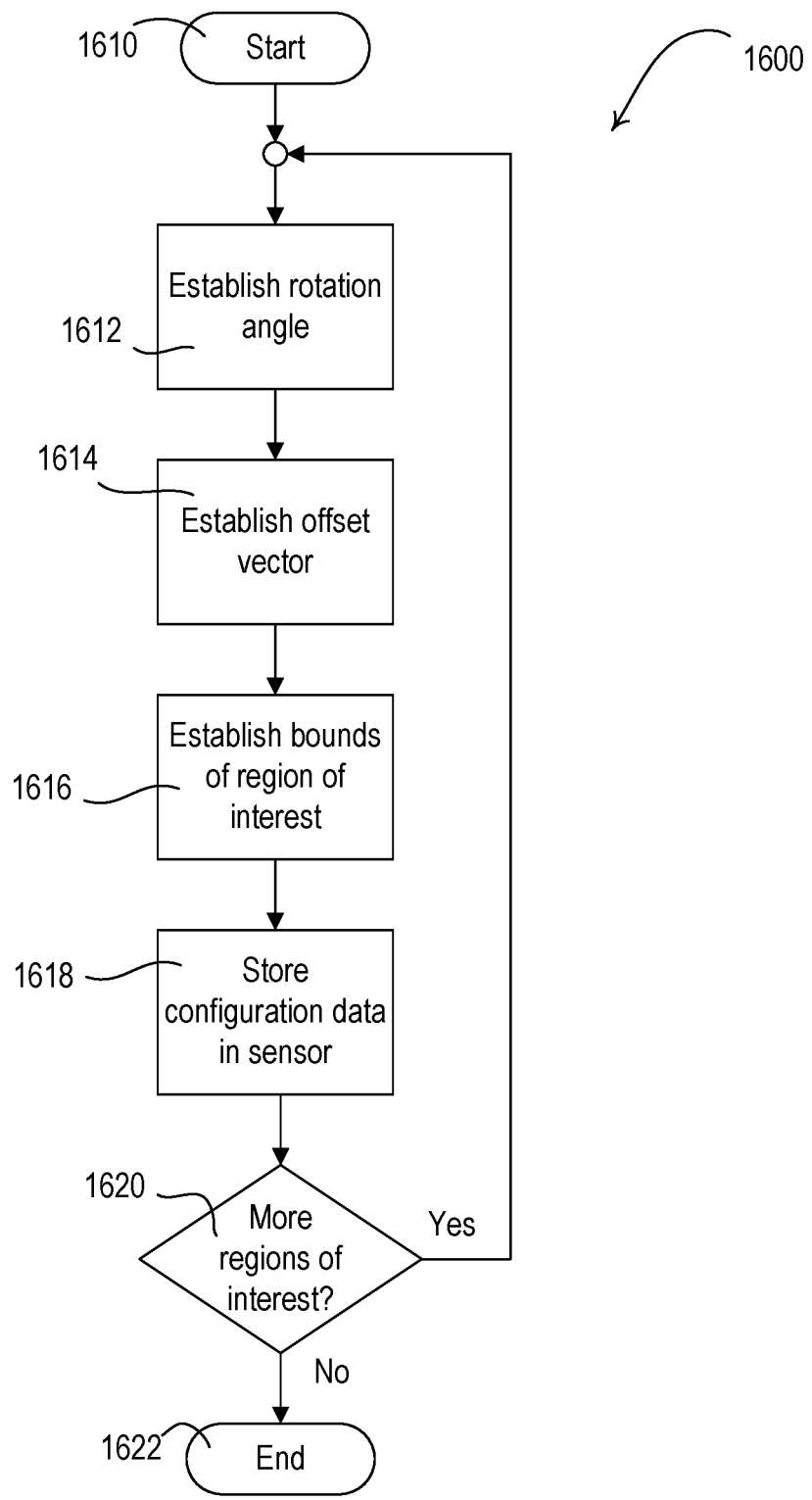
Figure 17A:
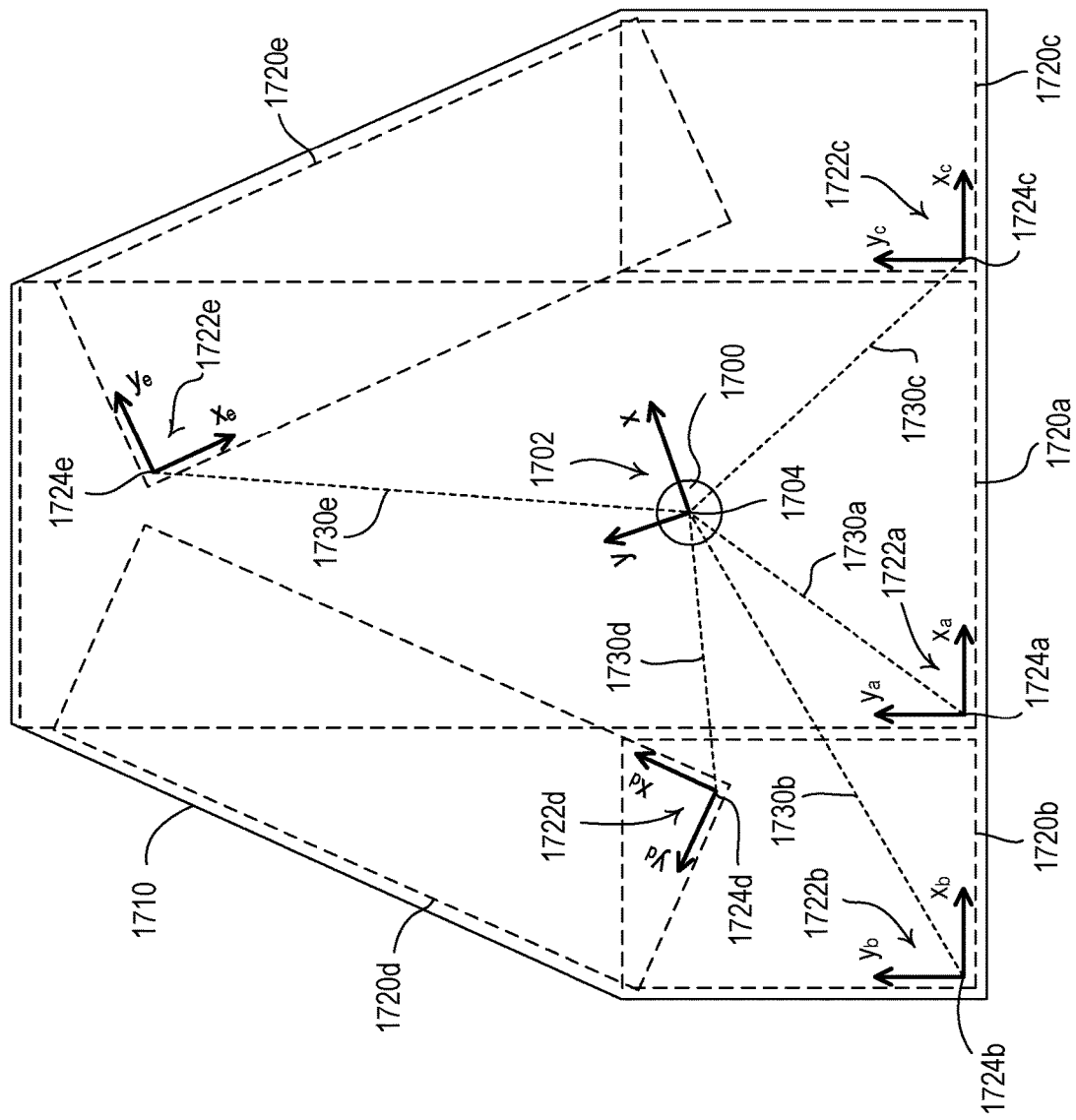

FIG. 16 is a simplified flowchart of an example configuration procedure 1600 that may be executed to configure an occupant detection sensor 1700 (e.g., the ceiling-mounted occupant detection sensor 180, the wall-mounted occupant detection sensor 182, and/or the occupant detection sensor 400). FIG. 17A is a top-down view of an example room 1710 for illustrating the operation of the configuration procedure 1600 for the occupant detection sensor 1700. The coverage area of the occupant detection sensor 1700 may be characterized by a global coordinate system 1702 having an origin 1704 located at a center point of the occupant detection sensor.

The configuration procedure 1600 may be executed to configure multiple regions of interest 1720a-1720e (e.g., multiple rectangular regions of interest) in the room 1710. For example, the room 1710 may include five rectangular regions of interest as shown in FIG. 17A. The regions of interest 1720a-1720e may overlap with each other. The regions of interest 1720a-1720e may be rotated and sized so as to cover the extents of the room 1710. In other words, the combined area of the multiple regions of interest 1720a-1702e (e.g., including both overlapping and non-overlapping areas) may be, for example, the extents of the room 1710. Each of the regions of interest 1720a-1720e may be characterized by a respective local coordinate system 1722a-1722e having a respective origin 1724a-1724e (e.g., located at one of the corners of the region of interest). As shown in FIG. 17A, the x-axis of the global coordinate system 1702 of the occupant detection sensor 1700 may not be aligned with any of the x-axes of the local coordinate systems 1722a-1722e of the regions of interest 1720a-1720e. For example, a respective rotation angle (not shown in FIG. 17A) may exist between the x-axis of the global coordinate system 1702 and each of the x-axes of the respective local coordinate systems 1722a-1722e. Each of the local coordinate systems 1722a-1722e may also be offset from the global coordinate system 1702 by a respective offset vector 1730a-1730e.

Multiple rectangular regions of interest may be provided in the room 1710 since rectangular regions of interest may simplify configuration and operation of the occupant detection sensor 1700. To specify and/or configure rectangular regions of interest, the rotation angle, the offset vector, and/or the bounds (e.g., the dimensions) for each rectangular region of interest may be established using one or more of the methods disclosed herein. Multiple rectangular regions of interest may be assembled together to create a region of interest having a complex shape. During normal operation, rectangular regions of interest may allow for quick determination (e.g., via simple computation) of whether an occupant is within the bounds of a complex-shaped region formed by multiple rectangular regions of interest. For example, the occupant detection sensor 1700 may determine that a particular occupant is within one of the rectangular regions of interest to determine that the occupant is within the complex-shaped region of interest.

The configuration procedure 1600 may begin at 1610. At 1612, a rotation angle between the x-axis of the global coordinate system 1702 of the occupant detection sensor 1700 and the x-axis of a local coordinate system of a first one of the regions of interest (e.g., the local coordinate system 1722a of the region of interest 1720a) may be established. At 1614, an offset vector (e.g., the offset vector 1730a) between the origin 1704 of the global coordinate system 1702 of the occupant detection sensor 1700 and an origin of the local coordinate system of the first one of the regions of interest (e.g., the origin 1724a) may be established. At 1616, bounds (e.g., dimensions or boundaries) of the first one of the regions of interest may be established. The rotation angle, offset vector, and bounds of the first one of the regions of interest may be established at 1612-1616 using any of the techniques used in the configuration procedures of FIGS. 7-15. Once established, the configuration information including the rotation angle, offset vector, and bounds of the region of interest may be stored at 1618. If there are more regions of interest to configure at 1620, the configuration procedure 1600 may loop around to establish the rotation angle, offset vector, and bounds of the next region of interest (e.g., the region of interest 1720b) at 1612-1616. When all of the regions of interest in the room 1710 (e.g., all of the regions of interest 1720a-1720e) have been configured at 1620, the configuration procedure 1600 may exit at 1720.

Figure 17C:
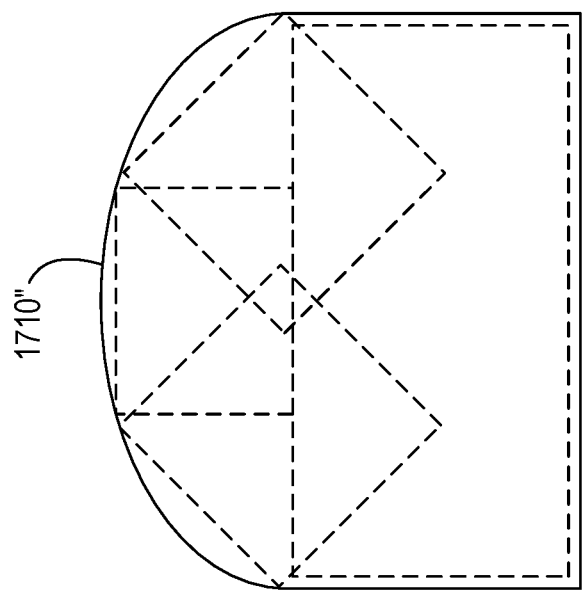
Figure 17B:
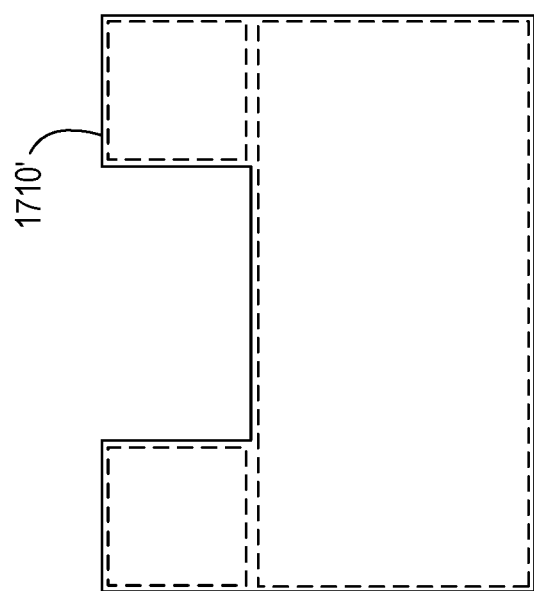

FIGS. 17B and 17C are top-down views of other example rooms 1710', 1710" that each have multiple regions of interest and may be configured using the configuration procedure 1600 of FIG. 16 for the occupant detection sensor 1700. For example, the room 1710' in FIG. 17B may be a C-shaped room and may include three rectangular regions of interest. The room 1710" of FIG. 17C may have a curved façade and may include four rectangular regions of interest.

Figure 18:
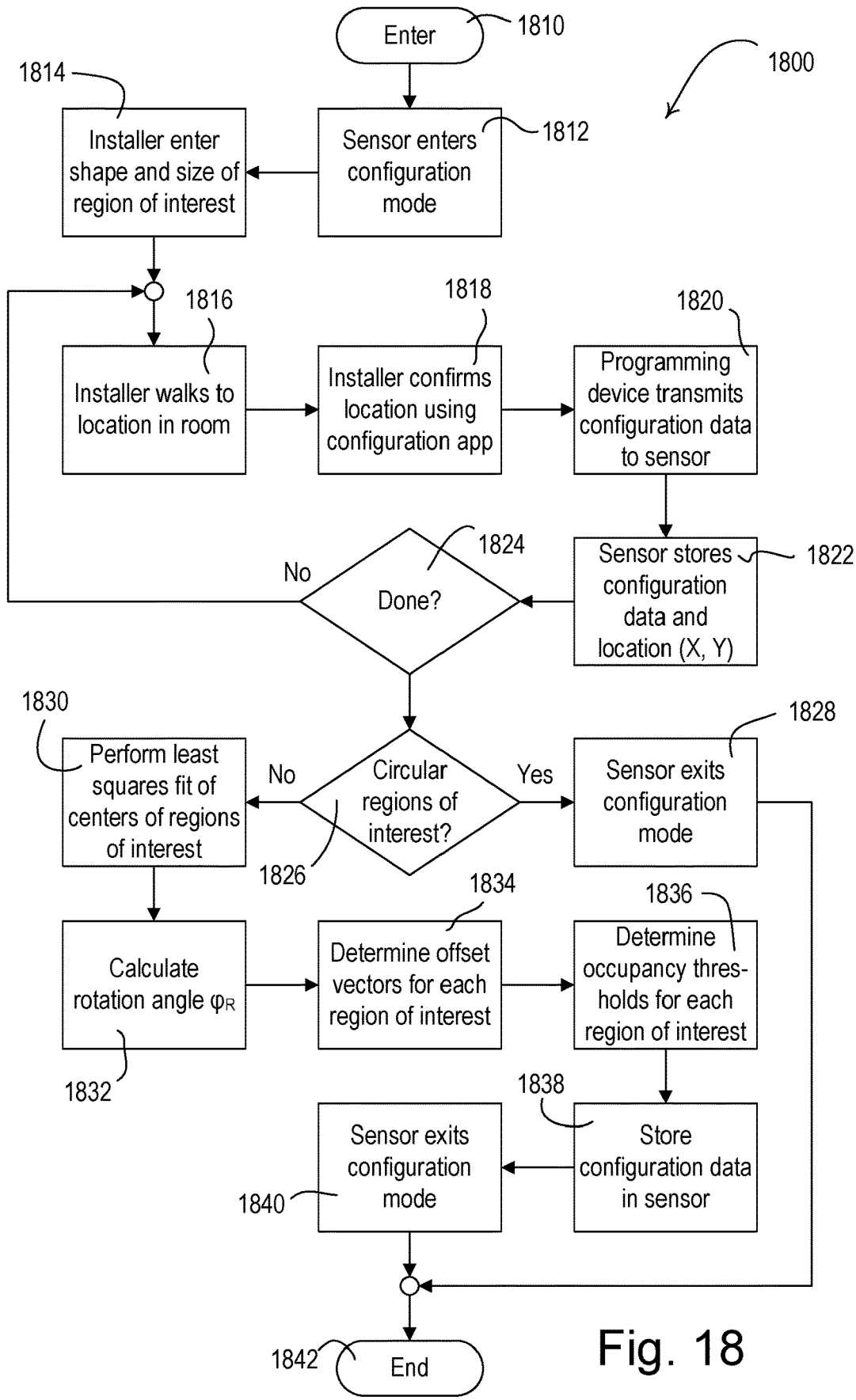
Figure 19A:
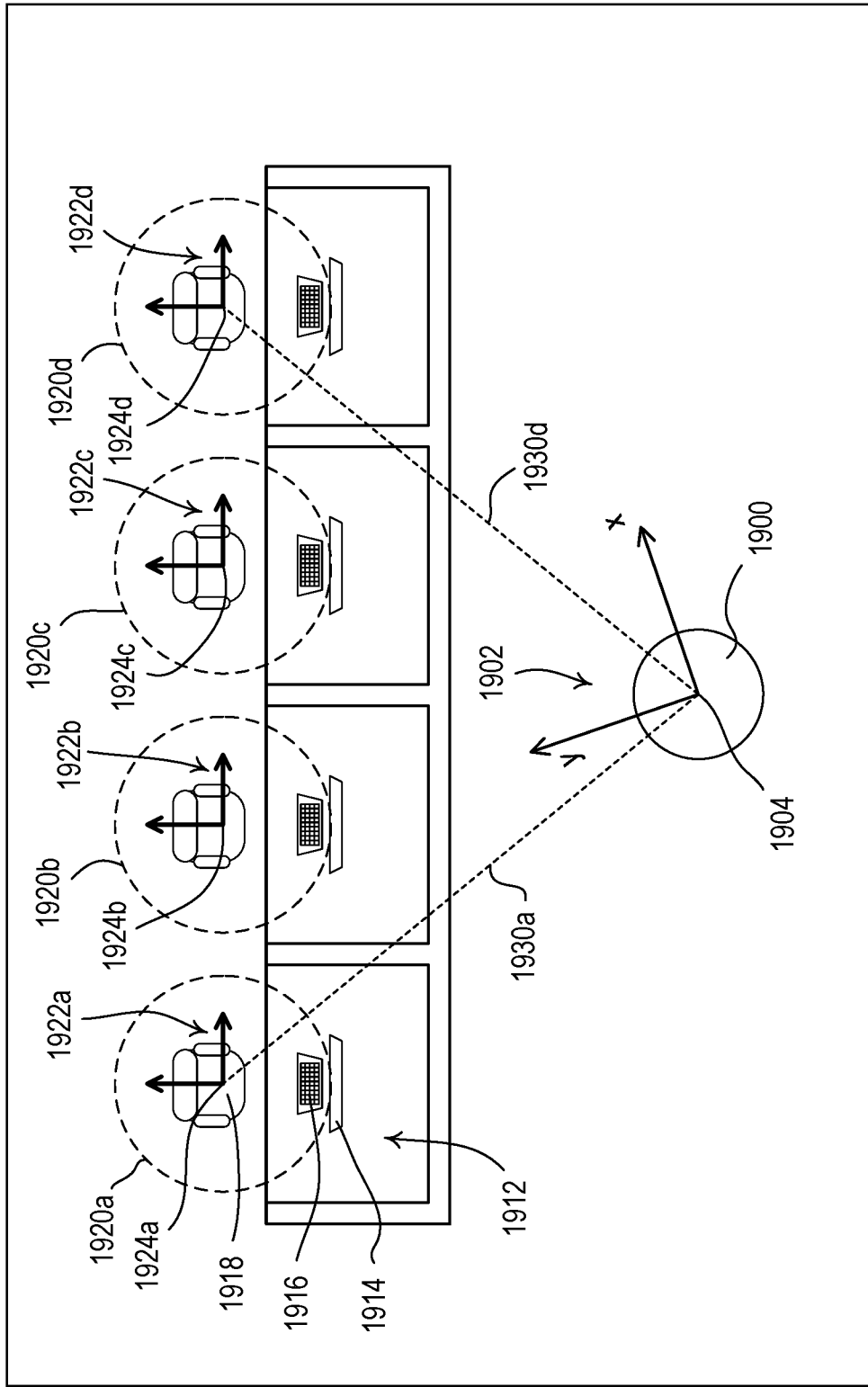
Figure 19B:
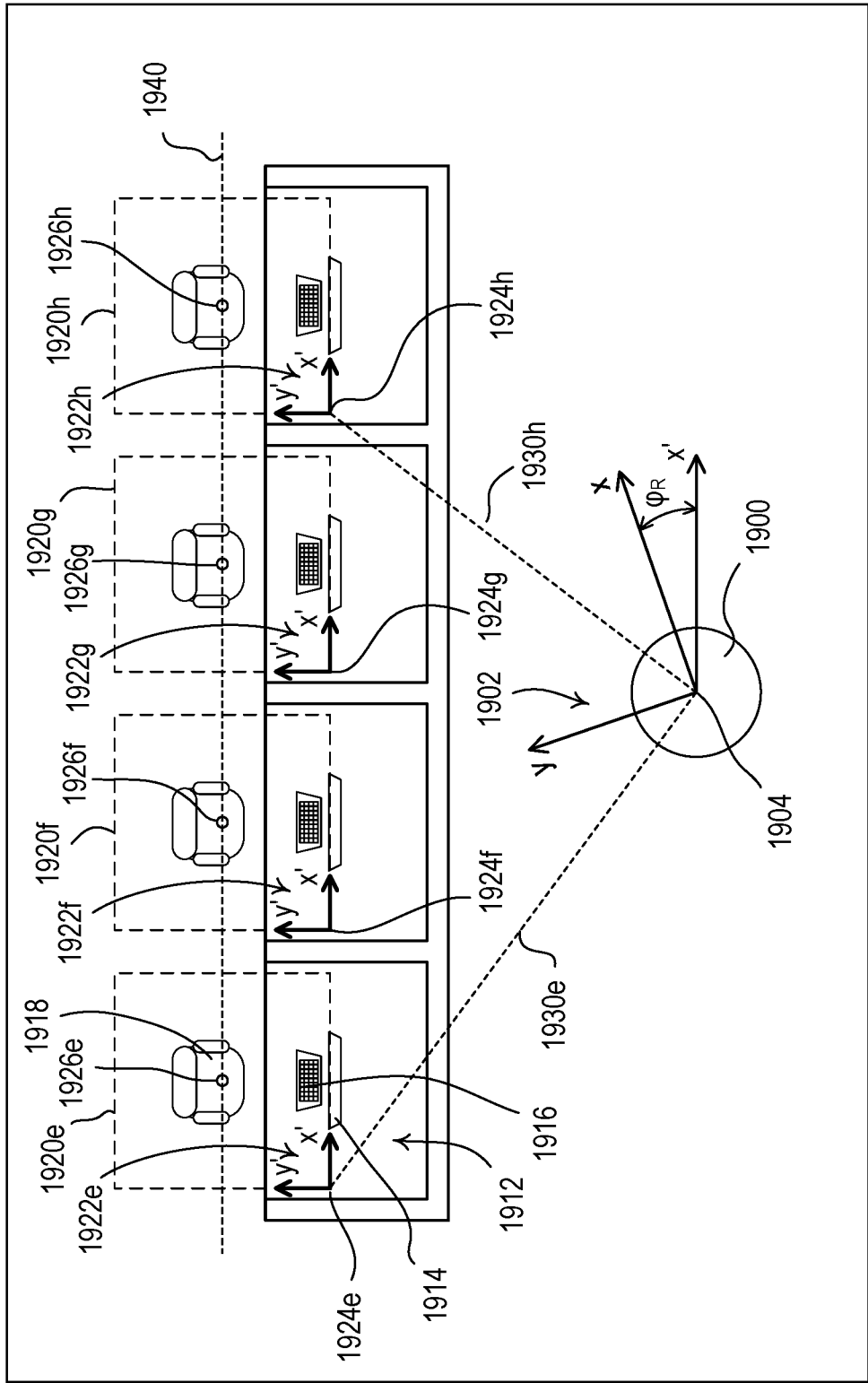

FIG. 18 is a simplified flowchart of an example configuration procedure 1800 that may be executed to configure an occupant detection sensor 1900 (e.g., the ceiling-mounted occupant detection sensor 180, the wall-mounted occupant detection sensor 182, and/or the occupant detection sensor 400). FIGS. 19A and 19B are top-down views of an example room 1910 for illustrating the operation of the configuration procedure 1800 for the occupant detection sensor 1900. The coverage area of the occupant detection sensor 1900 may be characterized by a global coordinate system 1902 having an origin 1904 located at a center point of the occupant detection sensor. The room 1910 may comprise a plurality of work spaces 1912 (e.g., "hot-desk" work spaces). Each work space 1910 may comprise a computer monitor 1914 and a respective keyboard 1916, as well as a desk chair 1918 in which an occupant may sit to use the respective computer monitor 1914 and respective keyboard 1916.

The configuration procedure 1800 may be executed to configure multiple regions of interest 1920a-1920d in the room 1910. In the example of FIG. 19A, each of the regions of interest 1920a-1920d may be a circle. In the example of FIG. 19B, each of the regions of interest 1920e-1920h may be a square. In addition, each of the regions of interest may be a rectangle. Each of the regions of interest shown in FIGS. 19A and 19B may surround an area of the respective workspace 1912 in which the occupant may be located (e.g., around the keyboard 1916 and/or the desk chair 1918). Each of the circular regions of interest 1920a-1920d shown in FIG. 19A may be characterized by a respective local coordinate system 1922a-1922d having a respective origin 1924a-1924d (e.g., located at the center of each circular region of interest). For example, the local coordinate system 1922a-1922d of each of the circular regions of interest 1920a-1920d may be a cylindrical coordinate system (e.g., having coordinates defined by a distance from the respective origin 1924a-1924d and an angle from a respective reference angle between a line through the center of each circular region of interest 1920a-1920d and the x-axis of the global coordinate system 1902).

Each of the square regions of interest 1920e-1920h shown in FIG. 19B may be characterized by a respective local coordinate system 1922e-1922h having a respective origin 1924e-1924h (e.g., located at a corner of each square region of interest). For example, the local coordinate system 1922e-1922h of each of the square regions of interest 1920e-1920h may be a Cartesian coordinate system (e.g., having coordinates defined distances along an x-axis and a y-axis). As shown in FIG. 19B, the x-axes of the local coordinate systems 1922e-1922h of the square region of interests 1920e-1920h may not be aligned with (e.g., parallel to) the x-axis of the global coordinate system 1902 of the occupant detection sensor 1900. For example, a rotation angle $\varphi_R$ may exist between the x-axis of the global coordinate system 1902 and the x-axis of each of the local coordinate systems 1922e-1922h. The local coordinate systems 1922e-1922h may also be offset from the global coordinate systems 1902 by respective offset vectors 1930a-1930d (e.g., with only the offset vectors 1930a and 1930d shown in FIG. 19B). The origin 1924e-1924h of each of local coordinate systems 1922*e*-1922*h* may also be located at respective centers 1926*e*-1926*h* of the square regions of interest 1920*e*-1920*h*. The exact location of the origins of 1924*e*-1924*h* of each of local coordinate systems 1922*e*-1922*h* should not affect the applicability of the techniques described herein.

Throughout the configuration procedure 1800, an installer may utilize a configuration application running on a programming device, such as the mobile device 140 (e.g., a smart phone), which may be in communication with (e.g., direct communication with) the occupant detection sensor for configuring the occupant detection sensor. At 1810, the installer may start the configuration procedure 1800, for example, by opening a configuration application running on the network device and/or selecting a "start configuration" option and/or button on the configuration application.

At 1812, the occupant detection sensor may enter a configuration mode. At 1814, the installer may enter the shape and/or size (e.g., dimensions) of each of the multiple regions of interest to be configured. For example, the shape may be entered as circle (e.g., to configure the circular regions of interest 1922*a*-1922*d*), square (e.g., to configure the square regions of interest 1922*e*-1922*h*), rectangle, or other polygon at 1814. In addition, the dimensions of the multiple regions of interest may also be entered, e.g., as a radius or diameter when the shape is a circle, as a side length when the shape is a square, or as a length and width when the shape is a rectangle at 1814. Each of the multiple regions of interest may be configured with the same shape and dimensions.

At 1816, the installer may walk to the location of one of the workspaces 1912 in the room 1910 (e.g., to the location of one of the desk chairs 1918). For example, the installer may walk to approximately the center of the desired region of interest for that workspace 1912 (e.g., the center of one of the circular regions of interest 1922*a*-1922*d* or the center 1926*e*-1926*h* of one of the square regions of interest 1922*e*-1922*h*). At 1818, the installer may confirm that the installer is located at the proper location, for example, by actuating a "confirmation" option and/or button on the configuration application running on the programming device. At 1818, the programming device may transmit the configuration data (e.g., the shape and/or dimensions) as well as an indication that the installer is presently at the center of one of the regions of interest to the occupant detection sensor. At 1820, the occupant detection sensor may store the configuration data (e.g., the shape and/or dimensions) and the location (e.g., X-Y coordinates) of the centers in memory at 1822. If the installer is not done identifying locations in the room at 1824, the installer may walk to the location of a different workspace 1912 at 1816 to configure another region of interest. Since the configuration data (e.g., the shape and/or dimensions) of each region of interest may be the same, the programming device may not transmit the configuration data to the occupant detection sensor during subsequent executions of 1820 and/or the occupant detection sensor may not store the configuration data during subsequent executions of 1822. In those cases, the occupant detection sensor may reuse the configuration data transmitted and/or stored previously for an identical region of interest.

If the installer is done identifying locations in the room (e.g., in the installer selected a "done" option and/or button on the programming device) at 1824 and the shape of each of the regions of interest is a circle at 1826, the occupant detection sensor may simply exit the configuration mode at 1828 and the configuration procedure 1800 may exit at 1842. If the shape of each of the regions of interest is not a circle (e.g., is a square, rectangle, or other polygon) at 1826, the occupant detection sensor may use the stored locations of the installer during the configuration procedure 1800 to perform a least squares fit to determine a center line 1940 (e.g., as shown in FIG. 19B) that may extend as close as possible through the centers 1926*e*-1926*h* of the regions of interest 1922*e*-1922*h* at 1830. For example, if the room 1910 has multiple rows of workspaces 1912, the occupant detection sensor may perform the least squares fit multiple times at 1830 to determine multiple center lines.

At 1832, the occupant detection sensor may be configured to determine the rotation angle $\varphi_R$ between the x-axis of the global coordinate system 1902 and the x-axis of each of the local coordinate systems 1922*e*-1922*h*. For example, the calculate the rotation angle $\varphi_R$ determining an angle between x-axis of the global coordinate system 1902 and the center line 1940 of the regions of interest 1922*e*-1922*h* at 1832 (e.g., in a similar manner as at 1218 of the configuration procedure 1200 shown in FIG. 12). The occupant detection sensor may determine multiple the rotation angles $\varphi_R$ if there are multiple rows of workspaces 1910 and thus multiple center lines 1940. At 1834, the occupant detection sensor may determine an offset vector for each of the regions of interest 1922*e*-1922*h* using the locations of the centers 1926*e*-1926*h* of the regions of interest 1922*e*-1922*h*, the dimension of the region of interest, and the rotation angle $\varphi_R$. At 1836, the occupant detection sensor may be configured to determine bounds of each of the regions of interest 1922*e*-1922*h* (e.g., as defined by the dimensions of each of the region of interests). At 1838, the occupant detection sensor may store the sensor configuration data (e.g., the rotation angle(s) $\varphi_R$, the offset vectors for each of the regions of interest 1922*e*-1922*h*, and/or the bounds of each of the regions of interest). At 1840, the occupant detection sensor may exit the sensor configuration mode, before the configuration procedure 1800 exits at 1842.

Figure 20:
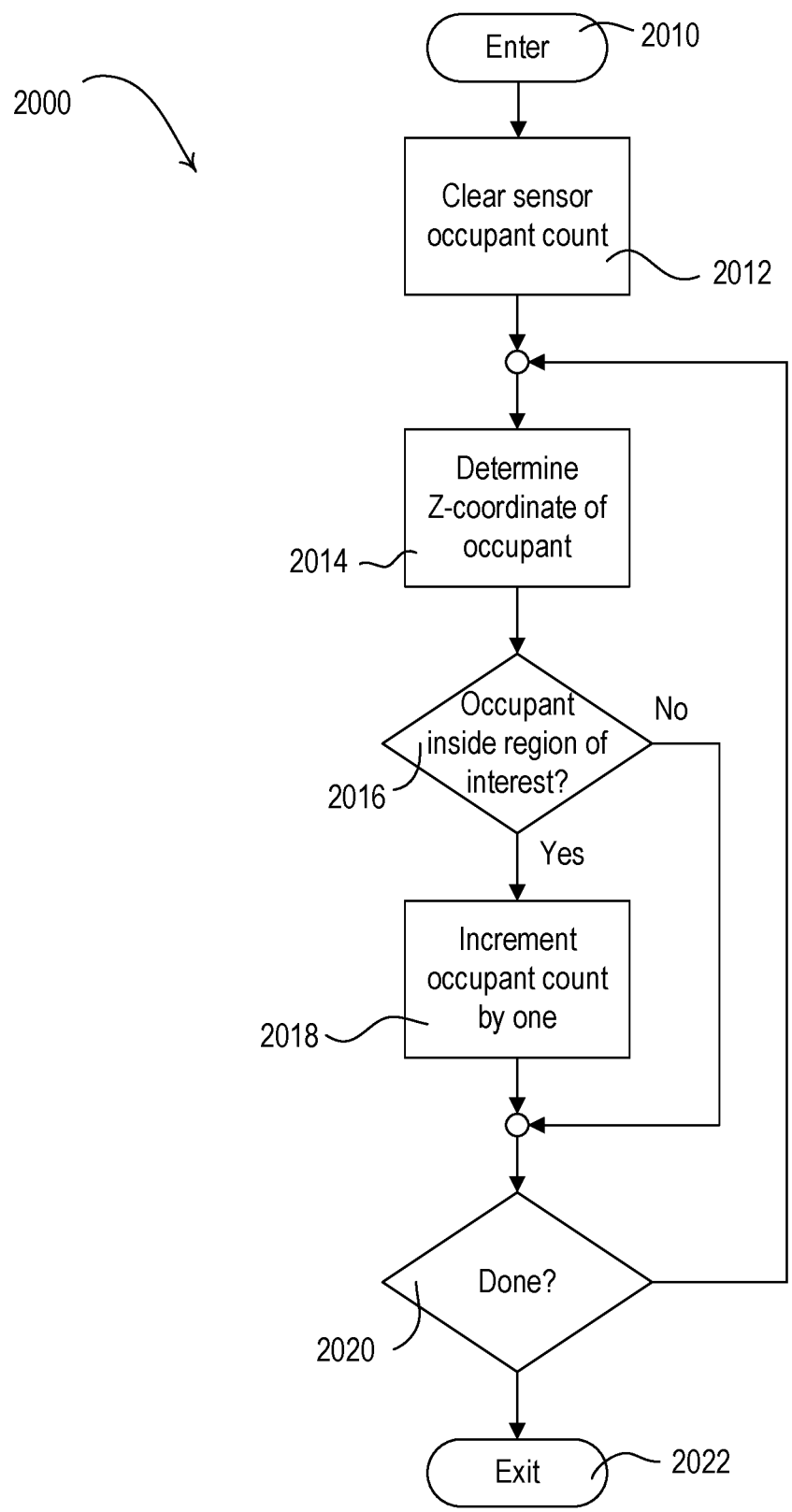
FIG. 20 is a simplified flowchart of an example control procedure that may be executed by a control circuit of an occupant detection sensor, e.g., when using a circular region of interest.

FIG. 20 is a simplified flowchart of a control procedure 2000 that may be executed by an occupant detection sensor (e.g., the ceiling-mounted occupant detection sensor 180, the wall-mounted occupant detection sensor 182, and/or the occupant detection sensor 400) during normal operation. For example, the control procedure 2000 may be executed by a control circuit of the occupant detection sensor (e.g., the radar detection processor 412 and/or the control circuit 420). The control circuit may execute (e.g., periodically execute) the control procedure 2000 at 2010 to process occupant data determined and/or generated by an occupant detection circuit (e.g., the radar detection circuit 410). The occupant data may comprise a location (e.g., a Z-coordinate) of the occupant in a global coordinate system (e.g., a polar coordinate system) of the occupant detection sensor for each occupant in a coverage area of the occupant detection sensor. For example, the Z-coordinate of the occupant data may define a distance between the occupant detection sensor and the occupant. The control procedure 2000 may be executed to determine, for example, an occupant count (e.g., a sensor occupant count) of the number of occupants in a region of interest (e.g., a circular region of interest 620 as shown in FIG. 6).

At 2012, the control circuit may clear the sensor occupant count. At 2014, the control circuit may determine the Z-coordinate for an occupant from an occupant detection circuit (e.g., the radar detection circuit 410). At 2016, the control circuit may determine if the occupant is within the bounds of the region of interest. For example, when the region of interest is a circle, the control circuit may determine if the Z-coordinate is less than the radius $r_{ROI}$ for the region of interest at 2016 to determine if the location of the occupant is within the bounds of the region of interest. If the occupant is within the region of interest at 2016, the control circuit may increment the sensor occupant count by one at 2018. If the occupant is not within the region of interest at 2016, the control circuit may not increment the sensor occupant count by one. If the control circuit is not done processing occupants received from the occupant detection circuit (e.g., occupants within the coverage area of the occupant detection sensor) at 2020, the control procedure 2000 may loop around to determine the Z-coordinate of the next occupant at 2014. When the control circuit is done processing occupants received from the occupant detection circuit at 2020, the control procedure 2000 may exit at 2022.

Figure 21:
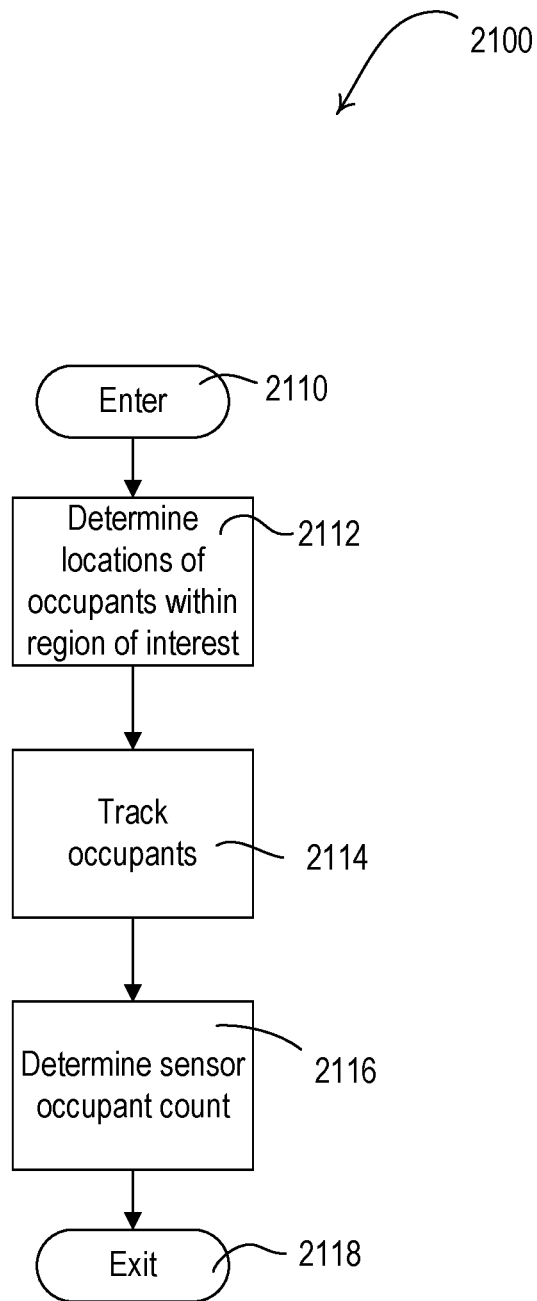
FIG. 21 is a simplified flowchart of an example control procedure that may be executed by a control circuit of an occupant detection sensor, e.g., when using one or more rectangular and/or circular regions of interest.

FIG. 21 is a simplified flowchart of a control procedure 2100 that may be executed by an occupant detection sensor (e.g., the ceiling-mounted occupant detection sensor 180, the wall-mounted occupant detection sensor 182, and/or the occupant detection sensor 400) during normal operation. For example, the control procedure 2100 may be executed by a control circuit of the occupant detection sensor (e.g., the radar detection processor 412 and/or the control circuit 420). The control circuit may execute (e.g., periodically execute) the control procedure 2100 at 2110 to process occupant data determined by an occupant detection circuit (e.g., the radar detection circuit 410). The occupant data may comprise a tracking number and a location (e.g., an X-Y coordinate) in a global coordinate system of the occupant detection sensor for each occupant in a coverage area of the occupant detection sensor. For example, the control procedure 2100 may be executed to determine an occupant count (e.g., a sensor occupant count) of the number of occupants in a region of interest (e.g., one of the rectangular regions of interest 920, 1120, 1320 shown in FIGS. 9, 11, and 13, respectively).

At 2112, the control circuit may use the occupant data received from the occupant detection circuit to determine the locations of the occupants within a region of interest. For example, the control circuit may transform the locations of each occupant in the global coordinate system into the local coordinate system of the occupant sensor. If the locations of the occupants in the local coordinate system fall within the bounds of the region of interest, the control circuit may store the location of the respective occupant and the corresponding tracking number in memory for further processing. At 2114, the control circuit may track the locations of the occupants in the region of interest. For example, the control circuit may be configured to continue to track occupants that have become stationary at 2114 even though the occupants may not be detected by the occupant detection circuit of the occupant detection sensor. At 2116, the control circuit may determine a sensor occupant count (e.g., by counting the number of occupants determined to be within the region of interest at 2114), before the control procedure 2100 exits at 2118.

Figure 22:
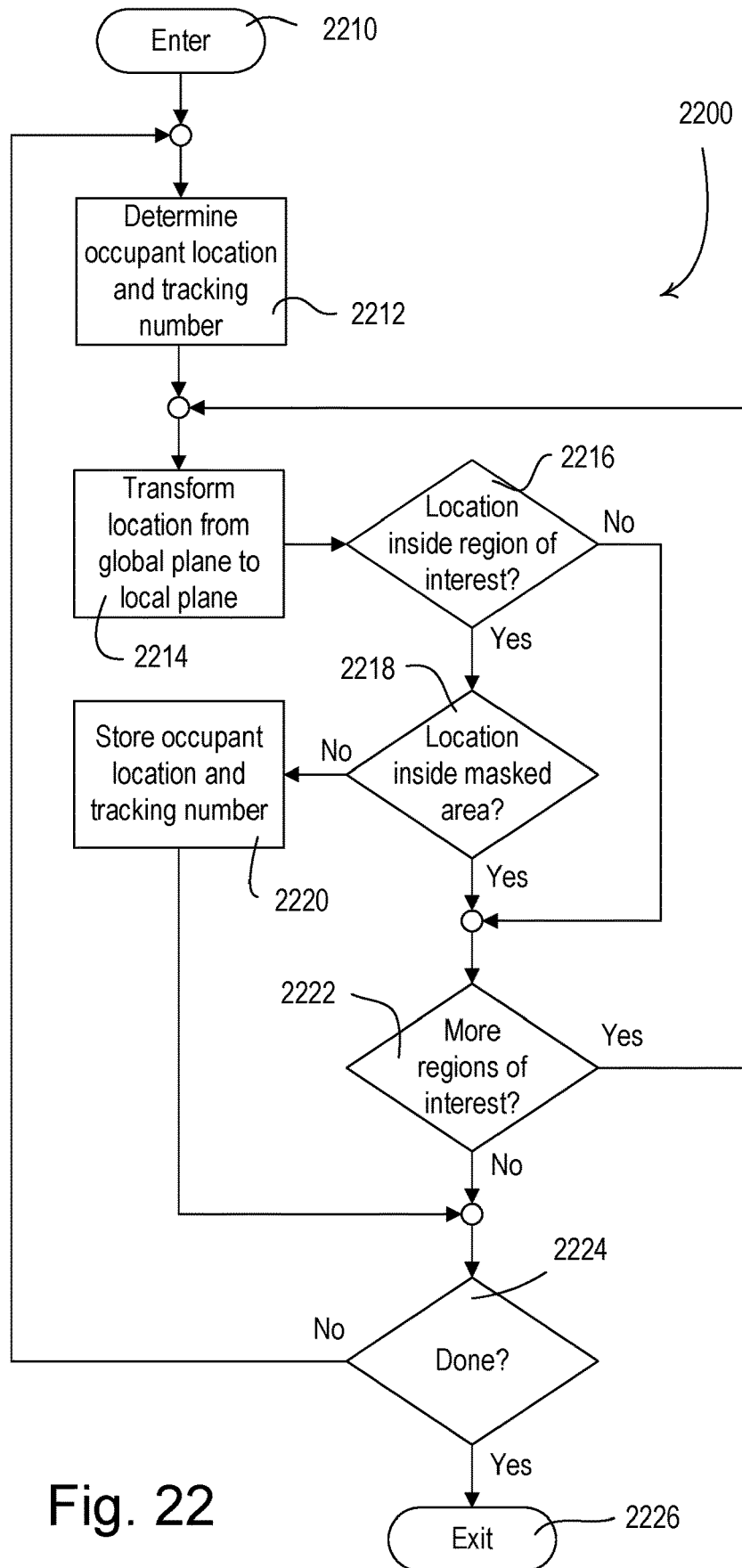
FIG. 22 is a simplified flowchart of an example location determination procedure that may be executed by a control circuit of an occupant detection sensor.

FIG. 22 is a simplified flowchart of a location determination procedure 2200 that may be executed by an occupant detection sensor (e.g., the ceiling-mounted occupant detection sensor 180, the wall-mounted occupant detection sensor 182, and/or the occupant detection sensor 400) during normal operation. The location determination procedure 2200 may be executed by a control circuit of the occupant detection sensor (e.g., the radar detection processor 412 and/or the control circuit 420). For example, the location determination procedure 2200 may be executed at 2112 of the control procedure 2100 shown in FIG. 21.

The location determination procedure 2200 may begin at 2210. At 2212, the control circuit may determine the location (x,y) of an occupant in the global coordinate system and a tracking number of the occupant from an occupant detection circuit (e.g., the radar detection circuit 410). At 2214, the control circuit may transform the location (x, y) of the occupant in the global coordinate system to a location (x', y') in the local coordinate system. For example, the control circuit may use a linear transformation to determine the location (x', y') in the local coordinate system, e.g., $$\begin{bmatrix} x' \\ y' \end{bmatrix} = \begin{bmatrix} \cos(\varphi_R) & \sin(\varphi_R) \\ -\sin(\varphi_R) & \cos(\varphi_R) \end{bmatrix} \begin{bmatrix} x \\ y \end{bmatrix} - \begin{bmatrix} x'_{off} \\ y'_{off} \end{bmatrix};$$

or $$x' = x \cdot \cos(\varphi_R) + y \cdot \sin(\varphi_R) - x'_{off}; \text{ and}$$

$$y' = x \cdot \sin(\varphi_R) + y \cdot \cos(\varphi_R) - y'_{off};$$

where $$\begin{bmatrix} x'_{off} \\ y'_{off} \end{bmatrix} = \begin{bmatrix} \cos(\varphi_R) & \sin(\varphi_R) \\ -\sin(\varphi_R) & \cos(\varphi_R) \end{bmatrix} \begin{bmatrix} x_{off} \\ y_{off} \end{bmatrix};$$

or $$x'_{off} = x_{off} \cdot \cos(\varphi_R) + y_{off} \cdot \sin(\varphi_R); \text{ and}$$

$$y'_{off} = x_{off} \cdot -\sin(\varphi_R) + y_{off} \cdot \cos(\varphi_R).$$

$\varphi_R$ may represent a rotation angle between the global coordinate system and the local coordinate system, and $x_{off}$ and $y_{off}$ may represent an offset vector between respective origins of the two coordinate systems, as described herein. At 2216, the control circuit may determine if the location (x', y') in the local coordinate system is within the bounds of the region of interest. For example, when the region of interest is a rectangle, the control circuit may determine if the coordinates of the location (x', y') in the local coordinate system are less than the respective maximum dimensions $X_{ROI}$, $Y_{ROI}$ of the region of the interest at 2216 to determine if the location of the occupant is within the bounds of the region of interest.

If the location (x', y') in the local coordinate system is within the bounds of the region of interest at 2216, the control circuit may determine if the location (x', y') is within a masked area at 2218. If the location (x', y') is not within a masked area at 2218, the control circuit may store the location (x', y') in the local coordinate system and the tracking number in memory at 2220. In addition, the control circuit may store the location (x,y) in the global coordinate system and the tracking number in memory at 2220. If the location (x', y') is not within the bounds of the region of interest at 2216 or the location (x', y') is within a masked area at 2218, the control circuit may not store the location (x', y') or the tracking number in memory at 2220. If there are more regions of interest in the present room at 2222, the location determination procedure 2200 may loop around to allow the control circuit to determine if the occupant location is in the next region of interest. The control circuit may continue to determine if the occupant location is in each region of interest in the room until the control circuit determines that the occupant location is in one of the regions of interest at 2218 or there are no more regions of interest at 2222. If the control circuit does not determine that the occupant location is in any of the regions of interest, the control circuit may not store the location (x', y') or the tracking number in memory at 2220. If the control circuit is not done processing the locations of occupants received from the occupant detection circuit at 2224, the location determination procedure 2200 may loop around to determine the location of the next occupant and associated tracking number at 2212. When the control circuit is done processing the locations of occupants received from the occupant detection circuit at 2224, the location determination procedure 2200 may exit at 2226.

The control circuit may use the transformation shown above (e.g., at 2214 of the location determination procedure 2200) to transform a location (x,y) in the global coordinate system to a location (x', y') in the local coordinate system when the region of interest is a polygon, such as a square or rectangle. When the region of interest is a circle, the control circuit may transform a location (x,y) in the global coordinate system to a location (x', y') in the local coordinate system by subtracting an offset vector from the location (x,y) in the global coordinate system. The bounds of a circular region of interest may be a dimension of the region of interest, as indicated by a diameter or radius. For example, the control circuit may be configured to determine if the location (x', y') in the local coordinate system is within the bounds of the region of interest (e.g., at 2216 of the location determination procedure 2200) by determining if a distance between an origin of the circular region of interest and the location (x', y') is less than the radius. When the region of interest is a circle, the control circuit may be configured to determine if the location of an occupant is within the bounds of the region of interest without transforming the location of the occupant to a local coordinate system. For example, the control circuit may calculate a distance between the occupant and the center of the circular region of interest using locations of the occupant and the center of the circular region of interest in the global coordinate system. The control circuit may then determine that the occupant is within the bounds of the circular region of interest if the distance is smaller than the radius of the circle and that the occupant is outside the bounds of the circular region of interest if the distance is greater than the radius of the circle.

Figure 23A:
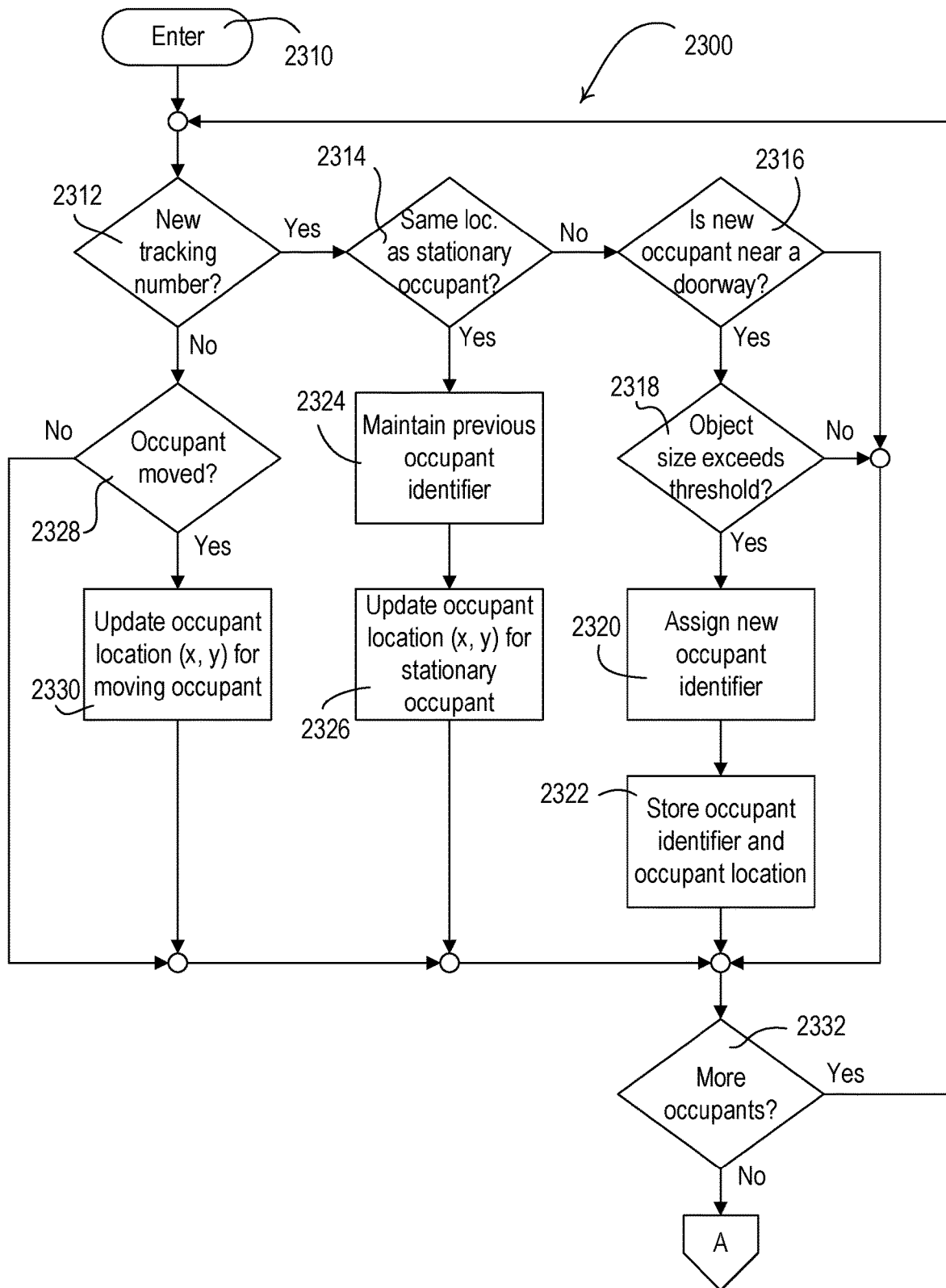
FIGS. 23A and 23B show a simplified flowchart of an example occupant tracking procedure that may be executed by a control circuit of an occupant detection sensor.
Figure 23B:
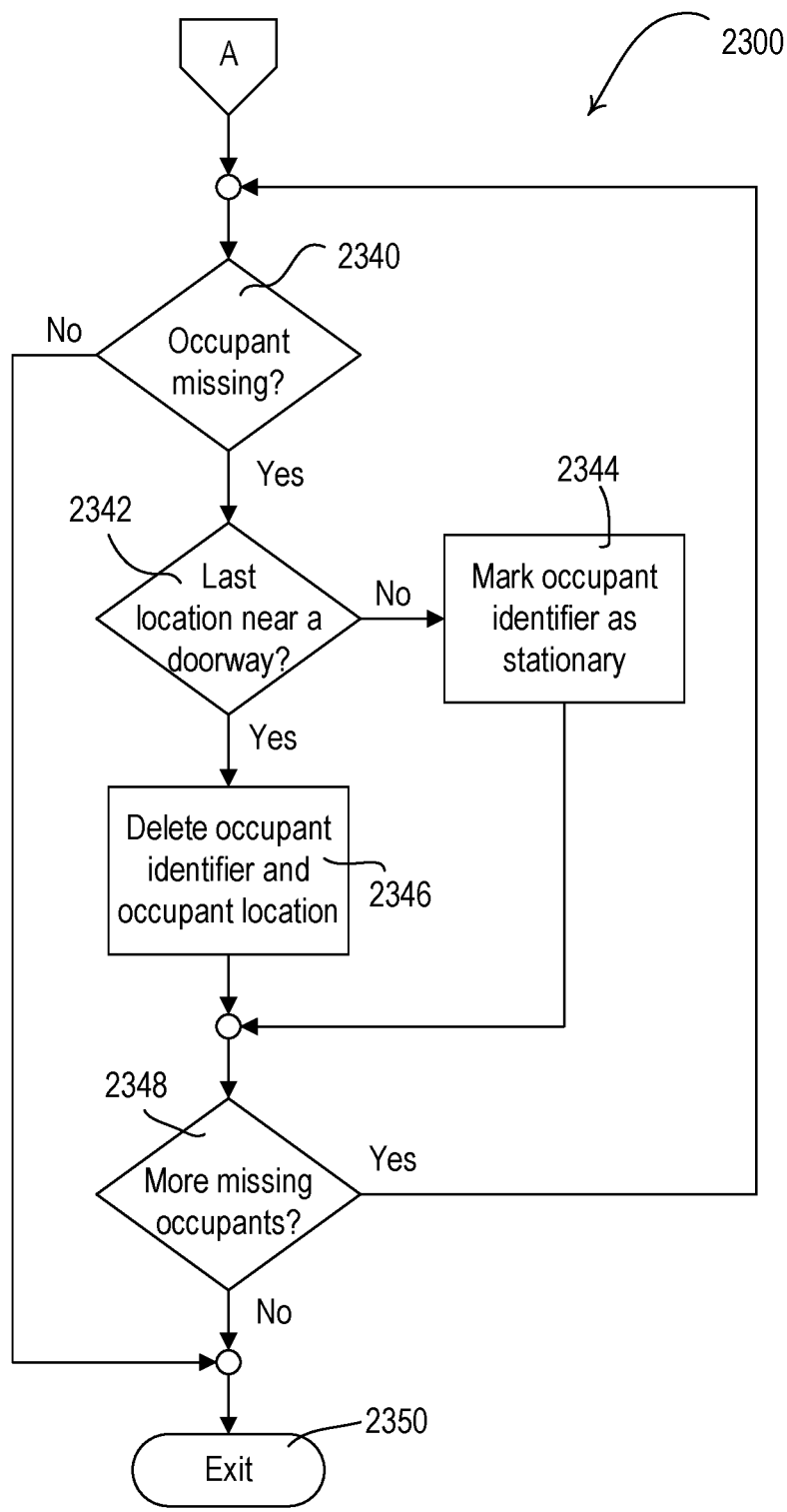

FIGS. 23A and 23B show a simplified flowchart of an example occupant tracking procedure 2300 that may be executed by an occupant detection sensor (e.g., the ceiling-mounted occupant detection sensor 180, the wall-mounted occupant detection sensor 182, and/or the occupant detection sensor 400) during normal operation. The occupant tracking procedure 2300 may be executed by a control circuit of the occupant detection sensor (e.g., the radar detection processor 412 and/or the control circuit 420) at 2310. For example, the occupant tracking procedure 2300 may be executed at 2114 of the control procedure 2100 shown in FIG. 21. The control circuit may track the occupants during the occupant tracking procedure 2300 using the occupant data determined and/or generated by the location determination procedure 2200 shown in FIG. 22. For example, the occupant data may comprise a tracking number and a location (e.g., X-Y coordinate) in the local coordinate system for each occupant in the region of interest. In addition, the occupant data may comprise a tracking number and a location (e.g., X-Y coordinate) in the global coordinate system for each occupant in the region of interest.

As shown in FIG. 23A, the control circuit may process each occupant in the occupant data one at a time (e.g., for only those occupants in the region of interest as determined by the location determination procedure 2200). At 2312, the control circuit may determine if the occupant is a new occupant by determining if the tracking number of the occupant is new (e.g., the tracking number is new if the tracking number is not the same as any tracking number stored by the occupant detection sensor). If the tracking number is new at 2312, the control circuit may determine if the new occupant is at substantially the same location as (e.g., within a predetermined range of) a previously-identified stationary occupant at 2314 (e.g., the new occupant is the same as the stationary occupant). If the new occupant is not at substantially the same location as a stationary occupant at 2314, but is located near a doorway at 2316, the control circuit may determine if the size of the new occupant exceeds a size threshold at 2318. If the size of the new occupant exceeds the size threshold at 2318, the control circuit may assign the new occupant a new occupant identifier at 2320 and store the occupant identifier along with the tracking number and the occupant location (e.g., as received from the occupant detection circuit) at 2322. The size threshold may be preconfigured for the occupant detection sensor, for example, during a commissioning procedure.

If the new occupant is at substantially the same location as a stationary occupant at 2314, the control circuit may maintain the previous occupant identifier for the stationary occupant at 2324, and update the occupant location for the stationary occupant at 2326 with the newly determined location (e.g., so that slight movements of the occupant may not accumulate over time to cause erroneous conditions). The control circuit may update the stored tracking number for the stationary occupant with the new tracking number at 2324. If the tracking number for the occupant is not new at 2312 (e.g., the tracking number is not new if the tracking number is the same as a tracking number stored by the occupant detection sensor), the control circuit may determine if the previously-identified occupant (e.g., identified by the tracking number) has moved at 2328. If the occupant has moved at 2328, the control circuit may update the occupant location for the moving occupant at 2330. If there are more occupants at 2332, the occupant detection procedure 2300 may loop around to process the next occupant.

Referring to FIG. 23B, if there are not more occupants to process at 2332, the control circuit may determine if one of the previously-identified occupants is missing (e.g., no longer in the room) at 2340. For example, the control circuit may determine that an occupant is missing at 2340 if the occupant is no longer in the region of interest (e.g., if the occupant is not in the occupant data as determined by the location determination procedure 2200). If an occupant is missing at 2340 and the last known location of the occupant was near a doorway at 2342, the control circuit may delete the occupant identifier and occupant location from memory at 2344. If the last known location of the missing occupant was not near a doorway at 2342, the control circuit may mark the occupant as stationary at 2344. If there are more missing occupants at 2348, the occupant detection procedure 2300 may loop around to process the next missing occupant. If there are not more missing occupants at 2348, the occupant detection procedure may exit at 2350. The location of the doorway may be learned/determined by the control circuit, for example, during the commissioning procedure described herein.

Figure 24:
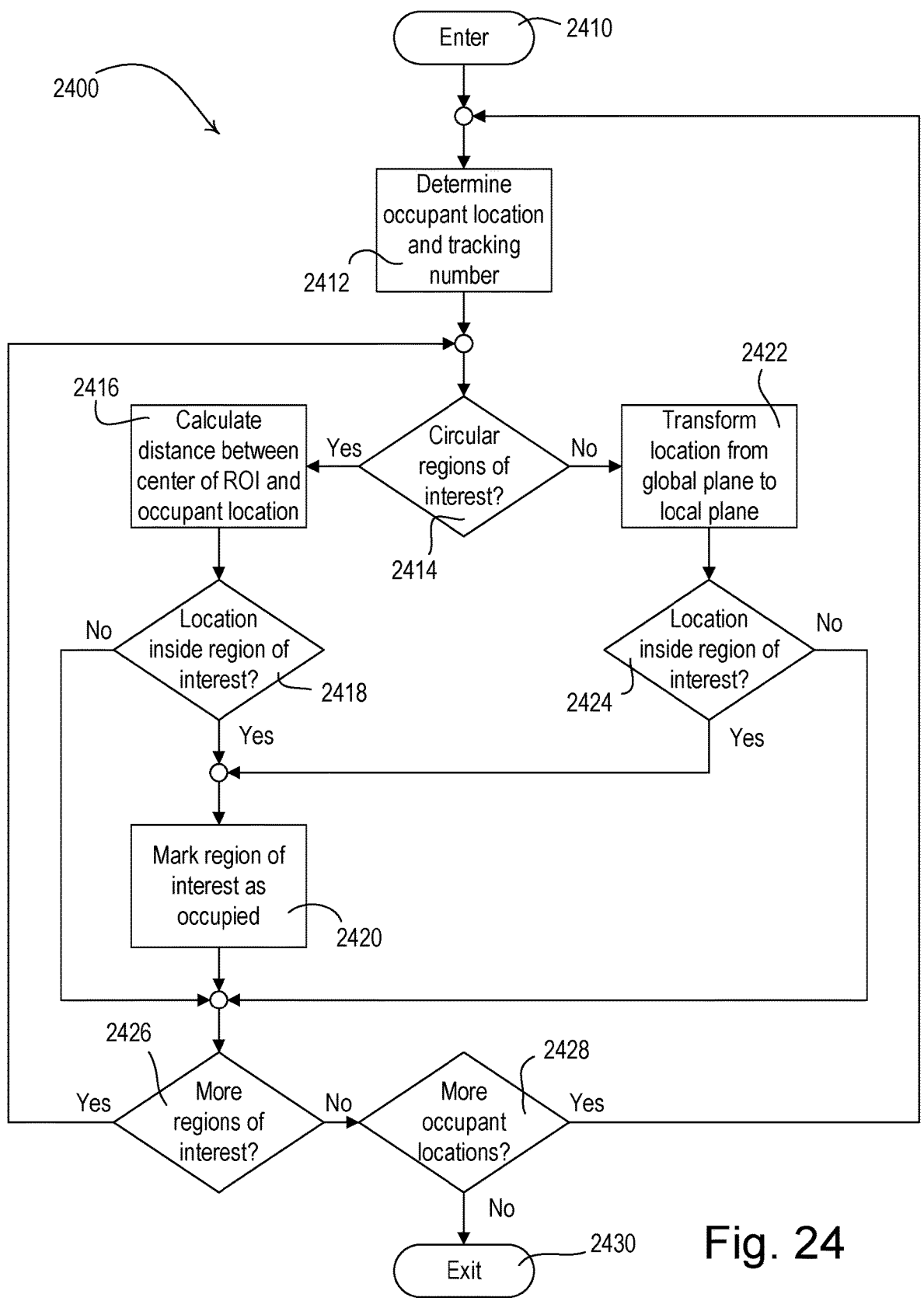
FIG. 24 is a simplified flowchart of another example control procedure that may be executed by a control circuit of an occupant detection sensor.

FIG. 24 is a simplified flowchart of a control procedure 2400 that may be executed by an occupant detection sensor (e.g., the ceiling-mounted occupant detection sensor 180, the wall-mounted occupant detection sensor 182, and/or the occupant detection sensor 400) during normal operation. For example, the control procedure 2400 may be executed by a control circuit of the occupant detection sensor (e.g., the radar detection processor 412 and/or the control circuit 420). The control circuit may execute (e.g., periodically execute)

the control procedure 2400 at 2410 to process occupant data determined by an occupant detection circuit (e.g., the radar detection circuit 410). The occupant data may comprise a tracking number and a location (e.g., X-Y coordinate) in a global coordinate system if the occupant detection sensor for each occupant in a coverage area of the occupant detection sensor. For example, the control procedure 2400 may be executed to determine whether one or more regions of interest in a room are occupied or vacant (e.g., such as the circular regions of interest 1920a-1920d and the square regions of interest 1920e-1920h shown in FIG. 17).

At 2412, the control circuit may determine a location ($x_n$, $y_n$) in the global coordinate system and a tracking number of an occupant from the occupant detection circuit. If the regions of interest of the room are circular at 2414, the control circuit may calculate a distance $d_{OCC}$ (e.g., a magnitude of a vector) between the location ($x_n$, $y_n$) of the occupant and the center ($x_c$, $y_c$) of the circular region of interest (e.g., in the global coordinate system), e.g., $$d_{OCC}=\text{sqrt}[(y_n-y_c)^2+(x_n-x_c)^2].$$

At 2418, the control circuit may determine if the location ($x_n$, $y_n$) of the occupant is within the circular region of interest, for example, by determining if the distance $d_{OCC}$ between the location ($x_n$, $y_n$) of the occupant and the center ($x_c$, $y_c$) of the circular region of interest is less than or equal to a dimension, such as a radius $r_{ROI}$, of the circular region of interest. If the location ($x_n$, $y_n$) of the occupant is inside of the circular region of interest (e.g., if $d_{OCC} \leq r_{ROI}$) at 2418, the control circuit may mark the region of interest as occupied at 2420. If the location ($x_n$, $y_n$) of the occupant is not inside of the circular region of interest (e.g., if $d_{OCC} > r_{ROI}$) at 2418, the control circuit may not mark the region of interest as occupied at 2420.

If the regions of interest of the room are not circular at 2414 (e.g., are square, rectangular, or other polygon), the control circuit may transform the location ($x_n$, $y_n$) of the occupant in the global coordinate system to a location ($x'_n$, $y'_n$) in the local coordinate system at 2422. The control circuit may use a linear transformation to determine the location (x', y') in the local coordinate system at 2414, for example, in a similar manner as at 2414 of the location determination procedure 2400 of FIG. 24. At 2424, the control circuit may determine if the location ($x_n$, $y_n$) of the occupant is within the region of interest. For example, if the region of interest is a square, the control circuit may determine if the coordinates of the location ($x'_n$, $y'_n$) in the local coordinate system are each less than the side length of the region of the interest at 2424 to determine if the location of the occupant is within the region of interest. If the location ($x'_n$, $y'_n$) of the occupant in the local coordinate system is inside of the region of interest at 2424, the control circuit may mark the region of interest as occupied at 2420. If the location ($x'_n$, $y'_n$) of the occupant is not inside of the circular region of interest at 2424, the control circuit may not mark the region of interest as occupied at 2420.

If there are more regions of interest in the room to process at 2426, the control procedure 2400 may loop around to determine if the occupant located in the region of interest at 2418 or 2424. If there are not more regions of interest in the room to process at 2426, but there are more occupant locations to process at 2428, the control procedure 2400 may loop around to determine a location ($x_n$, $y_n$) in the global coordinate system and a tracking number of the next occupant at 2412. If there are not more occupant locations to process at 2428, the control procedure may exit at 2430.

Figure 25:
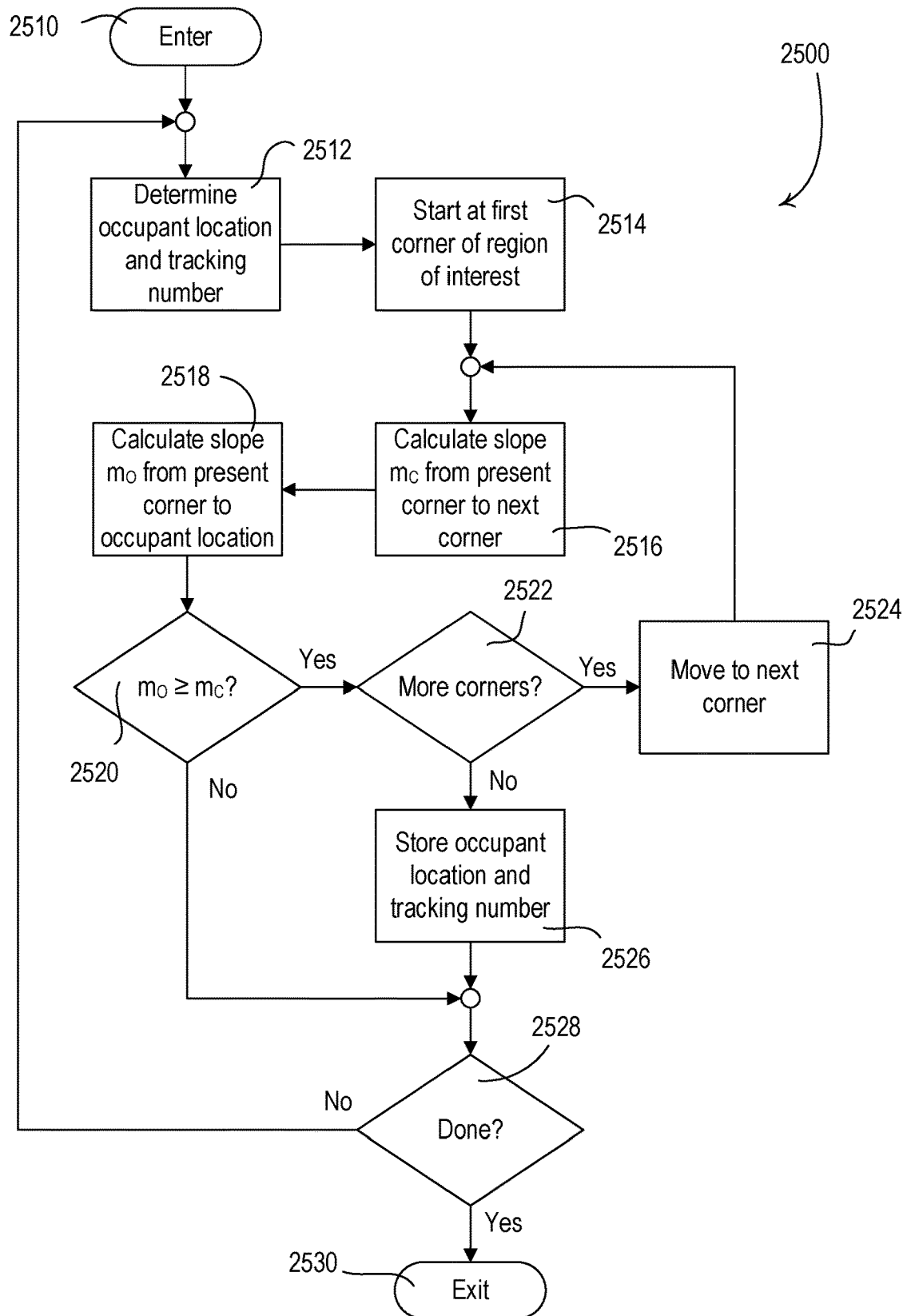
FIG. 25 is a simplified flowchart of an example location determination procedure that may be executed by a control circuit of an occupant detection sensor.
Figure 26A:
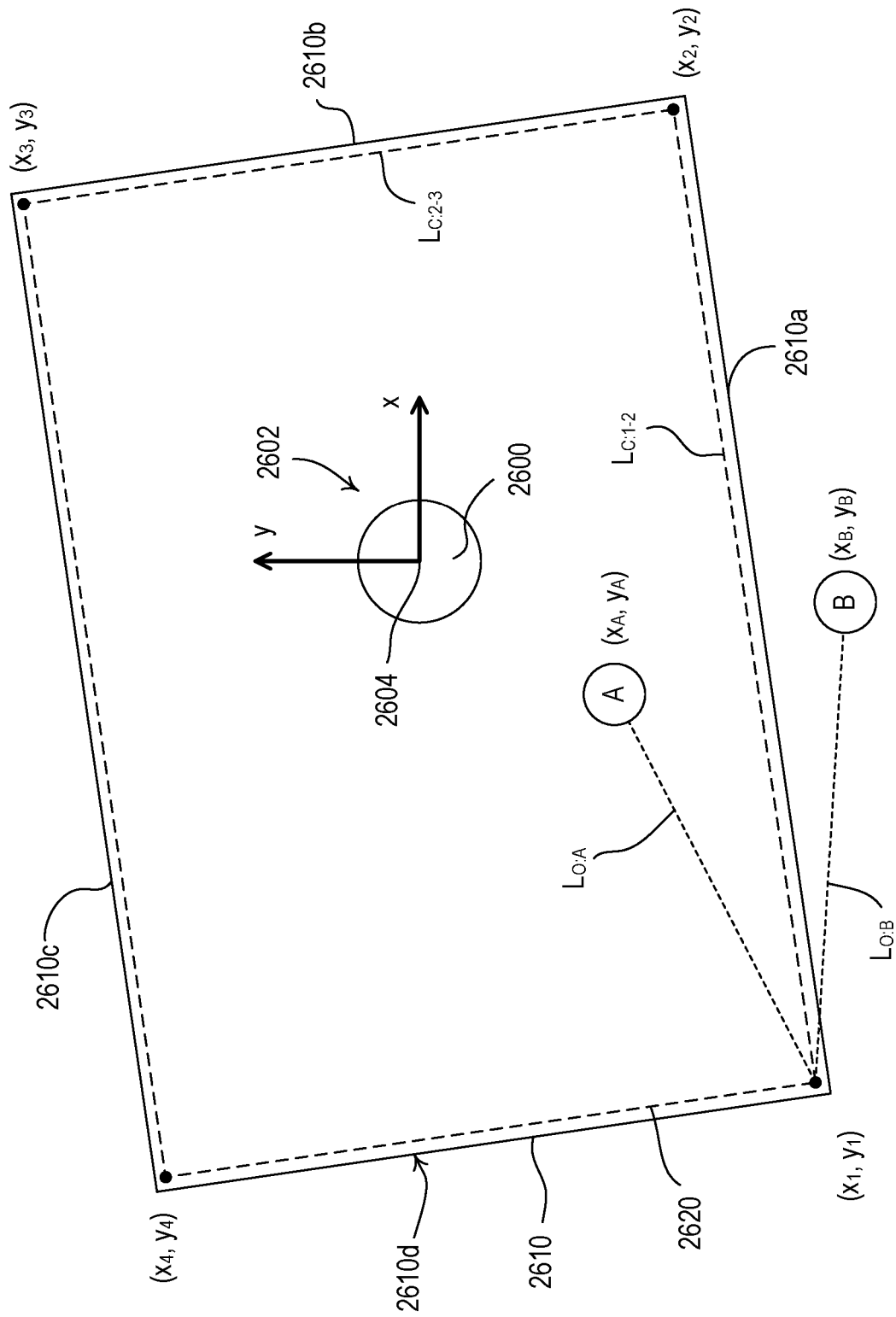
FIG. 26A-26C are top-down views of example rooms for illustrating the operation of the location determination procedure of FIG. 25.

FIG. 25 is a simplified flowchart of a location determination procedure 2500 may that be executed by an occupant detection sensor 2600 (e.g., the ceiling-mounted occupant detection sensor 180, the wall-mounted occupant detection sensor 182, and/or the occupant detection sensor 400) during normal operation. FIG. 26A is a top-down view of an example room 2610 for illustrating the operation of the occupant detection sensor 2600 during the location determination procedure 2500. The location determination procedure 2500 may be executed by a control circuit of the occupant detection sensor 2600 (e.g., the radar detection processor 412 and/or the control circuit 420). For example, the location determination procedure 2500 may be executed at 2112 of the control procedure 2100 shown in FIG. 21.

For the example of FIG. 26A, the room 2610 may be rectangular with four walls 2610a-2610d, and the coverage area of the occupant detection sensor 2600 may extend beyond the extents of the room 2610, such that the room is fully encompassed by the coverage area. The coverage area of the occupant detection sensor 2600 may be characterized by a global coordinate system 2602 having an origin 2604 located at a center point of the occupant detection sensor. The room 2610 may be characterized by a desired region of interest 2620, which may be, for example, the extents of the room. The x-axis of the global coordinate system 2602 of the occupant detection sensor 2600 may not be aligned with an x-axis of a local coordinate system (not shown) of the desired region of interest 2620. The control circuit of the occupant detection sensor 2600 may be configured to determine the locations ($x_1$, $y_1$), ($x_2$, $y_2$), ($x_3$, $y_3$), ($x_4$, $y_4$) of the corners of the desired region of interest 2620 in a global coordinate system associated with the occupant detection sensor 2500, for example, during a configuration procedure (e.g., the configuration procedure 1400 shown in FIG. 14 and/or the configuration procedure 1500 shown in FIG. 15). The locations ($x_1$, $y_1$), ($x_2$, $y_2$), ($x_3$, $y_3$), ($x_4$, $y_4$) of the corners may define the bounds of the desired region of interest 2620. The control circuit may store in memory the locations ($x_1$, $y_1$), ($x_2$, $y_2$), ($x_3$, $y_3$), ($x_4$, $y_4$) of the corners in order (e.g., moving counter-clockwise around the region of interest 2620). The control circuit may not need to establish a relationship between the global coordinate system 2602 and a local coordinate system of the desired region of interest 2620 in order to execute the location determination procedure 2500 of FIG. 25. For example, the control circuit may not need to determine a rotation angle or an offset vector between the x-axis of the global coordinate system 2602 and the x-axis of the local coordinate system of the desired region of interest 2620 in order to execute the location determination procedure 2500 of FIG. 25. The control circuit may not need to transform a location of an occupant in the global coordinate system 2602 to a location in the local coordinate system of the desired region of interest 2620 when executing the location determination procedure 2500.

As shown in FIG. 26A, a first occupant A may be located inside of the desired region of interest 2620 and a second occupant B may be located outside of the desired region of interest 2620. To determine if a location of an occupant that is within the coverage area of the occupant detection sensor 2600 is within the desired region of interest 2620, the occupant detection sensor may determine if respective vectors extending from each corner of the desired region of interest 2620 to the occupant are all directed into the desired region of interest. The occupant detection sensor 2600 may determine that the location of the occupant is within the desired region of interest if all of the vectors are directed into the region of interest. The occupant detection sensor 2600 may determine that the location of the occupant is not within the desired region of interest if at least one of the vectors is not directed into the region of interest.

To determine if the respective vectors extending from each corner to the occupant are directed into the desired region of interest 2620, the occupant detection sensor 2600 may perform a test at each corner of the desired region of interest 2620. To perform the test at one of the corners, the occupant detection sensor 2600 may determine if a slope $m_O$ of a line between that corner and the occupant is greater than or equal to a slope $m_C$ of a line between that corner and the next corner. For example, at the first corner having the location $(x_1, y_1)$, the occupant detection sensor 2600 may determine if the slope $m_O$ of a line $L_{O:A}$ between the first corner and occupant A is greater than or equal to the slope $m_C$ of a line $L_{C:1-2}$ between the first corner and the second corner having the location $(x_2, y_2)$. At the second corner having the location $(x_2, y_2)$, the occupant detection sensor 2600 may determine if the slope $m_O$ of a line (not shown) between the second corner and occupant A is greater than or equal to the slope $m_C$ of a line $L_{C:2-3}$ between the second corner and the third corner having the location $(x_3, y_3)$. If the slope $m_O$ is greater than or equal to the slope $m_C$ at each corner of the desired region of interest 2620, the occupant detection sensor 2600 may conclude that the occupant is inside of the desired region of interest 2620. For example, for occupant A as shown in FIG. 26, the slope $m_O$ is greater than or equal to the slope $m_C$ at each corner of the desired region of interest 2620. If the slope $m_O$ is less than the slope $m_C$ at any of the corners of the desired region of interest 2620, the occupant detection sensor 2600 may conclude that the occupant is outside of the desired region of interest 2620. For example, for occupant B as shown in FIG. 26A, the slope $m_O$ is less than the slope $m_C$ at least the first corner of the desired region of interest 2620.

Referring back to FIG. 25, the location determination procedure 2500 may begin at 2510. At 2512, the control circuit may determine a location $(x_O, y_O)$ in the global coordinate system 2602 and a tracking number of an occupant from an occupant detection circuit (e.g., the radar detection circuit 410). At 2514, the control circuit may start at the first corner of the desired region of interest 2620 that has the location $(x_1, y_1)$. At 2516, the control circuit may calculate the slope $m_C$ from a present corner (e.g., the first corner) to a next corner (e.g., the second corner having the location $(x_2, y_2)$) of the desired region of interest 2620, e.g., $$m_C = (y_2 - y_1)/(x_2 - x_1).$$

At 2518, the control circuit may calculate the slope $m_O$ from the present corner (e.g., the first corner) to the occupant, e.g., $$m_O = (y_O - y_1)/(x_O - x_1).$$

If the slope $m_O$ is greater than or equal to the slope me at 2520, the control circuit may determine if there are more corners of the desired region of interest 2620 to analyze at 2522. If there are more corners at 2522, the control circuit may move to the next corner at 2524 (e.g., the second corner), calculate the slope $m_C$ from second corner to the third corner at 2516, and calculate the slope $m_O$ from the second corner to the occupant at 2518. If the slope $m_O$ is greater than or equal to the slope $m_C$ at 2520 for each corner of the desired region of interest 2620 (e.g., there are no more corners to analyze at 2522), the control circuit may store the location $(x_O, y_O)$ and the tracking number of the occupant in memory at 2526. If the control circuit is not done processing the locations of occupants received from the occupant detection circuit at 2528, the location determination procedure 2500 may loop around to determine the location of the next occupant and associated tracking number at 2512. If the slope $m_O$ is not greater than or equal to the slope $m_C$ at 2520 at any of the corners of the desired region of interest 2620, the control circuit may move on to process the location of the next occupant without storing the location $(x_O, y_O)$ and the tracking number of the current occupant in memory. When the control circuit is done processing the locations of occupants received from the occupant detection circuit at 2528, the location determination procedure 2500 may exit at 2530.

Figure 26C:
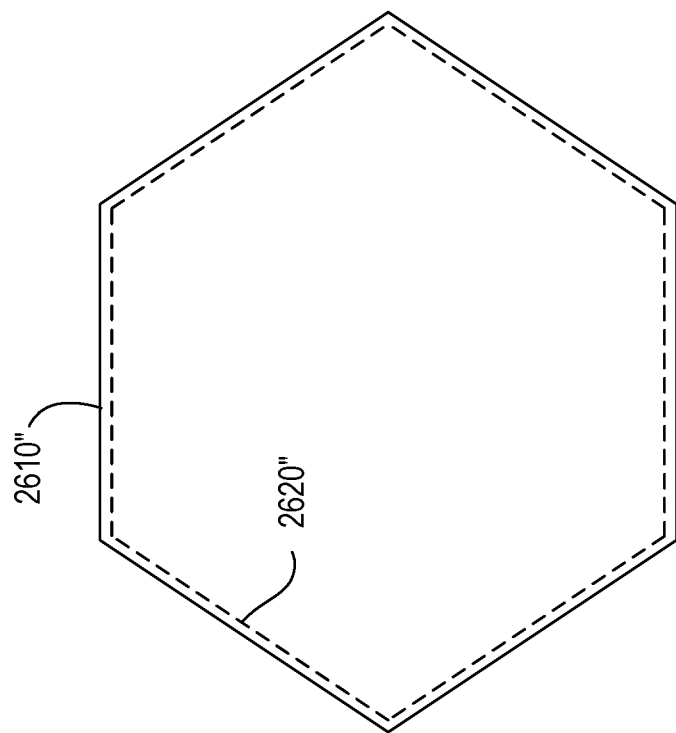
Figure 26B:
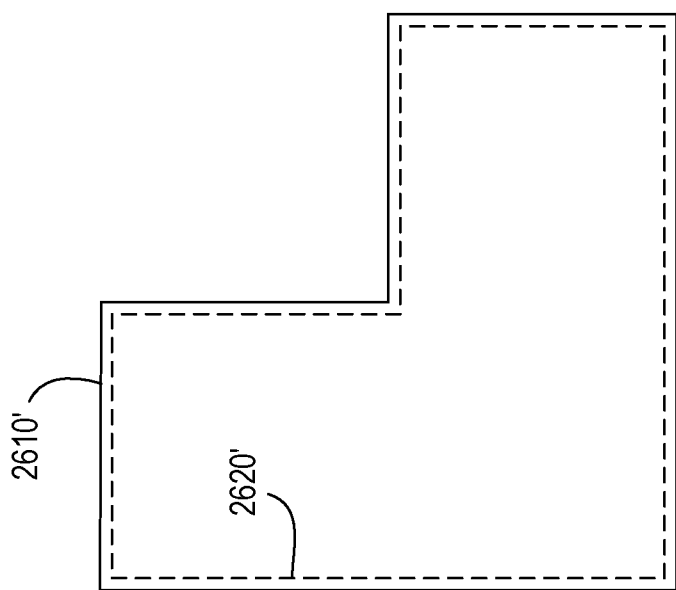

While the desired region of interest 2620 shown in FIG. 26A is rectangular in shape, the location determination procedure 2500 may be executed on regions of interest having any shape and any number of corners (e.g., regions of interest having complex shapes and/or polygons of any shape or size) without modification as long as the corners of the desired region of interest are analyzed in order (e.g., a counterclockwise order). The control circuit may learn/determine the locations of the corners using the techniques described herein, e.g., during a commissioning procedure. FIGS. 26B and 26C are top-down views of other example rooms 2610', 2610" that have complex shapes and respective regions of interest 2620', 2620" that are polygons with, for example, greater than four sides and corners. These regions of interest 2620', 2620" may be configured using the configuration procedure 2500 of FIG. 25 for the occupant detection sensor 2600. For example, the room 2610' (and corresponding region of interest 2620') of FIG. 26B may be L-shaped (e.g., having six sides and corners). The room 2610" (and corresponding region of interest 2620") of FIG. 26C may have a hexagon shape (e.g., having six sides that are not all parallel and/or perpendicular to each other).

Although features and elements are described herein in particular combinations, each feature or element can be used alone or in any combination with the other features and elements. The methods described herein may be implemented in a computer program, software, or firmware that may be incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), removable disks, and optical media such as CD-ROM disks, and digital versatile disks (DVDs).

What is claimed is:

1. A method comprising:
   determining locations of one or more occupants in a first coordinate system associated with an occupant detection device;
   receiving knowledge about bounds of a region of interest in a space;
   determining whether the one or more occupants are within the bounds of the region of interest based on the locations of the one or more occupants;
   assigning respective tracking numbers to the one or more occupants upon detecting the one or more occupants in the space;
   storing the tracking numbers and the locations of the one or more occupants in memory;
   determining a count of a number of occupants in the region of interest based on whether the one or more occupants are within the bounds of the region of interest; and increasing the count of the number of occupants in the region of interest in response to determining that a current occupant has entered the region of interest.

2. The method of claim 1, further comprising:
converting coordinates of the one or more occupants in the first coordinate system into coordinates of the one or more occupants in a second coordinate system associated with the region of interest;
determining that the one or more occupants are in the region of interest on a condition that the coordinates of the occupants in the second coordinate system are within the bounds of the region of interest; and
determining that the one or more occupants are outside the region of interest on a condition that the coordinates of the occupants in the second coordinate system are outside the bounds of the region of interest.

3. The method of claim 2, further comprising:
determining a relationship between the first coordinate system and the second coordinate system; and
converting the coordinates of the one or more occupants in the first coordinate system into the coordinates of the one or more occupants in the second coordinate system based on the relationship.

4. The method of claim 3, wherein the relationship between the first coordinate system and the second coordinate system comprises an offset between an origin of the first coordinate system and an origin of the second coordinate system.

5. The method of claim 4, wherein the relationship between the first coordinate system and the second coordinate system further comprises a rotation angle between an axis of the first coordinate system and an axis of the second coordinate system.

6. The method of claim 4, further comprising:
determining the relationship between the first coordinate system and the second coordinate system during a learning mode.

7. The method of claim 6, further comprising:
determining the relationship between the first coordinate system and the second coordinate system based on one or more inputs received from a programming device.

8. The method of claim 6, further comprising:
determining the relationship between the first coordinate system and the second coordinate system based on one or more location markers in the space, the one or more location markers representing the locations of a plurality of corners of the region of interest.

9. The method of claim 1, further comprising:
receiving the knowledge about the bounds of the region of interest based on one or more inputs received from a programming device.

10. The method of claim 1, further comprising:
receiving the knowledge about the bounds of the region of interest based on one or more location markers in the space, the one or more location markers representing the locations of a plurality of corners of the region of interest.

11. The method of claim 1, further comprising:
receiving the knowledge about the bounds of the region of interest during a learning mode.

12. The method of claim 1, wherein, to determine whether the current occupant is within the bounds of the region of interest, the method further comprises:
determining the location of the current occupant in the first coordinate system;
determining the locations of a plurality of corners of the region of interest in the first coordinate system;
determining a plurality of vectors each extending from a respective corner of the plurality of corners of the region of interest towards the current occupant; and
determining whether the current occupant is within the bounds of the region of interest based on whether the vectors are all directed into the region of interest;
wherein the current occupant is determined to be within the bounds of the region of interest when all of vectors are directed into the region of interest, and
wherein the current occupant is determined to be outside the bounds of the region of interest when at least one of the vectors is directed away from the region of interest.

13. The method of claim 12, further comprising, for each of the plurality of corners of the region of interest:
determining a first slope of the vector extending from the corner to the occupant, the first slope determined in reference to the first coordinate system;
determining a second slope of a line between the corner and a next corner, the second slope determined in reference to the first coordinate system;
determining whether the first slope is greater than or equal to the second slope;
determine that the vector is directed into the region of interest based on a determination that the first slop is greater than or equal to the second slope; and
determining that the vector is directed away from the region of interest based on a determination that the first slop is less than the second slope.

14. The method of claim 12, further comprising:
receiving and storing the locations of the plurality of corners during a learning mode.

15. The method of claim 1, further comprising:
determining that the current occupant has entered the region of interest in response to determining that:
the current occupant is in the region of interest;
the current occupant has the same tracking number as the tracking number stored for a previously identified occupant; and
a last-known location of the previously identified occupant is outside the region of interest.

16. The method of claim 15, wherein the control circuit is further configured to update the location of the previously identified occupant stored in memory with the location of the current occupant.

17. The method of claim 1, further comprising:
decreasing the count of the number of occupants in the region of interest in response to determining that the previously identified occupant has left the region of interest in response to determining that:
the current occupant is detected outside the region of interest;
the current occupant has the same tracking number as the tracking number stored for the previously identified occupant; and
a last-known location of the previously identified occupant is in the region of interest.

18. The method of claim 17, further comprising:
determining a location of a doorway of the space during a learning mode; and
deleting the tracking number and an occupant identifier assigned to the current occupant in response to determining that the current occupant is in the proximity of the doorway.

19. The method of claim 17, further comprising:
updating the location of the previously identified occupant with the location of the current occupant.

20. The method of claim 1, further comprising:
determining that a previously identified occupant has become stationary in the region of interest in response to determining that the previously identified occupant is no longer detected and a last-known location of the previously identified occupant is in the region of interest.

21. The method of claim 20, further comprising:
maintaining the count of the number of occupants in the region of interest in response to determining that the previously identified occupant has become stationary in the region of interest.

22. The method of claim 20, further comprising:
determining that the previous identified occupant has become active again from being stationary in response to determining that:
the current occupant is detected with a tracking number different than the tracking numbers stored by the control circuit; and
the location of the current occupant is the same as the last-known location of the previously identified occupant in the region of interest; and
maintaining the count of the number of occupants in the region of interest in response to determining that the previously identified occupant has become active again.

23. The method of claim 22, further comprising:
updating the location and tracking number of the previously identified occupant with the location and tracking number of the current occupant.

24. The method of claim 1, further comprising:
determining that the current occupant is new to the space and assign an occupant identifier to the current occupant in response to determining that:
a tracking number assigned to the current occupant is different than the tracking numbers stored by the control circuit;
the location of the current occupant is different than the locations stored by the control circuit; and
the location of the current occupant is in the proximity of a doorway of the space.

25. The method of claim 24, further comprising:
determining the location of the doorway during a learning mode.

26. The method of claim 24, further comprising:
assigning the occupant identifier to the current occupant further in response to determining that a size of the current occupant exceeds a threshold.

27. The method of claim 1, further comprising:
determining that the current occupant is in a masked region of the region of interest; and
excluding the current occupant from the count of the number of occupants in the region of interest.

28. The method of claim 27, further comprising:
determining the bounds of the masked region based on one or more inputs received from a programming device or based on one or more location markers in the region of interest.

29. The method of claim 1, further comprising:
generating a report of the count of the number of occupants in the region of interest; and
transmitting the report to an external device via a communication circuit.

30. The method of claim 1, further comprising:
identifying one or more sub-regions within the region of interest;
determining a respective count of the number of occupants in each of the one or more sub-regions; and
learning the dimensions of the one or more sub-regions during a learning mode.

31. The method of claim 30, further comprising:
converting coordinates of the current occupant in the first coordinate system into coordinates of the current occupant in at least one local coordinate system to determine whether the current occupant is in the sub-region associated with the at least one of the local coordinate systems, wherein each of the one or more sub-regions is associated with a respective local coordinate system.

32. The method of claim 1, further comprising:
detecting the presence of the one or more occupants in the space using a second occupant detection device, wherein the second occupant detection device consumes less power than the occupant detection device; and
activating the second occupant detection device in response to determining that the space is vacant; and
activating the first occupant detection device in response to determining that the space is not vacant.

33. A method comprising:
defining a first coordinate system used to identify a location of an occupant in a space;
storing a relationship between the first coordinate system associated with a sensing circuit and a second coordinate system associated with a region of interest of the space, wherein the relationship between the first coordinate system and the second coordinate system comprises at least one of a rotation angle or an offset vector, wherein the rotation angle is between an x-axis of the first coordinate system and an x-axis of the second coordinate system, and wherein the offset vector is between an origin of the first coordinate system and an origin the second coordinate system;
converting the location of the occupant from the first coordinate system into the second coordinate system based on the relationship between the first coordinate system and the second coordinate system; and
determining if the location of the occupant in the second coordinate system is within the region of interest.

34. A method comprising:
converting coordinates of one or more occupants in a first coordinate system into coordinates of the one or more occupants in a second coordinate system, wherein the first coordinate system is associated with an occupant detection device and the second coordinate system is associated with a region of interest in the space;
determining that the one or more occupants are in the region of interest when the coordinates of the occupants in the second coordinate system are within bounds of the region of interest; and
determining that the one or more occupants are outside the region of interest when the coordinates of the occupants in the second coordinate system are outside the bounds of the region of interest.

35. The method of claim 34, further comprising:
determining a count of the number of occupants in the region of interest in the space based on whether the one or more occupants are within the region of interest.

36. The method of claim 34, further comprising:
receiving the coordinates of the one or more occupants in the first coordinate system from the occupant detection device.

37. A non-transitory computer-readable storage medium comprising executable instructions that, when executed by a processor of a control device, cause the processor of the control device to:
- determine locations of one or more occupants in a first coordinate system associated with an occupant detection device;
- receive knowledge about bounds of a region of interest in a space;
- determine whether the one or more occupants are within the bounds of the region of interest based on the locations of the one or more occupants;
- assign respective tracking numbers to the one or more occupants upon detecting the one or more occupants in the space;
- store the tracking numbers and the locations of the one or more occupants in memory;
- determine a count of a number of occupants in the region of interest based on whether the one or more occupants are within the bounds of the region of interest; and
- increase the count of the number of occupants in the region of interest in response to determining that a current occupant has entered the region of interest.

38. A non-transitory computer-readable storage medium comprising executable instructions that, when executed by a processor of a control device, cause the processor of the control device to:
- define a first coordinate system used to identify a location of an occupant in a space;
- store a relationship between the first coordinate system associated with a sensing circuit and a second coordinate system associated with a region of interest of the space, wherein the relationship between the first coordinate system and the second coordinate system comprises at least one of a rotation angle or an offset vector, wherein the rotation angle is between an x-axis of the first coordinate system and an x-axis of the second coordinate system, and wherein the offset vector is between an origin of the first coordinate system and an origin the second coordinate system;
- convert the location of the occupant from the first coordinate system into the second coordinate system based on the relationship between the first coordinate system and the second coordinate system; and
- determine if the location of the occupant in the second coordinate system is within the region of interest.

39. A non-transitory computer-readable storage medium comprising executable instructions that, when executed by a processor of a control device, cause the processor of the control device to:
- convert coordinates of one or more occupants in a first coordinate system into coordinates of the one or more occupants in a second coordinate system, wherein the first coordinate system is associated with an occupant detection device and the second coordinate system is associated with a region of interest in the space;
- determine that the one or more occupants are in the region of interest when the coordinates of the occupants in the second coordinate system are within bounds of the region of interest; and
- determine that the one or more occupants are outside the region of interest when the coordinates of the occupants in the second coordinate system are outside the bounds of the region of interest.

* * * * *